United States Patent
Moriyama et al.

(10) Patent No.: US 9,796,418 B2
(45) Date of Patent: Oct. 24, 2017

(54) TORQUE TRANSMISSION JOINT AND ELECTRIC POWER STEERING APPARATUS

(71) Applicant: NSK Ltd., Tokyo (JP)

(72) Inventors: Seiichi Moriyama, Maebashi (JP); Hiroshi Shibazaki, Maebashi (PA); Toru Segawa, Maebashi (JP); Takeshi Yamamoto, Maebashi (JP); Kazuhiko Kojima, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/355,562

(22) PCT Filed: Jul. 29, 2013

(86) PCT No.: PCT/JP2013/070505
§ 371 (c)(1),
(2) Date: Apr. 30, 2014

(87) PCT Pub. No.: WO2014/069059
PCT Pub. Date: May 8, 2014

(65) Prior Publication Data
US 2015/0217804 A1 Aug. 6, 2015

(30) Foreign Application Priority Data
Nov. 1, 2012 (JP) .................................. 2012-241467

(51) Int. Cl.
*F16D 3/68* (2006.01)
*F16D 3/12* (2006.01)
(Continued)

(52) U.S. Cl.
CPC ........... *B62D 7/224* (2013.01); *B62D 5/0409* (2013.01); *B62D 5/0454* (2013.01); *F16D 3/68* (2013.01);
(Continued)

(58) Field of Classification Search
CPC ........ B62D 5/04; B62D 5/0403; B62D 5/043; B62D 5/008; F16D 3/64; F16D 3/68
See application file for complete search history.

(56) References Cited

U.S. PATENT DOCUMENTS 2,025,824 A 12/1935 Ricefield
2,074,941 A * 3/1937 Ricefield .......................... 464/73
(Continued)

FOREIGN PATENT DOCUMENTS

GB 1 203 229 8/1970
JP 54-103444 U 7/1979
(Continued)

OTHER PUBLICATIONS

Extended European search report (including supplementary European search report and search opinion) from European Patent Application No. 13848121.3, Jul. 11, 2016.

*Primary Examiner* — Tony H. Winner
(74) *Attorney, Agent, or Firm* — Shapiro, Gabor and Rosenberger, PLLC

(57) ABSTRACT

A torque transmission joint has a shock-absorbing member between a drive shaft and a driven shaft. When the drive shaft is rotated in one direction, forces due to torque transmitted from the drive shaft to the driven shaft act inward in a radial direction of the shock-absorbing member on held sections that are held between one side surfaces in the circumferential direction of drive-side arm sections that are positioned in the front side in the one direction of rotation of the drive shaft, and side surfaces in the circumferential direction of driven-side arm sections that are positioned on the rear side in the one direction of rotation of the drive shaft.

10 Claims, 38 Drawing Sheets

(51) Int. Cl.
*B62D 5/04* (2006.01)
*B62D 7/22* (2006.01)
*F16F 15/124* (2006.01)
*F16D 3/64* (2006.01)
*F16H 1/16* (2006.01)

(52) U.S. Cl.
CPC ............ *F16F 15/1245* (2013.01); *B62D 5/04* (2013.01); *F16D 3/64* (2013.01); *F16H 1/16* (2013.01)

(56) References Cited

U.S. PATENT DOCUMENTS

| | | | | |
|---|---|---|---|---|
| 3,837,179 | A * | 9/1974 | Barth | 464/76 |
| 3,884,049 | A | 5/1975 | Pauli | |
| 5,720,638 | A * | 2/1998 | Hale | 440/83 |
| 5,928,083 | A * | 7/1999 | Monahan et al. | 464/57 |
| 6,491,131 | B1 * | 12/2002 | Appleyard | 180/444 |
| 7,699,708 | B2 * | 4/2010 | Kubota et al. | 464/73 |
| 7,699,709 | B2 | 4/2010 | Kubota et al. | 464/73 |
| 8,505,675 | B2 * | 8/2013 | Suzuki et al. | 180/444 |
| 8,616,986 | B2 * | 12/2013 | Nakagawa et al. | 464/76 |
| 2005/0072620 | A1 * | 4/2005 | Joushita | 180/444 |
| 2007/0251758 | A1 * | 11/2007 | Segawa | B62D 5/0409 180/444 |
| 2008/0009354 | A1 * | 1/2008 | Hodjat et al. | 464/87 |
| 2010/0113164 | A1 * | 5/2010 | Rothe et al. | 464/73 |
| 2011/0319176 | A1 * | 12/2011 | Rothe | 464/71 |
| 2012/0061168 | A1 * | 3/2012 | Hamakita et al. | 180/444 |
| 2012/0202605 | A1 * | 8/2012 | Cassell | 464/85 |
| 2012/0208649 | A1 * | 8/2012 | Nakagawa et al. | 464/73 |
| 2012/0264524 | A1 | 10/2012 | Nakagawa et al. | |

FOREIGN PATENT DOCUMENTS

| | | |
|---|---|---|
| JP | 58-061332 | 4/1983 |
| JP | 03-73745 U | 7/1991 |
| JP | 2000-043739 A | 2/2000 |
| JP | 2004-306898 A | 11/2004 |
| JP | 2005-226768 A | 8/2005 |
| JP | 2006-513906 A | 4/2006 |
| JP | 2006-183676 A | 7/2006 |
| JP | 2009-138886 A | 6/2009 |
| JP | 2010-181011 A | 8/2010 |
| JP | 4523721 B2 | 8/2010 |
| JP | 2011-137488 A | 7/2011 |
| JP | 4779358 B2 | 9/2011 |
| JP | 2013-167350 A | 8/2013 |
| JP | 2013-177955 A | 9/2013 |
| WO | WO 99/65758 A1 | 12/1999 |
| WO | WO 2004/074071 A2 | 9/2004 |
| WO | WO 2010/090053 A1 | 8/2010 |

* cited by examiner

TORQUE TRANSMISSION JOINT AND ELECTRIC POWER STEERING APPARATUS

TECHNICAL FIELD

The present invention relates to a torque transmission joint that is assembled in various kinds of machinery and used for transmitting torque between a drive shaft and a driven shaft, and to an electric power steering apparatus in which this torque transmission joint is assembled that has a mechanism having an electric motor as an auxiliary power source, and that assists in operation of a steering wheel by an operator.

BACKGROUND ART

When applying a steering angle to steered wheels (normally the front wheels), electric power steering apparatuses are widely used, that use an electric motor as an auxiliary power source and that reduce the force required for an operator to operate the steering wheel. Electric power steering apparatuses having various structures are known, however, in all kinds of structures, auxiliary power from an electric motor is applied by way of a reduction gear to a rotating shaft that is rotated by operation of the steering wheel. Typically, a worm reducer is used as this reduction gear. In the case of an electric power steering apparatus that uses a worm reducer, a worm that is rotated and driven by an electric motor is geared with a worm wheel that rotates together with the rotating shaft, and the auxiliary power from the electric motor is transmitted to the rotating shaft by way of the worm and worm wheel. However, in the case of a worm reducer, unless various measures are taken, backlash that exists in the gear engagement section between the worm and worm wheel when changing the direction of rotation of the rotating shaft may cause an unpleasant noise called "gear rattle" to occur.

JP 2000-43739 (A), JP 2004-306898 (A) and JP 2006-513906 (A) disclose a structure in which the occurrence of this kind of gear rattle is suppressed by elastically pressing the worm toward the worm wheel using an elastic member such as a spring. FIG. 37 and FIG. 38 illustrate an example of an electric power steering apparatus disclosed in JP 2004-306898 (A). The front-end section of a steering shaft 2 that rotates as the steering wheel 1 is rotated is supported inside a housing 3 so as to be able to rotate freely. A worm wheel 4 is fastened to the front-end section of the steering shaft 2. On the other hand, a worm 5 has a worm shaft 6 and worm teeth 7 that are provided around the middle section in the axial direction of the worm shaft 6 and that are geared with the worm wheel 4. Both end sections in the axial direction of the worm shaft 6 that is rotated and driven by an electric motor 8 are supported inside the housing 3 by way of a pair of rolling bearings 9a, 9b, such as deep-groove ball bearings, so as to be able to rotate freely. Furthermore, a pressure piece 10 is fitted around a portion of the tip-end section of the worm shaft 6 that protrudes out further than the rolling bearing 9a, and an elastic member such as a coil spring 11 is provided between the pressure piece 10 and the housing 3. The elastic force of the spring 11 that is transmitted to the worm shaft 6 by way of the pressure piece 10 pushes the worm 5 toward the worm wheel 4. With this kind of construction, backlash between the worm 5 and the worm wheel 4 is reduced, and the occurrence of gear rattle is suppressed.

In this conventional structure, the base-end section of the worm shaft is joined to the tip-end section of the output shaft 12 of the electric motor 8, and there is a possibility that gear rattle will occur in this joint section as well. In other words, in order that the tip-end section of the output shaft 12 and the base-end section of the worm shaft 6 are joined so as to be able to transmit torque, a spline hole 13 that is open on the base-end surface of the worm shaft 6 is formed on the base-end section of the worm shaft 6, and a spline shaft section 14 is formed on the tip-end section of the output shaft 12 such that the spline shaft section 14 spline-engages with the spline hole 13. As long as the spline shaft section 14 spline-engages with the spline hole 13 such that there are no gaps in the circumferential direction, gear rattle will not occur in the joint section between the tip-end section of the output shaft 12 and the base-end section of the worm shaft 6. However, in actuality, there is backlash in the spline engagement between the spline shaft section 14 and the spline hole 13. Particularly, in the structure such as illustrated in FIG. 38 for reducing backlash between the worm 5 and worm wheel 4, it is necessary to cause the worm shaft 6 to pivotally displace, so it is not possible to completely eliminate the backlash that exists between the spline shaft section 14 and the spline hole 13, and thus it is difficult to prevent the occurrence of gear rattle in the joint section between the tip-end section of the output shaft 12 and the base-end section of the worm shaft 6.

JP H03-73745 (U) and JP 4,523,721 (B2) disclose structure that prevents the occurrence of gear rattle in a joint section between a drive shaft and driven shaft by joining the end section of a drive shaft and the end section of a driven shaft by way of a torque transmission joint (shaft joint) that has a shock-absorbing member made of an elastic material. FIG. 39 and FIG. 40 illustrate a conventional torque transmission joint 15 that is disclosed in JP H03-73745 (U). The torque transmission joint 15 has: a metal drive-side transmission member 16 that is concentrically supported by the tip-end section of an output shaft 12 of an electric motor as a drive shaft; a metal driven-side transmission member 17 that is concentrically supported by the base-end section of a worm shaft 6 as a driven shaft; a rubber shock-absorbing member 18 that is provided between the drive-side transmission member 16 and the driven-side transmission member 17; and a steel ball 19.

The drive-side transmission member 16 has: a disk-shaped drive-side base section 20 that is supported by the tip-end section of the output shaft 12 so that relative rotation is not possible; and three drive-side arm sections 21 that are provided on the surface of the drive-side base section 20 that faces the driven-side transmission member 17 in a state such that these drive-side arm sections 21 are intermittently spaced in the circumferential direction and protrude out in the axial direction. On the other hand, the driven-side transmission member 17 has: a disk-shaped driven-side base section 22 that is supported by the base-end section of the worm shaft 6 so that relative rotation is not possible; and three driven-side arm sections 23 that are provided on the surface of the driven-side base section 22 that faces the drive-side transmission member 16 in a state such that these driven-side arm sections 23 are intermittently spaced in the circumferential direction and protrude out in the axial direction. Moreover, the shock-absorbing member 18 has: a hollow cylindrical section 24; and six held sections 25 that extend in the radial direction from the outer circumferential surface of the cylindrical section 24. In the assembled state of the torque transmission joint 15, the drive-side arm sections 21 and the driven-side arm sections 23 are arranged in an alternating sequence in the circumferential direction. The held sections 25 of the shock-absorbing member 18 are placed between the side surfaces in the circumferential direction of the drive-side arm sections 21 and the driven-side arm sections 23 that are adjacent to each other in the circumferential direction. Furthermore, the steel ball 19 is held between the tip-end surface of the output shaft 12 and the base-end surface of the worm shaft 6.

In the torque transmission joint 15, the rubber held sections 25 are held between the side surface in the circumferential direction of drive-side arm sections 21 and the driven-side arm sections 23 that are adjacent to each other in the circumferential direction. Therefore, there is no direct contact between the metal drive-side arm sections 21 and driven-side arm sections 23, and thus the occurrence of gear rattle is effectively prevented. Moreover, in this construction, during operation, thrust force that is transmitted between the output shaft 12 and the worm shaft 6 is transmitted by way of the steel ball 19. Therefore, because this thrust force is not transmitted to the shock-absorbing member 18, the durability of the shock-absorbing member 18 can be maintained over a long period of time.

However, in the structure of the torque transmission joint 15, errors in dimensions of the components, and assembly error cannot be effectively absorbed. For example, when there is so-called alignment error in which the positional relationship of the center axis of the output shaft 12 of the electric motor and the center axis of the worm shaft 6 does not coincide, this alignment error is absorbed by elastic deformation of part of the cylindrical section 24 and held sections 25 of the shock-absorbing member 18. Therefore, the more elastic deformation there is of the cylindrical section 24 of the shock-absorbing member 18, the larger the alignment error can be absorbed. However, in this structure, held sections 25 are arranged in the radial direction, and the side surfaces in the circumferential direction of the drive-side arm sections 21 and the driven-side arm sections 23 extend in the radial direction. That is to say, each of virtual planes containing the side surfaces in the circumferential direction passes through the center axis of the drive-side transmission member 16 and the driven-side transmission member 17. Therefore, when the output shaft 12 is rotated and driven and torque begins to be transmitted, a force that causes elastic contraction acts over the entire length of the held sections 25 that are located between the side surfaces in the circumferential direction of the front side in the direction of rotation of the drive-side arm sections 21 and the side surfaces in the circumferential direction of the rear sides in the direction of rotation of the driven-side arm sections 23. This makes a force in the pulling direction act on the cylindrical section 24, so it becomes difficult for elastic deformation to occur in the radial direction of the cylindrical section 24. Therefore, together with it becoming difficult to sufficiently absorb the alignment error between the output shaft 12 and the worm shaft 6, the surface pressure that occurs at part of the contact section between the outer circumferential surface 24 and the inner circumferential surfaces of the drive-side arm sections 21 and the driven-side arm sections 23 becomes very large, and friction resistance in that part increases, which could cause the overall transmission efficiency of the electric power steering apparatus to decrease.

Moreover, in the torque transmission joint 15, the held sections 25 of the shock-absorbing member 18 are arranged in the radial direction, so in the assembled state of the torque transmission apparatus 15, the shock-absorbing member 18 is only exposed to the outside from between the drive-side arm sections 21 and the driven-side arm sections 23 that are adjacent to each other in the circumferential direction. Therefore, it becomes difficult to visually check the shock-absorbing member 18, and thus a problem also occurs in that work efficiency of the inspection process in order to prevent assembly of the shock-absorbing member 18 from being forgotten is decreased.

JP 4,779,358 (B2) discloses structure in which the shock-absorbing member has three members that are stacked in the axial direction, however, in this structure as well, the held sections of the shock-absorbing member are arranged in the radial direction, so the problem described above is not solved.

RELATED LITERATURE

Patent Literature

[Patent Literature 1] JP 2000-43739 (A)
[Patent Literature 2] JP 2004-306898 (A)
[Patent Literature 3] JP 2006-513906 (A)
[Patent Literature 4] JP H03-73745 (U)
[Patent Literature 5] JP 4,523,721 (B2)
[Patent Literature 6] JP 4,779,358 (B2)

SUMMARY OF INVENTION

Problem to be Solved by Invention

Taking the situation above into consideration, it is the object of the present invention to provide a torque transmission joint that is able to effectively absorb error such as dimension error or assembly error of components, and that is also able to improve the work efficiency of the inspection process in order to prevent assembly of a shock-absorbing member from being forgotten, and to provide an electric power steering apparatus that has this torque transmission joint.

Means for Solving Problems

The torque transmission joint of the present invention has: a drive-side transmission member that is supported by the end section of a drive shaft, and is concentric with the drive shaft; a driven-side transmission member that is supported by the end section of a driven shaft that is arranged in series in the axial direction with the drive shaft, and is concentric with the driven shaft; and a shock-absorbing member that is made of an elastic material and is provided between the drive-side transmission member and the driven-side transmission member; and the torque transmission joint transmits torque between the end sections of the drive shaft and the driven shaft.

The drive-side transmission member has: a drive-side base section that is supported by the end section of the drive shaft; and a plurality of drive-side arm sections that are provided on the surface of the drive-side base section that faces the driven-side transmission member, and are provided intermittently in the circumferential direction in a state so as to protrude out in the axial direction. Moreover, the driven-side transmission member has: a driven-side base section that is supported by the end section of the driven shaft; and a plurality of driven-side arm sections that are provided on the surface of the driven-side base section that faces the drive-side transmission member, and are provided intermittently in the circumferential direction in a state so as to protrude out in the axial direction.

Furthermore, the shock-absorbing member has a plurality of held sections. In one embodiment of the present invention, each of the held sections of the shock-absorbing member has a flat plate shape, and each of pairs of the held sections that are adjacent to each other has a mirror symmetry about a virtual plane that passes through the center axis of the shock-absorbing member, with the adjacent held sections being inclined in a direction toward the virtual plane with respect to the radial direction as going toward the outside in the radial direction; and combined held sections that are formed by the pairs of the held sections are arranged at a plurality of locations in the circumferential direction and preferably are uniformly spaced.

Of pairs of side surfaces in the circumferential direction of the drive-side arm sections, side surfaces in the circumferential direction that are positioned in the front in the direction of rotation of the drive shaft are inclined in a direction toward the front in the direction of rotation with respect to the radial direction as going toward the outside in the radial direction. When the drive shaft can be rotated in both directions of rotation, of the pairs of the side surfaces in the circumferential direction of the drive-side arm sections, one of the side surfaces in the circumferential direction are positioned on the front side in one direction of rotation of the drive shaft, and the other side surfaces in the circumferential direction are positioned on the front side in the other direction of rotation of the drive shaft; and all of the side surfaces in the circumferential direction are inclined in a direction toward the front in the direction of rotation with respect to the radial direction as going to the outside in the radial direction. The drive-side arm sections and the driven-side arm sections are arranged in an alternating sequence in the circumferential direction, and the held sections are arranged between the side surfaces in the circumferential direction of the drive-side arm sections and the driven-side arm sections that are adjacent to each other in the circumferential direction. In one embodiment of the present invention, one of the drive-side arm sections and the driven-side arms sections are placed between the pairs of the held sections of the combined held sections, and the other of the drive-side arm sections and the driven-side arm sections are placed between the combined held sections that are adjacent to each other in the circumferential direction.

The torque transmission joint of the present invention is constructed such that when the drive shaft is rotated and driven, forces inward in the radial direction of the shock-absorbing member act on the held sections that are held between the side surfaces in the circumferential direction of the drive-side arm sections that are positioned on the front side in the direction of rotation of the drive shaft, and the side surfaces in the circumferential direction of the driven-side arm sections that are positioned on the rear side in the direction of rotation of the drive shaft.

Preferably, the shock-absorbing member is constructed so as to have a non-circular cylindrical shape in the cross section by arranging portions where the outer-diameter side end sections of the held sections that are adjacent to each other in the circumferential direction are connected by way of outer-diameter side cover sections and portions where the inner-diameter side end sections of the held sections that are adjacent to each other in the circumferential direction are connected directly or by way of inner-diameter side cover sections in an alternating sequence in the circumferential direction; and the outer circumferential surfaces of one of the drive-side arm sections and the driven-side arm sections are covered by the outer-diameter side cover sections.

Preferably, the combined held sections are provided at four locations that are uniformly spaced in the circumferential direction, and the non-circular cylindrical shape of the shock-absorbing member is a cross cylindrical shape.

Preferably, a damper member for absorbing part of the thrust force that acts between the drive shaft and the driven shaft and transmitting the remaining thrust force is provided on the inside of the shock-absorbing member between the drive-side transmission member and the driven-side transmission member.

The shock-absorbing member can be formed by layering in the axial direction a plurality of shock-absorbing pieces, the shock-absorbing pieces having: held pieces that, when layered in the axial direction, form the held sections; and outer-diameter side cover pieces that, when layered in the axial direction, form the outer-diameter side cover sections.

Moreover, the shock-absorbing member can be formed using two or more kinds of the shock-absorbing pieces having different elasticity, and swollen sections that protrude out in the circumferential direction are provided on both side surfaces in the circumferential direction of the held pieces of at least one of the shock-absorbing pieces that is manufactured using a material that elastically deforms more easily than the other shock-absorbing pieces.

Furthermore, preferably, the damper member for absorbing part of the thrust force that acts between the drive shaft and the driven shaft and transmitting the remaining thrust force is provided on the inside of a hollow cylindrical section of the shock-absorbing member between the drive-side transmission member and the driven-side transmission member. In this case, preferably the damper member is integrally formed with the shock-absorbing piece that is located in the middle in the axial direction of the shock-absorbing pieces.

The electric power steering apparatus of the present invention has: a housing that is supported by a fixed portion; a rotating steering shaft that rotates as a steering wheel is rotated and applies a steering angle to steered wheels; a worm wheel that is supported by part of the rotating steering shaft so as to be concentric with the rotating steering shaft, and rotates together with the rotating steering shaft; a worm that has a worm shaft, both end sections in the axial direction thereof being supported inside the housing by bearings so as to be able to rotate freely, and worm teeth that are provided around the middle section in the axial direction of the worm shaft and that gear with the worm wheel; and an electric motor; and the torque transmission joint of the present invention is provided between the output shaft of the electric motor and the worm shaft such that the torque transmission joint can transmit the torque between the output shaft and the worm shaft.

Effect of Invention

With the torque transmission joint and electric power steering apparatus of the present invention, it is possible to effectively absorb error such as dimension error or assembly error of components, and it is possible to improve the work efficiency of the inspection process in order to prevent assembly of the shock-absorbing member from being forgotten.

In other words, in the present invention, when the transmission of torque is started by rotating and driving the drive shaft, forces inward in the radial direction of the shock-absorbing member acts on the held sections that are held between side surfaces in the circumferential direction on the front side in the direction of rotation of the drive-side arm sections and the side surface in the circumferential direction on the rear side in the direction of rotation of the driven-side arm sections. As a result, portions near the inner-diameter side end sections of the held sections can be bent inward in the radial direction, and the shock-absorbing member is in a state in which elastic deformation can occur easily. Particularly, when the inner-diameter side end sections of the held sections are not continuous in the circumferential direction, and the portions on the inner-diameter side of the shock-absorbing member are not continuous in the circumferential direction, it is possible to put the shock-absorbing member in a state in which elastic deformation occurs more easily. With this kind of construction, alignment error that occurs between the drive shaft and the driven shaft can be sufficiently absorbed, and it is possible to improve the transmission efficiency of the overall system of the electric power steering apparatus.

Moreover, in the present invention, the outer-diameter side cover sections that make the outer-diameter side end sections of the held sections of the shock-absorbing member continuous, cover the outer circumferential surfaces of the arm sections of one of either the drive-side arm sections or the driven-side arm sections, and when the torque transmission joint is assembled, the surface area of the portions exposed to the outside is sufficiently large. Therefore, it is possible to improve the work efficiency of the inspection process in order to prevent assembly of the shock-absorbing member from being forgotten.

DETAILED DESCRIPTION OF THE PREFERRED EMBODIMENTS

[First Example of First Embodiment]

Figure 1:
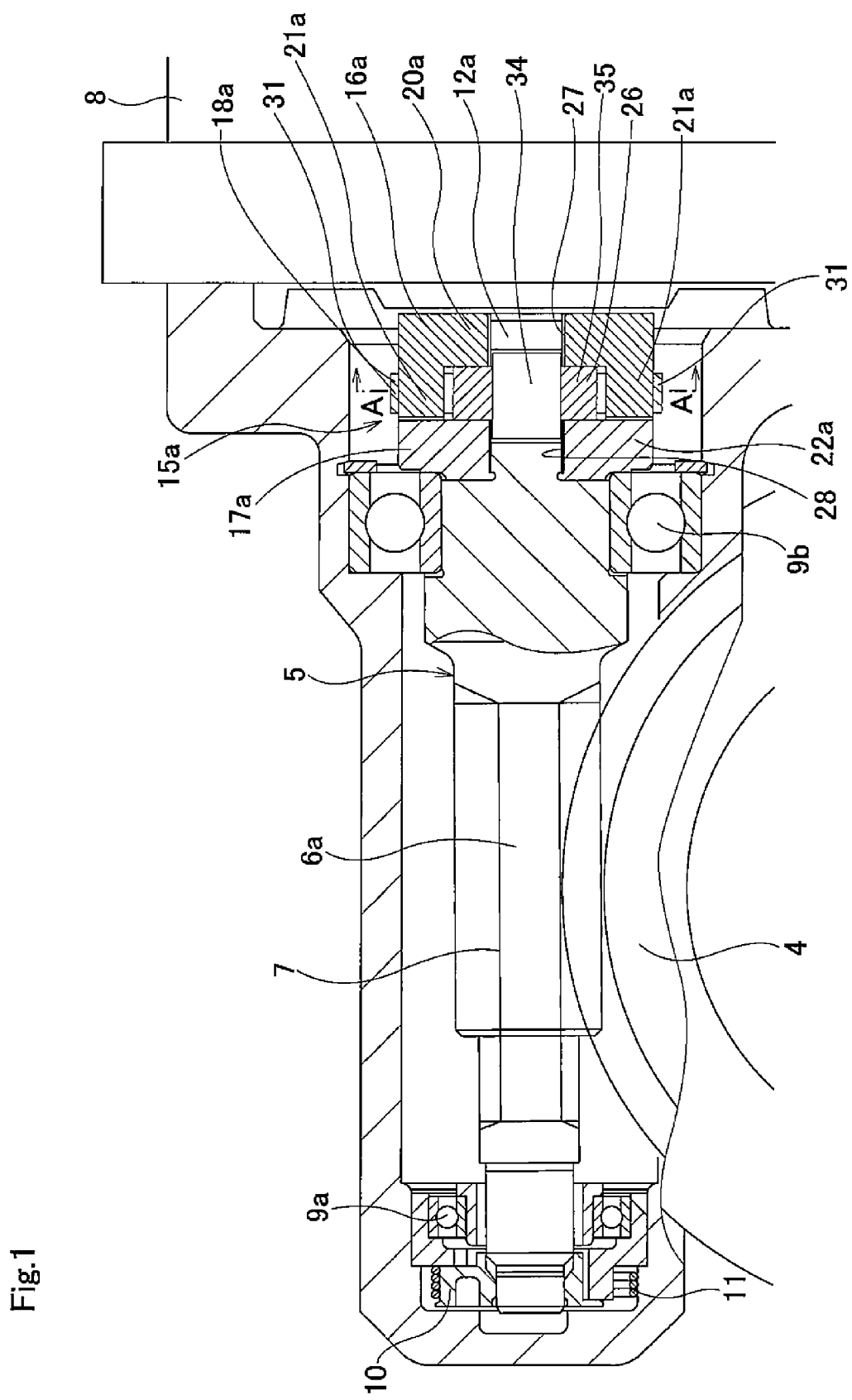
FIG. 1 is a cross-sectional drawing of the major parts of an electric power steering apparatus in which a torque transmission joint of a first example of a first embodiment of the present invention is assembled.
Figure 2:
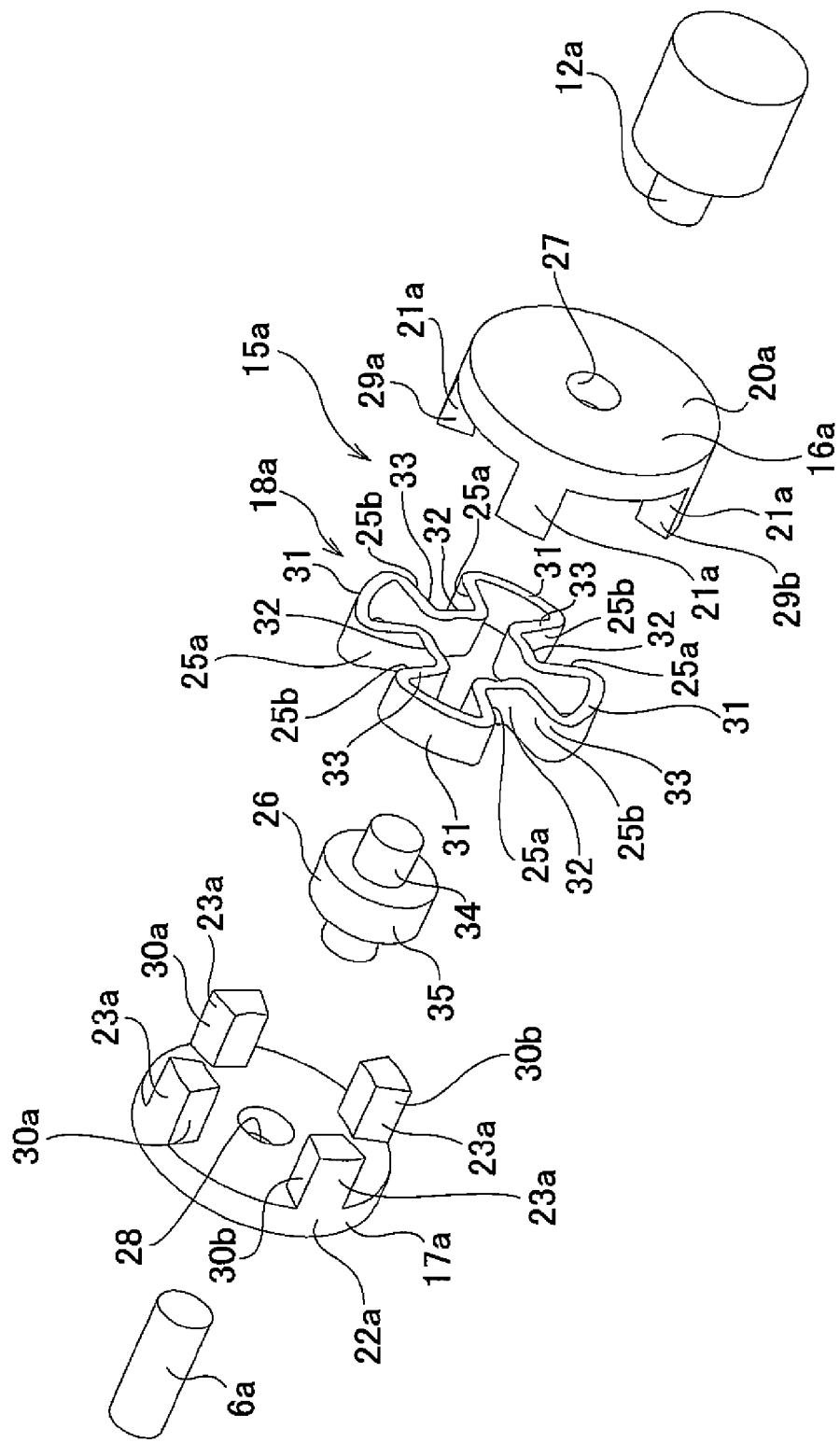
FIG. 2 is a perspective drawing that schematically illustrates the torque transmission joint that has been removed from the electric power steering apparatus illustrated in FIG. 1.

FIG. 1 to FIG. 4 illustrate a first example of a first embodiment of the present invention. The electric power steering apparatus of this example has: a housing 3 that is supported by a fixed portion; a steering shaft (rotating shaft for steering) 2 that is provided so as to be able to rotate freely with respect to the housing 3 and that applies a steering angle to the steered wheels by rotating as the steering wheel 1 rotates; a worm wheel 4 that is supported inside the housing 3 by part (front-end section) of the steering shaft 2 so as to be concentric with the steering shaft 2 and so as to rotate together with the steering shaft 2; a worm 5 that has a worm shaft 6a that is supported by bearings on both end sections in the axial direction so as to be able to rotate freely with respect to the housing 3, and worm teeth 7 that are provided around the middle section in the axial direction of the worm shaft 6a and that gear with the worm wheel 4; and an electric motor 8 for rotating and driving the worm 5. In this example, a torque transmission joint 15a, to which the present invention is applied, is provided between the tip-end section of the output shaft 12a of the electric motor 8 and the base-end section of the worm shaft 6a of the worm 5, and is able to transmit torque from the output shaft 12a to the worm shaft 6a. Except for the torque transmission joint 15a, the construction and function of the electric power steering apparatus is the same as a conventional electric power steering apparatus.

The torque transmission joint 15a of this example has: a drive-side transmission member 16a that is supported by the tip-end section of the output shaft 12a as a drive shaft, so as to be concentric with the tip-end section; a driven-side transmission member 17a that is supported by the base end section of the worm shaft 6a as a driven-side shaft, so as to be concentric with the base-end section; a shock-absorbing member 18a that is provided between the drive-side transmission member 16a and the driven-side transmission member 17a; and a damper member 26.

The drive-side transmission member 16a is made of metal and has a drive-side base section 20a and four drive-side arm sections 21a. The drive-side base section 20a has a disk shape and is provided with a drive-side serration hole 27 that is formed in the center section thereof and engages with a male serration section that is formed around the outer circumferential surface on the tip-end section of the output shaft 12a by way of serration engagement. The drive-side arm sections 21a are provided in portions near the outer-diameter on a surface of the drive-side base section 20a that faces the driven-side transmission member 17a such that the drive-side arm sections 21a are arranged intermittently in the circumferential direction (shifted at a phase of 90 degrees), and so as to protrude out in the axial direction.

On the other hand, the driven-side transmission member 17a is made of metal and has a driven-side base section 22a and four driven-side arm sections 23a. The driven-side base section 22a has a disk shape, and is provided with a driven-side serration hole 27 that is formed in the center section thereof and engages with a male serration section that is formed around the outer circumferential surface on the base-end section of the worm shaft 6a by way of serration engagement. The driven-side arm sections 23a are provided in portions near the outer diameter on a surface of the driven-side base section 22a that faces the drive-side transmission member 16a such that the driven-side arm sections 23a are arranged intermittently in the circumferential direction (shifted at a phase of 90 degrees), and so as to protrude out in the axial direction. The dimension in the axial direction of the drive-side arm sections 21a and the dimension in the axial direction of the driven-side arm sections 23a are the same.

In this example, paired side surfaces 29a, 29b in the circumferential direction 29a, 29b of the drive-side arm section 21a are not arranged in the radial direction, but are arranged so as to incline with respect to the radial direction. More specifically, when the direction of rotation of the output shaft 12a is clockwise in FIG. 3, the side surfaces 29a, that are ones of the side surfaces 29a, 29b in the circumferential direction, and that are on the front side in the direction of rotation, incline in a direction toward the front in the direction of rotation with respect to the radial direction as going toward the outside in the radial direction (the direction toward the rear in the direction of rotation as going toward the inside in the radial direction). On the other hand, when the direction of rotation of the output shaft 12a is counterclockwise in FIG. 3, the side surfaces 29b, that are the others of the side surfaces 29a, 29b in the circumferential direction, and that are on the front side in the direction of rotation, incline in a direction toward the front in the direction of rotation with respect to the radial direction as going toward the outside in the radial direction (the direction toward the rear in the direction of rotation as going toward the inside in the radial direction). In this example, the angle that is formed by the paired side surfaces 29a, 29b in the circumferential direction of the drive-side arm section 21a is less than 90 degrees (is about 75 degrees in the example in the figure).

Moreover, paired side surfaces 30a, 30b in the circumferential direction of the driven-side arm section 23a are also not arranged in the radial direction, but are arranged so as to incline with respect to the radial direction. More specifically, when the direction of rotation of the output shaft 12a is clockwise in FIG. 3, the side surfaces 30a, that are ones of the side surfaces 30a, 30b in the circumferential direction, and that are on the front side in the direction of rotation, incline in a direction toward the rear in the direction of rotation with respect to the radial direction as going toward the outside in the radial direction. On the other hand, when the direction of rotation of the output shaft 12a is counterclockwise in FIG. 3, the side surface 30b, that are the others of the side surfaces 30a, 30b in the circumferential direction, and that are on the front side in the direction of rotation, incline in a direction toward the rear in the direction of rotation with respect to the radial direction as going toward the outside in the radial direction. In other words, in this example, the spacing in the circumferential direction of the paired side surfaces 30a, 30b in the circumferential direction of the driven-side arm section 23a becomes a little larger as going toward the outside in the radial direction.

The shock-absorbing member 18a is integrally formed by injection molding using an elastic material such as an elastomer like rubber or vinyl, a synthetic resin or the like, and has a total of eight held sections 25a, 25b (four held sections 25a and four held sections 25b), four outer-diameter side cover sections 31 and four inner-diameter side cover sections 32.

The held sections 25a, 25b are all flat-plate shaped (in the free state, are straight with a fixed plate thickness), and are arranged between side surfaces 29a, 30b, 30a, 29b in the circumferential direction of the drive-side arm sections 21a and the driven-side arm sections 23a that are adjacent to each other in the circumferential direction. Particularly, paired held sections 25a, 25b that are adjacent in the circumferential direction each have a mirror symmetry about an imaginary plane passing through the center axis of the shock-absorbing member 18a (planes on the chain lines α, β, γ, δ in FIG. 4), and are inclined in a direction toward the imaginary plane with respect to the radial direction as going toward the outside in the radial direction. In other words, the held sections 25a, 25b are arranged not in the radial direction, but so as to incline with respect to the radial direction. Therefore, between the paired held sections 25a, 25b, the inclination angles are the same, but the directions of inclination are opposite. Moreover, in this example, the paired held sections 25a, 25b incline in a direction toward each other as going toward the inside in the radial direction. Combined held sections 33 that are formed by the paired held sections 25a, 25b are located at four locations that are uniformly spaced in the circumferential direction.

The outer-diameter side cover sections 31 and the inner-diameter side cover sections 32 are curved in a partial cylindrical shape. The inner-diameter side cover section 32 makes the inner-diameter side end sections of the paired held sections 25a, 25b that are adjacent to each other in the circumferential direction of the combined held sections 33 continuous. Moreover, the outer-diameter side cover section 31 makes the outer-diameter side end sections of the non-paired held sections 25a, 25b that are adjacent to each other but pertain to the different combined held sections 33 continuous. As a result, portions where the outer-diameter side end sections of the held sections 25a, 25b that are adjacent to each other in the circumferential direction are made continuous by way of the outer-diameter side cover section 31, and portions where the inner-diameter side end sections of the held sections 25a, 25b that are adjacent to each other in the circumferential direction are made continuous by way of the inner-diameter side cover section 32 are arranged in an alternating sequence in the circumferential direction. By employing this kind of construction, the cross-sectional shape of the shock-absorbing member 18a has a cross cylindrical shape.

Figure 3:
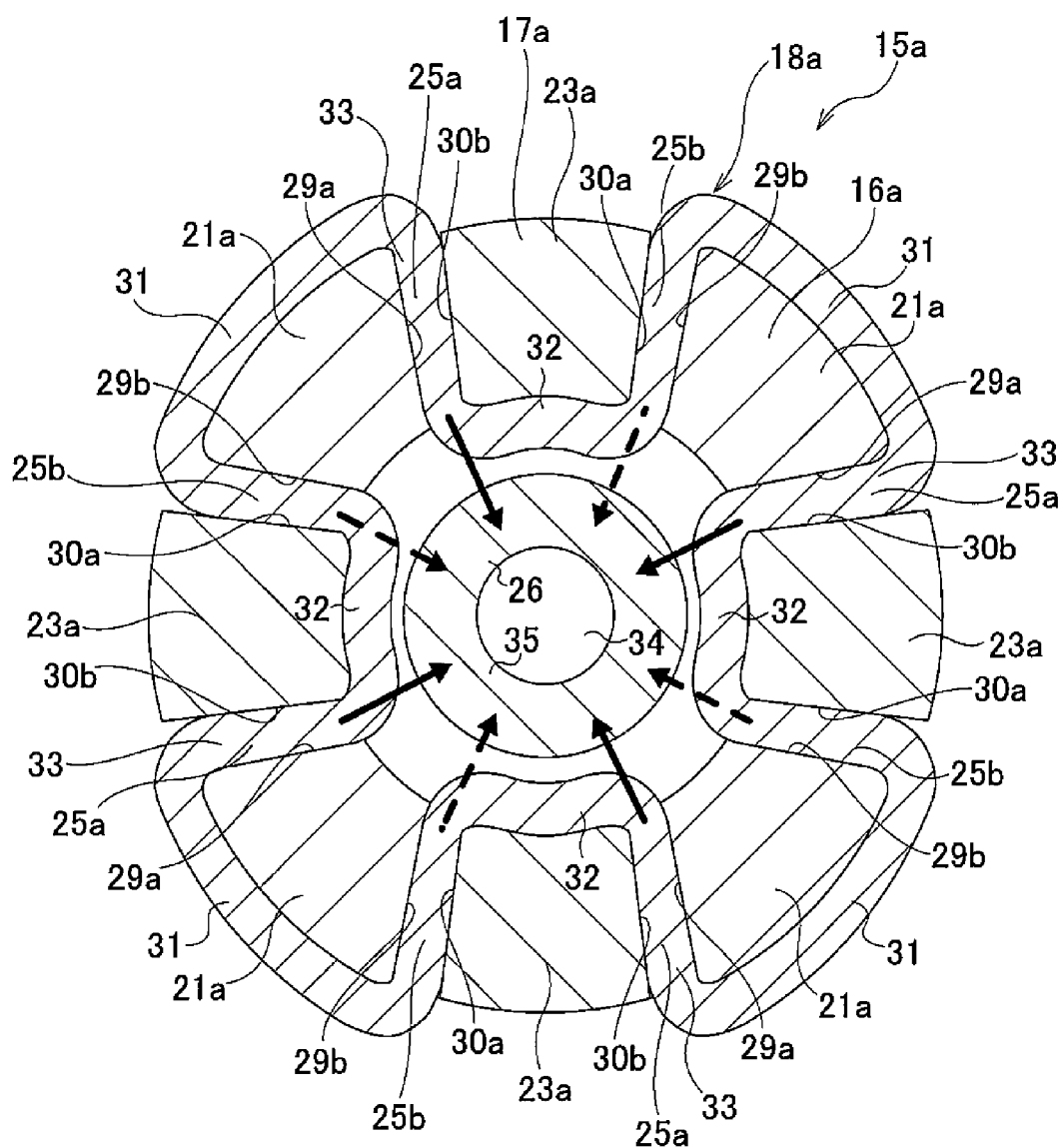
FIG. 3 is an enlarged cross-sectional drawing of section A-A in FIG. 1.
Figure 4:
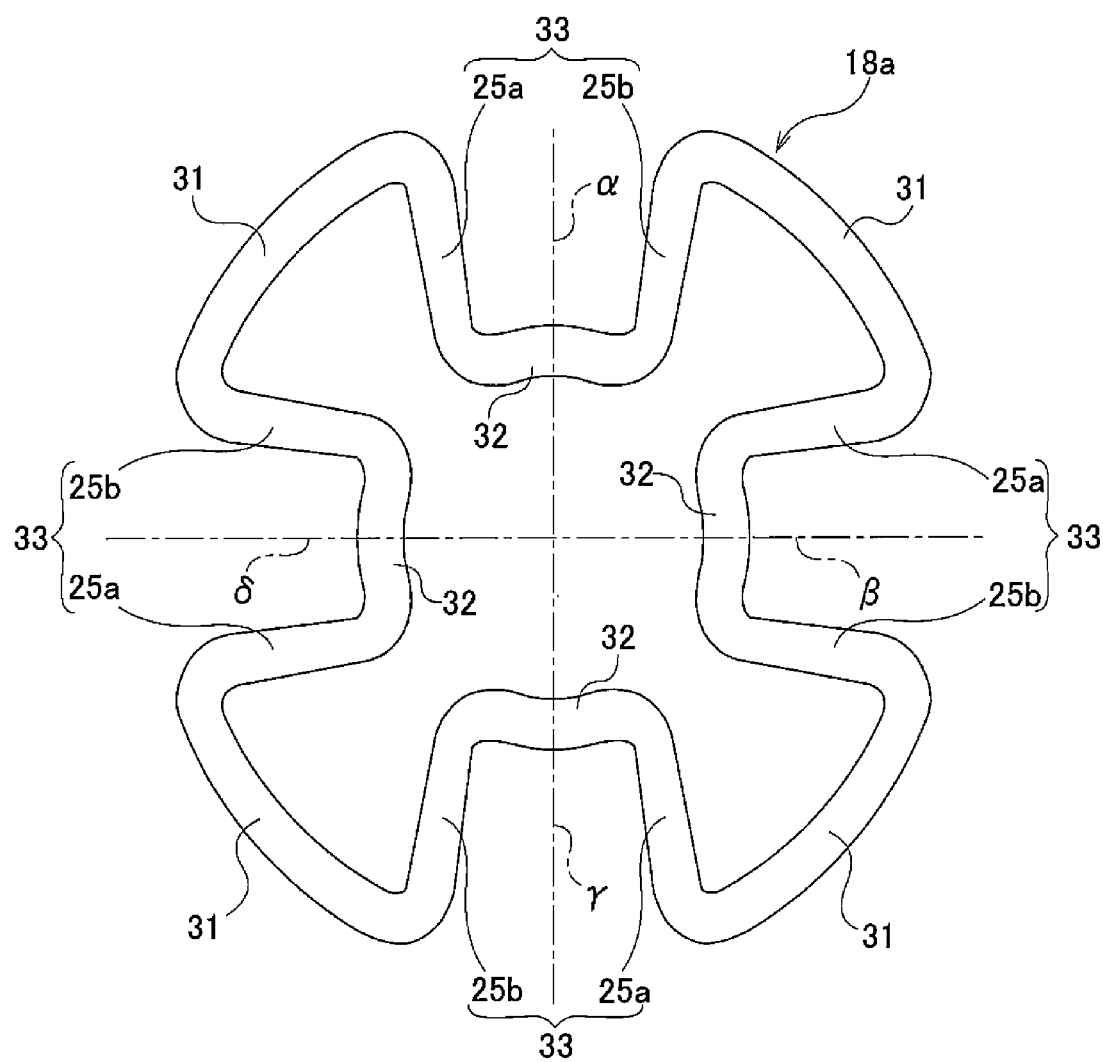
FIG. 4 is an end view illustrating a shock-absorbing member that has been removed from the torque transmission joint illustrated in FIG. 2.

The shock-absorbing member 18a, the drive-side arm sections 21a and the driven-side arm sections 23a are combined as illustrated in FIG. 3. More specifically, the driven-side arm sections 23a are each located between the paired held sections 25a, 25b of the combined held sections 33. Moreover, the drive-side arm sections 21a are each located between the combined held sections 33 that are adjacent to each other in the circumferential direction (between the non-paired held sections 25a, 25b that are adjacent to each other in the circumferential direction but pertain to the different combined held sections 33). As a result, the outer circumferential surfaces of the drive-side arm sections 21a are covered by the outer-diameter side cover sections 31 of the shock-absorbing member 18a, and the inner circumferential surfaces of the driven-side arm sections 23a are covered by the inner-diameter side cover sections 32. In this assembled state, the paired side surfaces 29a, 29b in the circumferential direction of the drive-side arm section 21a, and the paired side surfaces 30a, 30b in the circumferential direction of the driven-side arm sections 23a come in contact over the entire surface or face through a minute gap over the entire surface of the side surfaces in the circumferential direction of the held sections 25a, 25b with respect to the circumferential direction.

The damper member 26 is provided on the inside of the shock-absorbing member 18a between the drive-side arm sections 16a and the driven-side arm sections, and has a metal circular column-shaped support-column section 34, and a main damper section 35 that fits around the middle section in the axial direction of the support-column section 34 so as to be able to displace in the axial direction. The end sections of the support-column section 34 loosely fit inside the drive-side serration hole 27 and the driven-side serration hole 28. Moreover, the main damper section 35 is made of an elastic material such as rubber, synthetic resin or the like, and has a dimension in the axial direction that is greater than the dimension in the axial direction of the shock-absorbing member 18a, drive-side arm sections 21a and driven-side arm sections 23a. The main damper section 35 is inserted into the inner-diameter side of the inner-diameter side cover sections 32 of the shock-absorbing member 18a, and held in the axial direction between surfaces of the drive-side base section 20a and the driven-side base section 22a that face each other. In this example, gaps are provided between both end surfaces of the support-column section 34 and the tip-end surface of the output shaft 12 and the base-end surface of the worm shaft 6a having a size that is large enough to disappear when the main damper unit 35 elastically deforms a certain amount in the axial direction.

In the case of the torque transmission joint 15a and electric power steering apparatus of this example, error such as dimension error and assembly error of components can be effectively absorbed. In other words, in this example, when transmission of torque begins by rotating and driving the output shaft 12a of the electric motor 8, a force inward in the radial direction of the shock-absorbing member 18a acts on the held sections 25a, 25b that are held between the side surfaces 29a, 29b in the circumferential direction of the drive-side arm sections 21a and the side surfaces 30b, 30a in the circumferential direction of the driven-side arm sections 23a.

For example, when the transmission of torque is started by rotating and driving the output shaft 12a in the clockwise direction, four held sections 25a of the shock-absorbing member 18a are held between the side surfaces 29a in the circumferential direction on the front side in the direction of rotation of the drive-side arm sections 21a and the side surfaces 30b in the circumferential direction on the rear side in the direction of rotation of the driven-side arms section 23a. In this case, the side surfaces 29a in the circumferential direction of the drive-side arm sections 21a incline in the direction toward the front in the direction of rotation with respect to the radial direction as going toward the outside in the radial direction, which causes the held sections 25a to be gradually compressed and elastically deform from the portion on the outer-diameter side toward the portion on the inner-diameter side. Then, as illustrated by the solid arrows in FIG. 3, forces inward in the radial direction of the shock-absorbing member 18a act on the held sections 25a.

On the other hand, when the transmission of torque begins by rotating and driving the output shaft 12a in the counter-clockwise direction, four held sections 25b of the shock-absorbing member 18a are held between the side surfaces 29b in the circumferential direction on the front side in the direction of rotation of the drive-side arm sections 21a and the side surfaces 30a in the circumferential direction on the rear side in the direction of rotation of the driven-side arm sections 23a. In this case, the side surfaces 29b in the circumferential direction of the drive-side arm sections 21a incline in the direction toward the front in the direction of rotation with respect to the radial direction as going toward the outside in the radial direction, which causes the held sections 25b to be gradually compressed and elastically deform from the portion on the outer-diameter side toward the portion on the inner-diameter side. Then, as illustrated by the broken arrows in FIG. 3, forces inward in the radial direction of the shock-absorbing member 18a act on the held sections 25b.

Therefore, when the output shaft 12a is rotated and driven clockwise in FIG. 3, the portions near the inner-diameter side end sections of the held sections 25a can be bent inward in the radial direction (into weakly constrained state), and when the output shaft 12a is rotated and driven counterclockwise in FIG. 3, the portions near the inner-diameter side end sections of the held sections 25b can be bent inward in the radial direction (into weakly constrained state). Therefore, in either case, the shock-absorbing member 18a is in a state in which elastic deformation is easier than in the conventional construction. Particularly, in this example, the inner-diameter side end sections of the held sections 25a, 25b are not continuous in the circumferential direction as in the conventional construction, and the inner-diameter side portions of the shock-absorbing member 18a are not continuous in the circumferential direction, so the shock-absorbing member 18a can be put into a state in which elastic deformation is easier. As a result of this kind of construction, error that occurs between the output shaft 12a and the worm shaft 6a can be sufficiently absorbed, and it is possible to improve the transmission efficiency of the overall system of the electric power steering apparatus. However, as long as the feature of the present invention, which is causing an inward force in the radial direction of the shock-absorbing member 18a to act on the held sections 25a, 25b that are held between the side surfaces in the circumferential direction that are located on the front in the direction of rotation of the output shaft 12a of the drive-side arm sections 21a, and the side surfaces in the circumferential direction that are located on the rear in the direction of rotation of the output shaft 12 of the driven-side arm sections 23a, can be obtained, the shape of the shock-absorbing member is not limited to the construction of this example.

Moreover, in this example, it is possible to improve the work efficiency of the inspection process in order to prevent the assembly of the shock-absorbing member 18d from being forgotten. In other words, in a state in which the outer-diameter side cover sections 31 that are continuous with the outer-diameter side end sections of the held sections 25a, 25b of the shock-absorbing member 18a covers the outer circumferential surfaces of the drive-side arm sections 21a, and the torque transmission joint 15a is assembled, the surface area of the portions that are exposed to the outside is sufficiently large. Therefore, it is possible to easily perform a visual check of the shock-absorbing member 18a, and to improve the work efficiency of the inspection process in order to prevent the assembly of the shock-absorbing member 18d from being forgotten.

In this example, the held sections 25a, 25b that are made of an elastic material are located between the side surfaces in the circumferential direction of the drive-side arm sections 21a and the driven-side arm sections 23a that are adjacent to each other in the circumferential direction, so the occurrence of gear rattle is effectively prevented. Furthermore, when a thrust force acts between the output shaft 12a and the worm shaft 6a, the main damper section 35 of the damper member 25 elastically deforms and contracts between the surfaces of the drive-side base section 20a and driven-side base section 22a that face each other, which absorbs part of the thrust force, and transmits the remaining thrust force. Therefore, it is possible to reduce the thrust force that is transmitted between the output shaft 12a and the worm shaft 6a. Moreover, this thrust force is effectively prevented from being transmitted to the shock-absorbing member 18a, making it possible to maintain the durability of the shock-absorbing member 18a over a long period of time.

[Second Example of First Embodiment]

Figure 5:
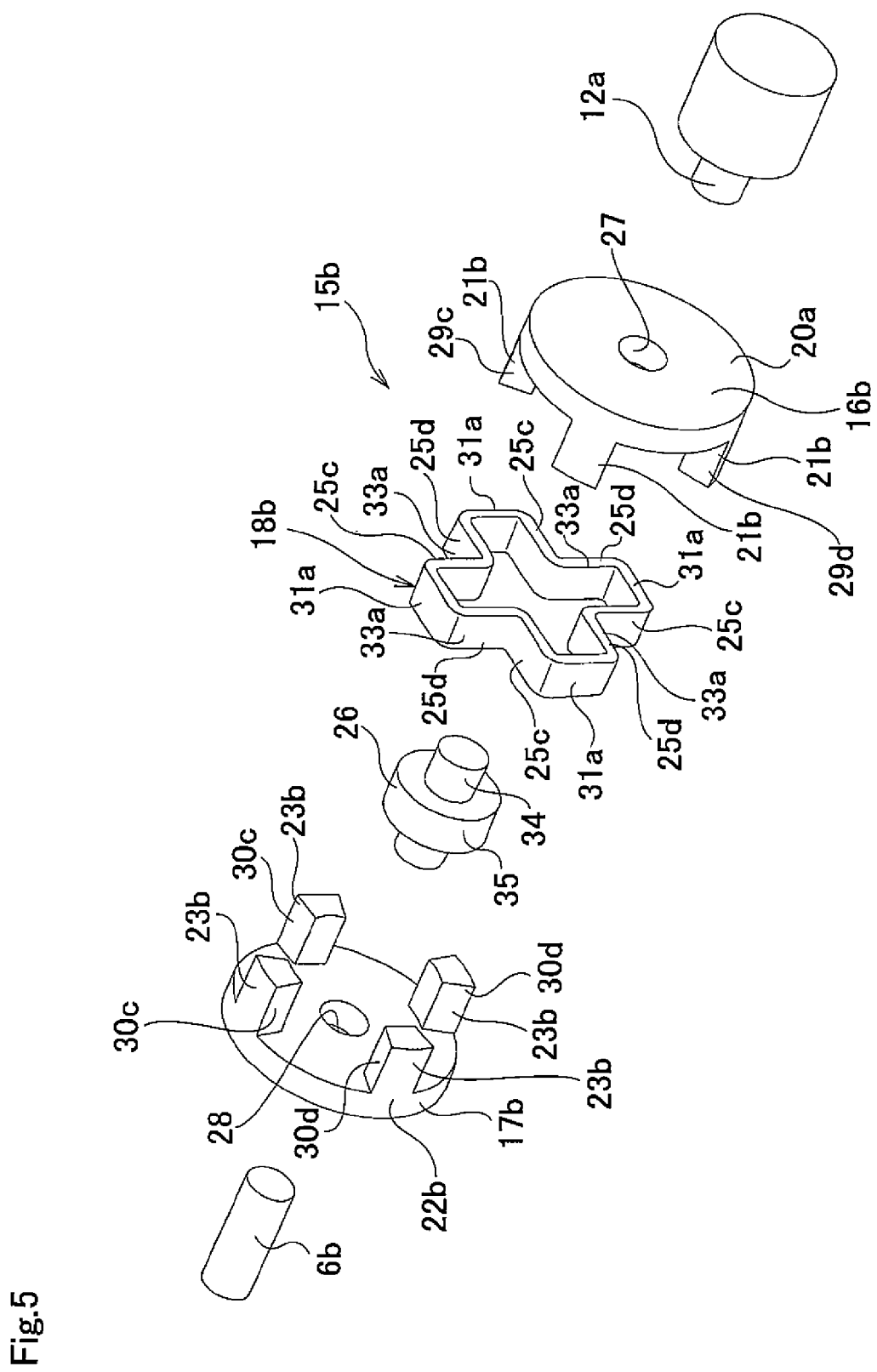
FIG. 5 is an exploded perspective drawing that schematically illustrates a second example of the first embodiment of the present invention.
Figure 6:
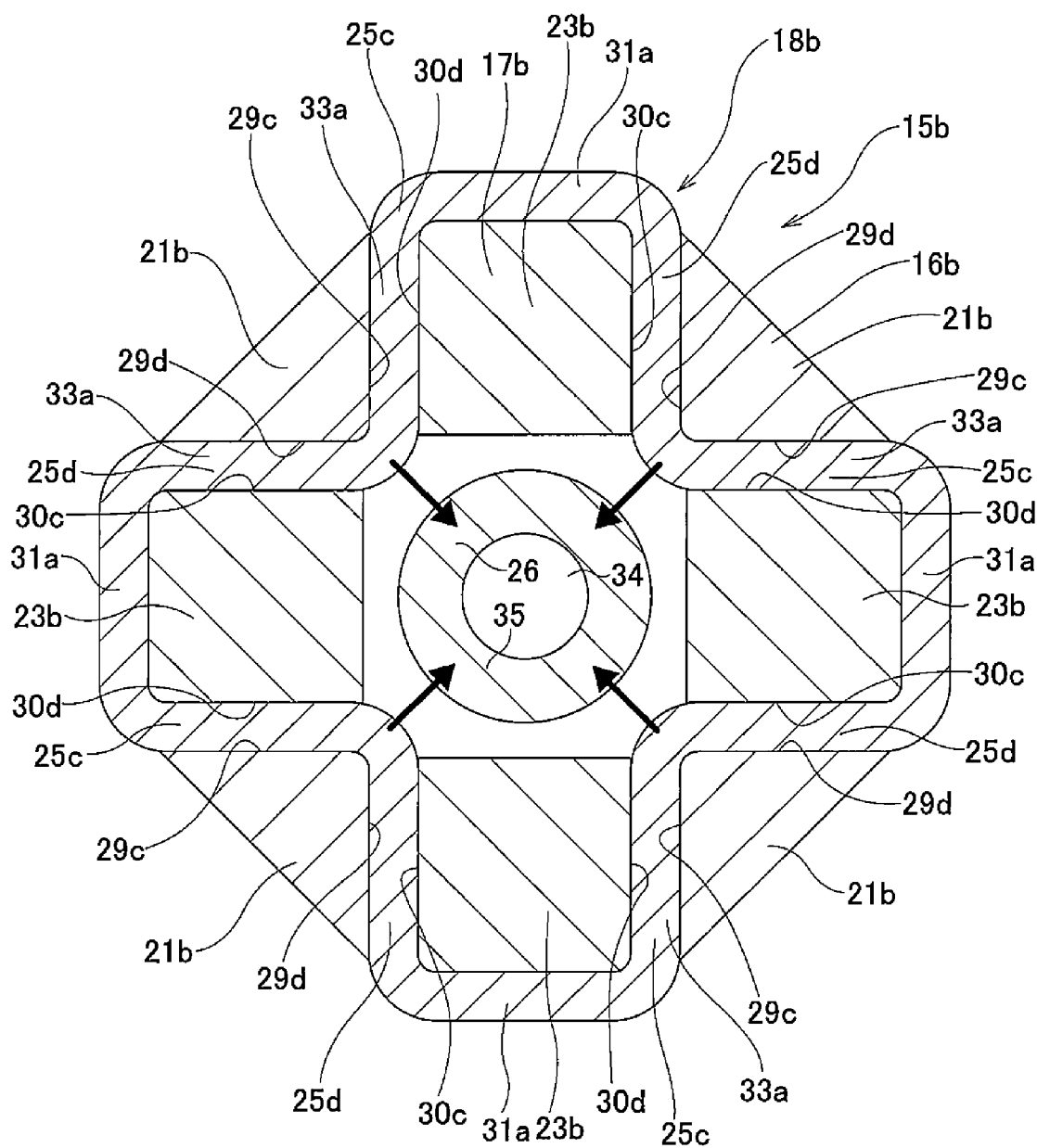
FIG. 6 is a cross-sectional drawing of the second example of the first embodiment, and is similar to FIG. 3.
Figure 7:
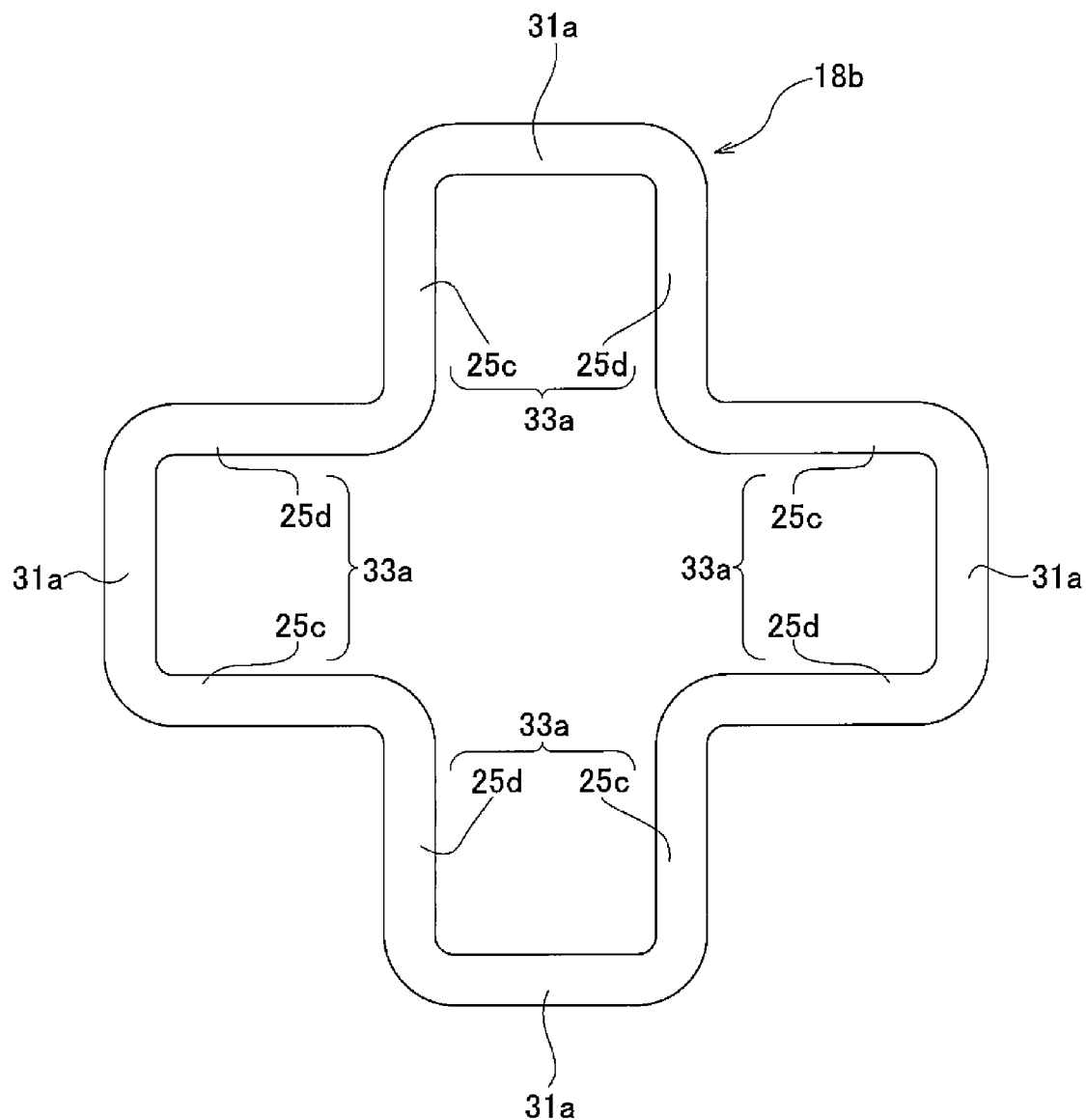
FIG. 7 is an end view illustrating a shock-absorbing member that has been removed from the torque transmission joint illustrated in FIG. 5.

FIG. 5 to FIG. 7 illustrate a second example of the first embodiment of the present invention. The torque transmission joint 15b of this example also has: a drive-side transmission member 16b, a driven-side transmission member 17b, a shock-absorbing member 18b and a damper member 26.

In this example, the four drive-side arm sections 21b that are provided on the drive-side transmission member 16b are such that the inclination angles with respect to the radial direction of the paired side surfaces 29c, 29d in the circumferential direction of each of the drive-side arm sections 21b are increased by the same amount when compared with the first example of the first embodiment. In other words, when the output shaft 12a is rotated and driven, the side surface 29c (29d) in the circumferential direction that is on the front side in the direction of rotation is inclined more toward the front in the direction of rotation with respect to the radial direction as going toward the outside in the radial direction. The angle made between the paired side surfaces 29c, 29d in the circumferential direction is 90 degrees (right angle), and the cross-sectional shape of the drive-side arm sections 21b is a right triangle shape.

The four driven-side arm sections 23 that are provided on the driven-side transmission member 17b are such that the inclination angles in the radial direction of the paired side surfaces 30c, 39d in the circumferential direction are increased by the same amount when compared with the first example of the first embodiment. In other words, when the output shaft 12a is rotated and driven, the side surfaces 30c (30d) in the circumferential surface that are the front side in the direction of rotation are inclined more toward the rear in the direction of rotation with respect to the radial direction as going toward the outside in the radial direction. The paired side surfaces 30c, 30d in the circumferential direction are arranged parallel with each other, and the cross-sectional shape of the driven-side arm sections 23b is a rectangular shape.

Furthermore, the combined held sections 33a of the shock-absorbing member 18b are also such that the inclination angles with respect to the radial direction of each of the paired held sections 25c, 25d are increased by the same amount when compared with the first example of the first embodiment. In other words, when the output shaft 12a is rotated and driven, the held section 25c (25d) that is the front side in the direction of rotation is inclined more toward the rear in the direction of rotation with respect to the radial direction as going toward the outside in the radial direction. In this example, the paired held sections 25c, 25d are arranged parallel with each other. Moreover, the outer-diameter side end sections of each of the paired held sections 25c, 25d that are adjacent to each other in the circumferential direction of the combined held section 33a are continuous by way of an outer-diameter side cover section 31a, which has a flat plate shape (a straight shape such that in the free state the plate thickness is fixed), and the inner-diameter side end sections of each of the non-paired held sections 25c, 25d that are adjacent to each other in the circumferential direction but pertain to the different combined held sections 33a are made to be directly continuous. As a result of this kind of construction, the cross-sectional shape of the shock-absorbing member is a cross cylindrical shape.

The shock-absorbing member 18b and the drive-side arm sections 21b and the driven-side arm sections 23b are assembled as illustrated in FIG. 6. More specifically, the driven-side arm sections 23b are each located between the paired held sections 25c, 25d of the combined held sections 33a. Moreover, the drive-side arm sections 21b are each located between the combined held sections 33a that are adjacent to each other in the circumferential direction (between the non-paired held sections 25c, 25d that are adjacent to each other in the circumferential direction but pertain to the different combined held sections 33a). As a result, the outer circumferential surfaces of the driven-side arm sections 23b are covered by the outer-diameter side cover sections 31a of the shock-absorbing member 18b, and the inner-diameter side end edges of the drive side arm sections 21b are covered by the continuous sections between the inner-diameter side end edges of the held sections 25c, 25d.

In this example, when the output shaft 12a is rotated and driven, the forces inward in the radial direction of the shock-absorbing member 18b that act on the held sections 25c (25d) as illustrated by the solid arrows in FIG. 6 can be increased when compared with the case of the first example of the first embodiment. Therefore, the shock-absorbing member 18a can further be put into a state in which elastic deformation is easier. Consequently, with the construction of this example, it is possible to effectively absorb error such as dimension error or assembly error of components. The other construction and effects are the same as in the first example of the first embodiment.

[Third Example of First Embodiment]

Figure 8:
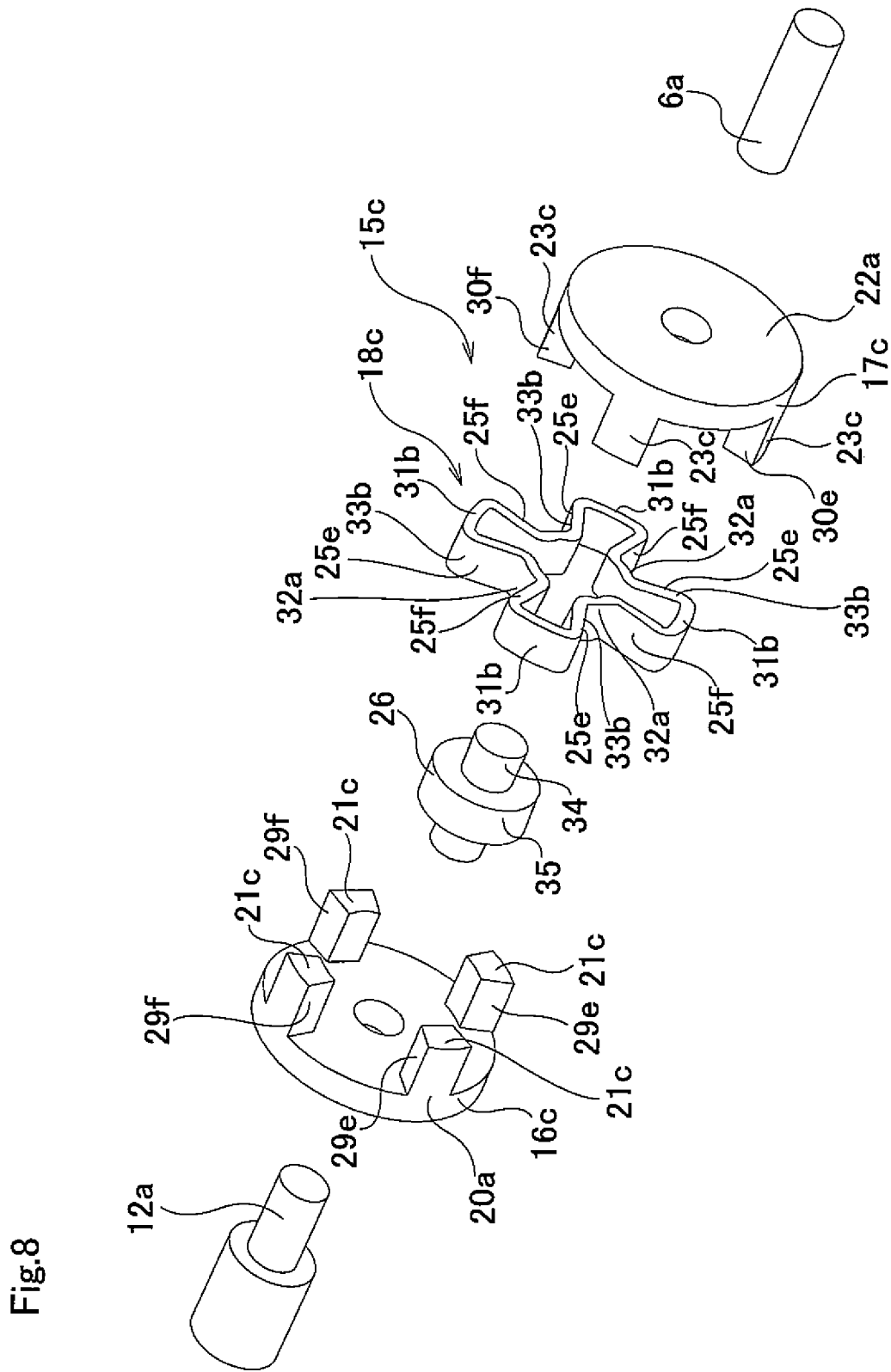
FIG. 8 is an exploded perspective drawing that schematically illustrates a third example of the first embodiment of the present invention.
Figure 9:
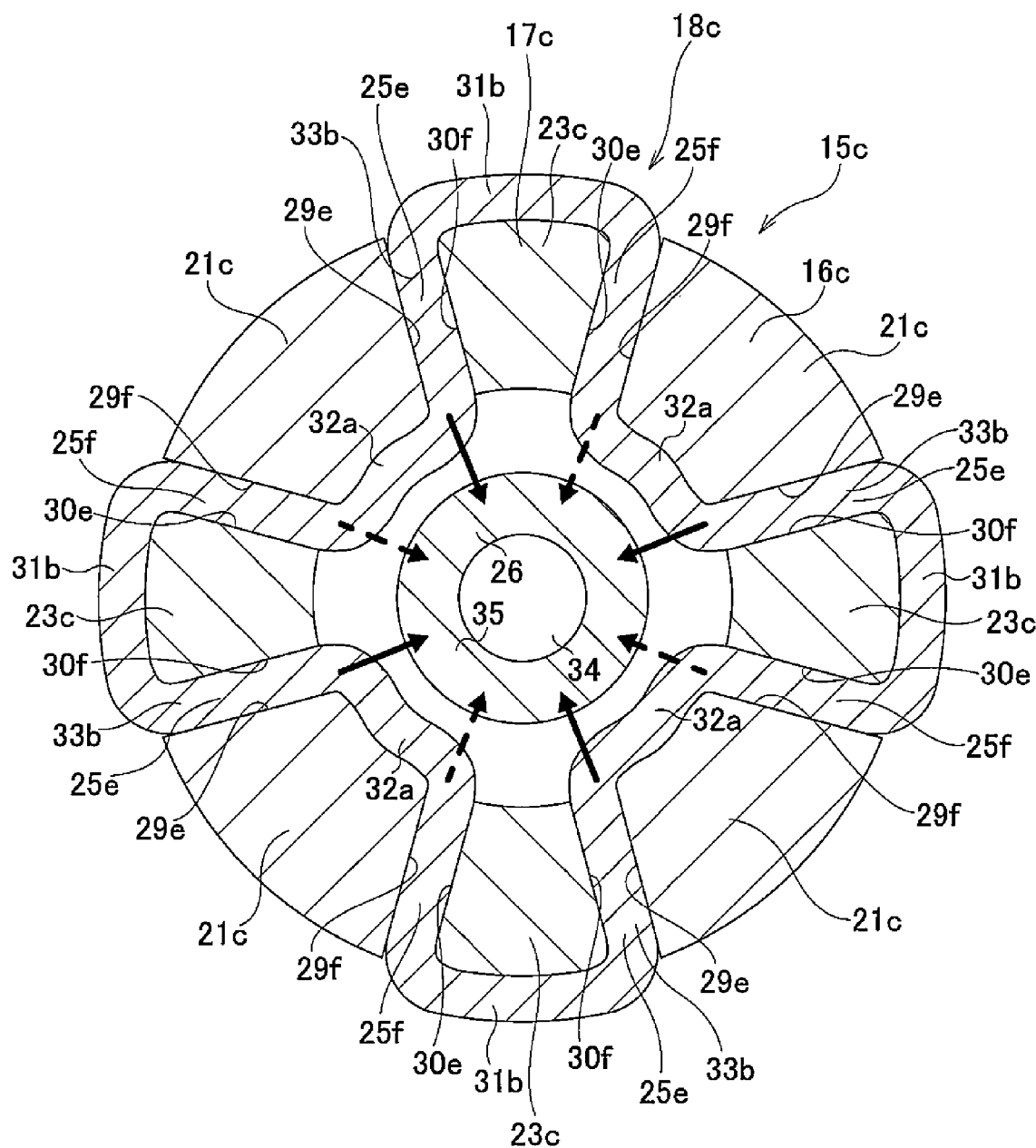
FIG. 9 is a cross-sectional drawing of the third example of the first embodiment, and is similar to FIG. 3.
Figure 10:
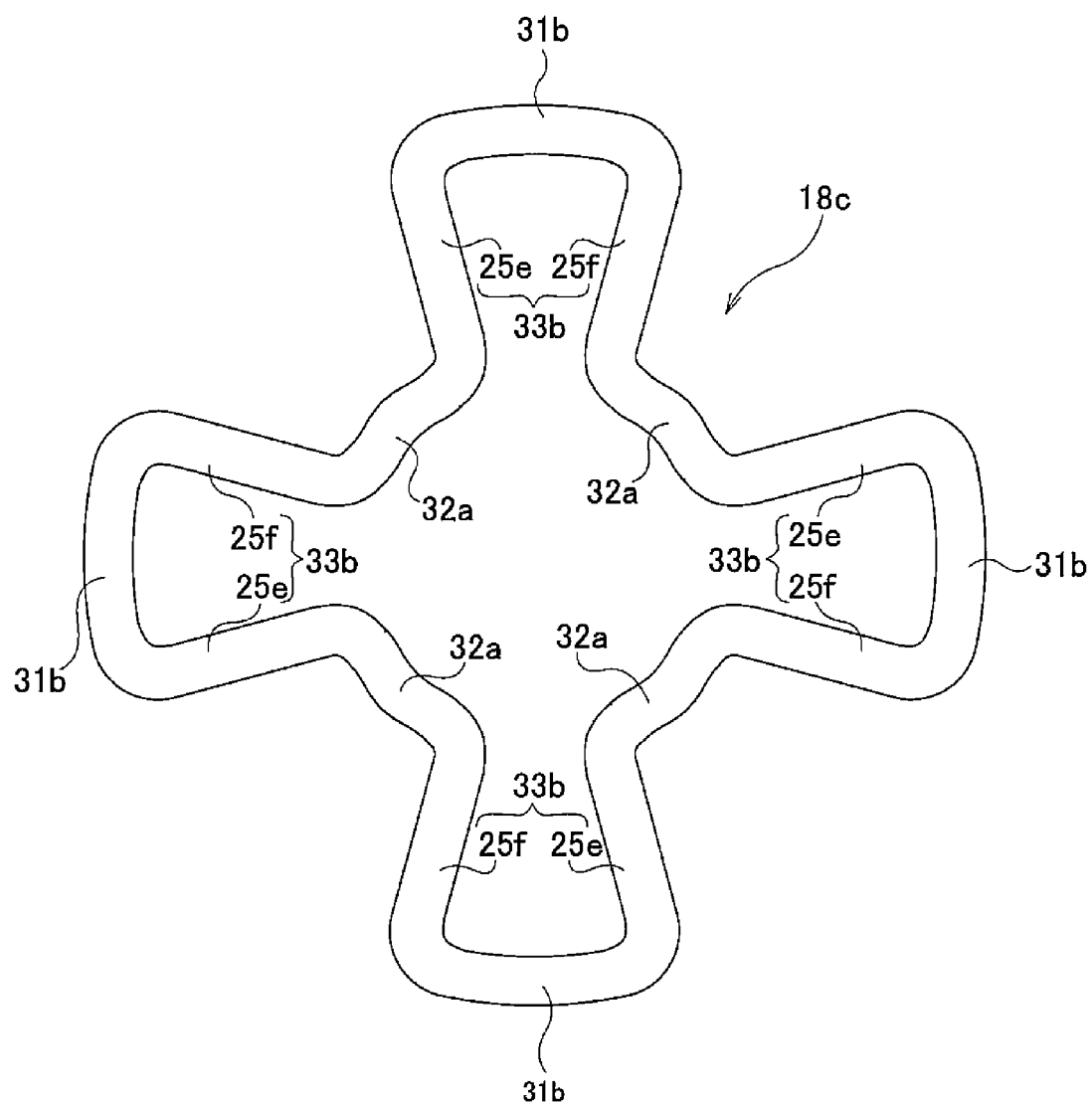
FIG. 10 is an end view illustrating a shock-absorbing member that has been removed from the torque transmission joint illustrated in FIG. 8.

FIG. 8 to FIG. 10 illustrate a third example of the first embodiment of the present invention. The torque transmission joint 15c of this example also has: a drive-side transmission member 16c, a driven-side transmission member 17c, a shock-absorbing member 18c and a damper member 26.

In this example, the four drive-side arm sections 21c that are provided on the drive-side transmission member 16c are such that the inclination angles with respect to the radial direction of the paired side surfaces 29e, 29f in the circumferential direction of the drive-side arm sections 21c are decreased by the same amount when compared with the first example of the first embodiment. In other words, when the output shaft 12a is rotated and driven, the side surface 29e (29f) in the circumferential direction that is on the front side in the direction of rotation is inclined less toward the front in the direction of rotation with respect to the radial direction as going toward the outside in the radial direction. In the example in the figure, the angle made between the paired side surfaces 29e, 29f in the circumferential direction is approximately 60 degrees.

The four driven-side arm sections 23c that are provided on the driven-side transmission member 17c are also such that the inclination angles in the radial direction of the paired side surfaces 30e, 30f in the circumferential direction of each driven-side arm sections 23c are decreased by the same amount when compared with the first example of the first embodiment. In other words, when the output shaft is rotated and driven, the side surfaces 30e (30f) in the circumferential direction that are on the front side in the direction of rotation are inclined less toward the rear in the direction of rotation with respect to the radial direction as going toward the outside in the radial direction.

Furthermore, the combined held sections 33b of the shock-absorbing member 18c are also such that the inclination angles with respect to the radial direction of the paired held sections 25e, 25f are decreased by the same amount when compared with the first example of the first embodiment. In other words, when the output shaft 12a is rotated and driven, the held sections 25e (25f) that are on the front side in the direction of rotation are inclined less toward the rear in the direction of rotation with respect to the radial direction as going toward the outside in the radial direction. The outer-diameter side end sections of the paired held sections 25e, 25f that are adjacent to each other in the circumferential direction of the combined held sections 33b are continuous by way of the outer-diameter side cover sections 31b that have a partial cylindrical shape. Moreover, the non-paired held sections 25e, 25f that are adjacent to each other in the circumferential direction but pertain to the different combined held sections 33b are continuous by way of the inner-diameter side cover sections 32a that have a partial cylindrical shape. As a result of this kind of construction, the cross-sectional shape of the shock-absorbing member 18c is a cross cylindrical shape.

The shock-absorbing member 18c and the drive-side arm sections 21c and the driven-side arm sections 23c are assembled as illustrated in FIG. 9. More specifically, the driven-side arm sections 23c are each arranged between the paired held sections 25e, 25f of the combined held section 33b. Moreover, the drive-side arm sections 21c are each arranged between the combined held sections 33b that are adjacent to each other in the circumferential direction (between the non-paired held sections 25e, 25f that are adjacent to each other in the circumferential direction but pertain to the different combined held sections 33b). As a result, the outer circumferential surfaces of the driven-side arm sections 23c are covered by the outer-diameter side cover sections 31b of the shock-absorbing member 18, and the inner circumferential surfaces of the drive-side arm sections 21c are covered by the inner-diameter side cover sections 32a.

In this example, when the outer shaft 12a is rotated and driven, the forces that act inward in the radial direction of the shock-absorbing member 18c on the held sections 25e (25f) as illustrated by the solid arrows in FIG. 9 are smaller than in the first example of the first embodiment. Therefore, it becomes more difficult for the shock-absorbing member 18c to elastically deform than in the case of the first example of the first embodiment, however, when compared with the conventional construction, sufficient elastic deformation is possible. Consequently, in this example as well, it is possible to effectively absorb error such as dimension error or assembly error of components. Moreover, the outer-diameter side cover sections 31b cover the outer circumferential surfaces of the driven-side arm sections 23c that have a shorter length dimension in the circumferential direction than the drive-side arm sections 21c, so the circumferential length of the shock-absorbing member 18c can be made to be shorter. Therefore, it is possible to reduce the cost of the shock-absorbing member 18c. The other construction and effects are the same as in the first example of the first embodiment.

[Fourth Example of First Embodiment]

Figure 11:
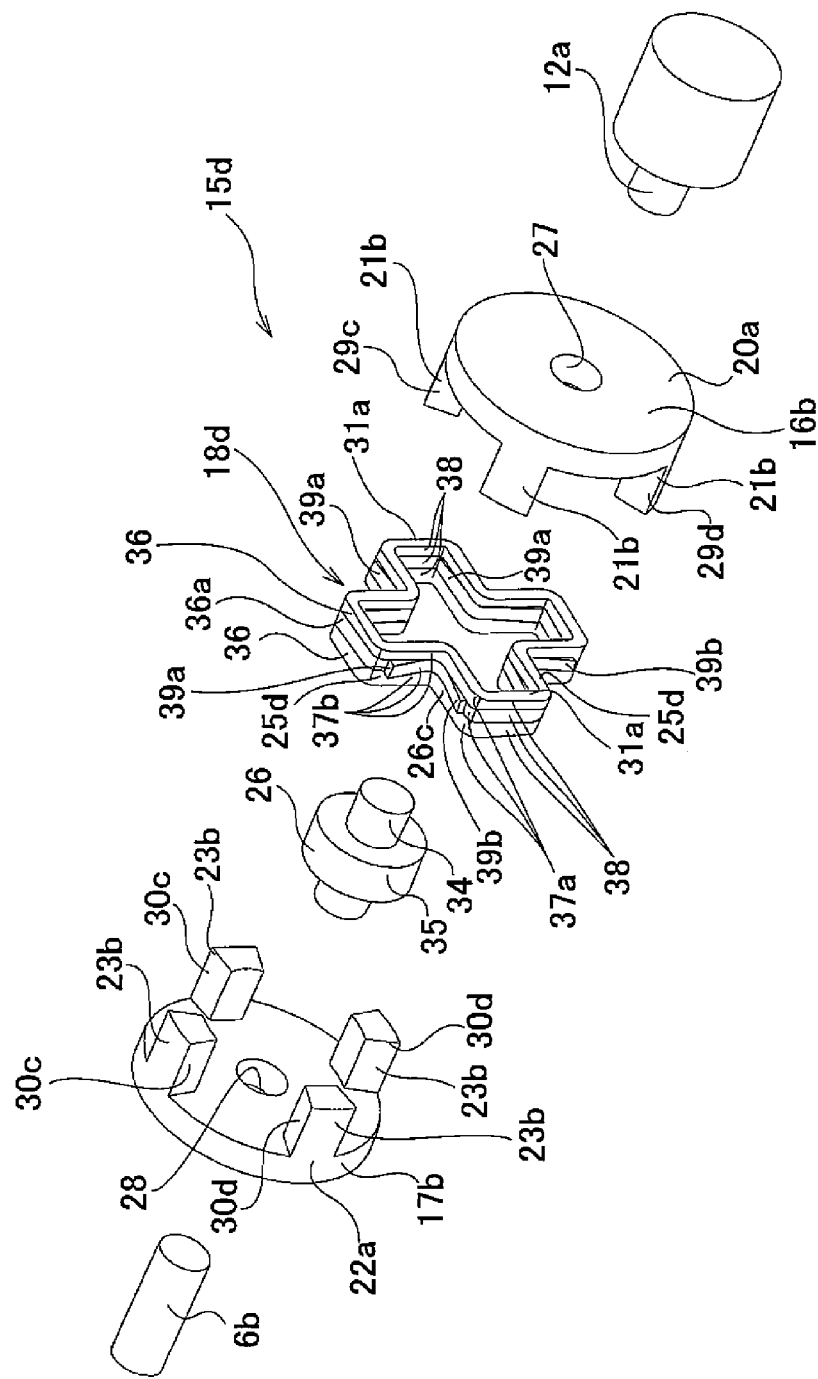
FIG. 11 is an exploded perspective drawing that schematically illustrates a fourth example of the first embodiment of the present invention.
Figure 12:
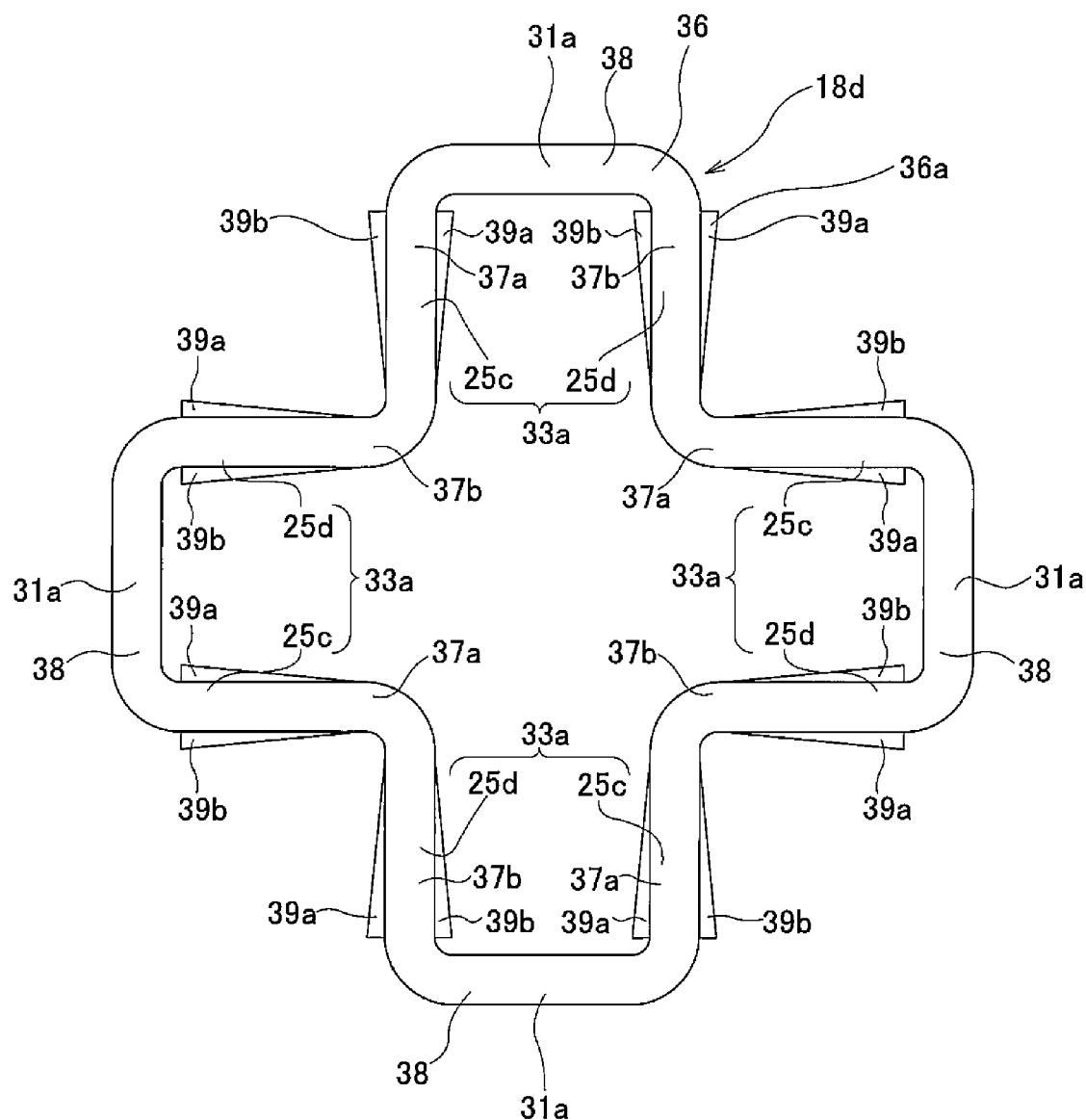
FIG. 12 is an end view illustrating a shock-absorbing member that has been removed from the torque transmission joint illustrated in FIG. 11.
Figure 13:
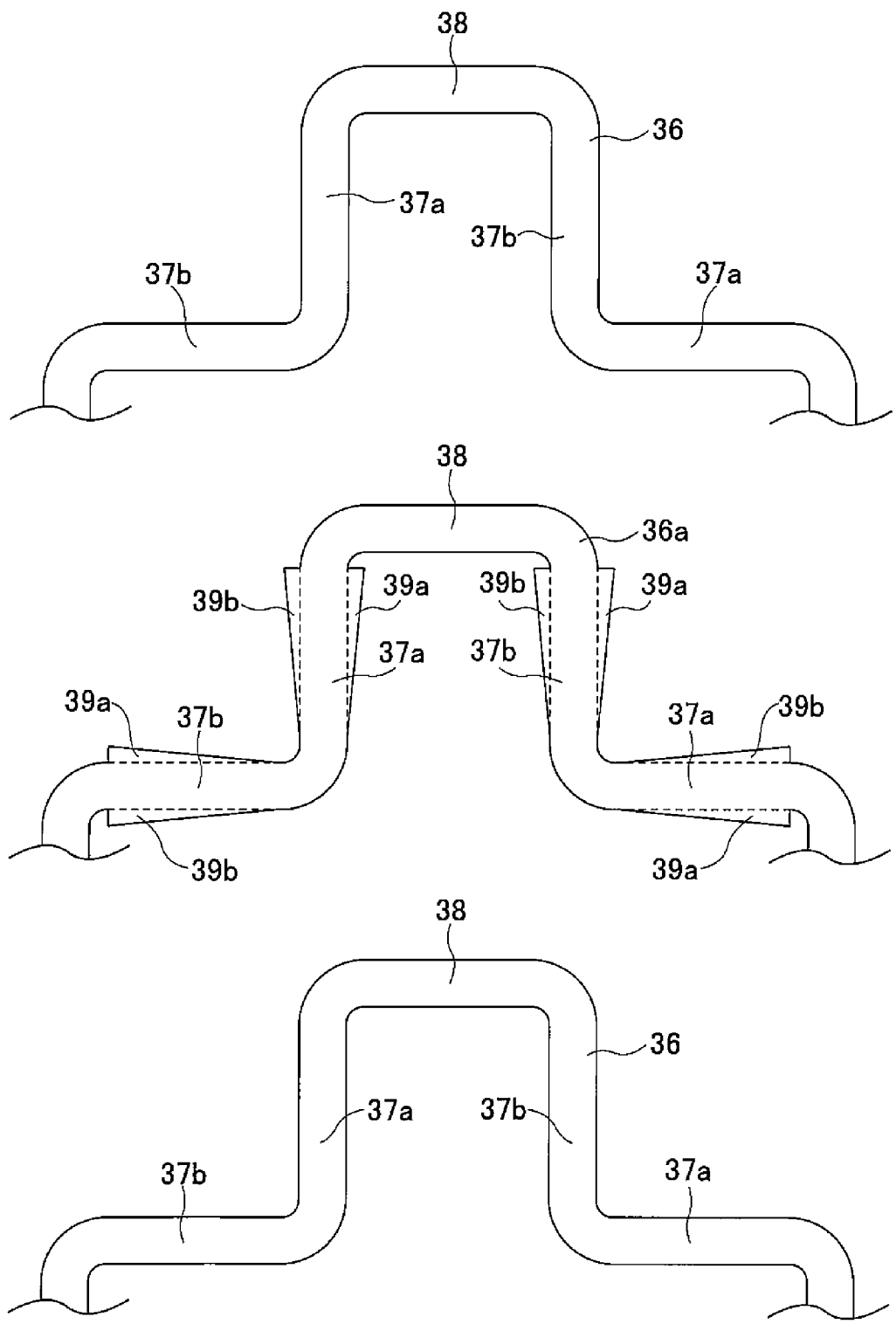
FIG. 13 is a partial end views of three shock-absorbing pieces of the shock-absorbing member illustrated in FIG. 12 that are vertically arranged.

FIG. 11 to FIG. 13 illustrate a fourth example of the first embodiment of the present invention. The feature of this example is that the shock-absorbing member 18d of the torque transmission joint 15d is constructed by layering a plurality of shock-absorbing pieces 36, 36a in the axial direction instead of being integrally formed in one piece.

In this example, the shock-absorbing member 18d is constructed by layering in the axial direction three shock-absorbing pieces 36, 36a that have a shape in which the shock-absorbing member 18b that was used in the second example of the first embodiment is divided into three (three slices) in the axial direction. Each of the shock-absorbing pieces 36, 36a are layered in the axial direction and have: held pieces 37a, 37b (four held pieces 37a and four held pieces 37b) that form held sections 25c, 25d in the layered state in the axial direction, and outer-diameter side cover pieces 38 that form outer-diameter side cover sections 31a in the layered state in the axial direction.

In this example, the shock-absorbing pieces 36a that are arranged in the center in the axial direction are formed using a material that elastically deforms more easily than the pair of shock-absorbing pieces 36 that are arranged on both sides in the axial direction. More specifically, the shock-absorbing pieces 36a are manufactured using a material that elastically deforms easily such as rubber or an elastomer, and the shock-absorbing pieces 36 are manufactured using a synthetic resin such as a polyacetal resin or polyamide resin for which elastic deformation is more difficult than rubber or an elastomer.

Moreover, one each of swollen sections 39a, 39a that protrude out in the circumferential directions are provide for each held pieces 37a, 37b of the shock-absorbing pieces 36a that are manufactured using a material that elastically deforms easily. In this example, the cross-sectional shape of these swollen sections 39a, 39b is a right triangular shape, such that the side of the swollen sections 39a, 39b with the large protruding amount in the circumferential direction is arranged on the outer-diameter side of the held pieces 37a, 37b. When the shock-absorbing member 18d, and the drive-side arm sections 21b and the driven-side arm sections 23b are assembled, part of the swollen sections 39a, 39b are elastically compressed between the side surfaces 29c, 29d in the circumferential direction of the drive-side arm sections 21b and the side surfaces 30c, 30d in the circumferential direction of the driven-side arm sections 23b.

In this example, when transmission of torque begins, first, the held pieces 37a, 37b of the shock-absorbing pieces 26a that are arranged in the center in the axial direction and that are manufactured using a material that elastically deforms easily are held between the side surfaces 29c, 29d in the circumferential direction of the drive-side arm sections 21b and the side surfaces 30c, 30d in the circumferential direction of the driven-side arm sections 23b. Then, after the held pieces 37a, 37b (swollen sections 39a, 39b) of the shock-absorbing pieces 36a have elastically deformed by a specified amount, the held pieces 37a, 37b of the shock-absorbing pieces 36 that are arranged on both sides in the axial direction are held. Therefore, the timing at which the held pieces 37a, 37b of the shock-absorbing pieces 36, 36a are held differs between the plurality of shock-absorbing pieces 36, 36a. Consequently, from the instant when torque transmission begins, the damper effect that prevents large torque from being transmitted can be increased.

Furthermore, when the shock-absorbing member 18d is assembled, by providing the swollen sections 39a, 39b, it is possible to give the shock-absorbing 18d interference with respect to the drive-side transmission member 16b and driven-side transmission member 17b. Therefore, the shock-absorbing member 18d is effectively prevented from becoming loose with respect to the drive-side transmission member 16b and the driven-side transmission member 17b, and thus it is possible to stably transmit torque. The other construction and effects are the same as in the second example of the first embodiment.

[Fifth Example of First Embodiment]

Figure 14:
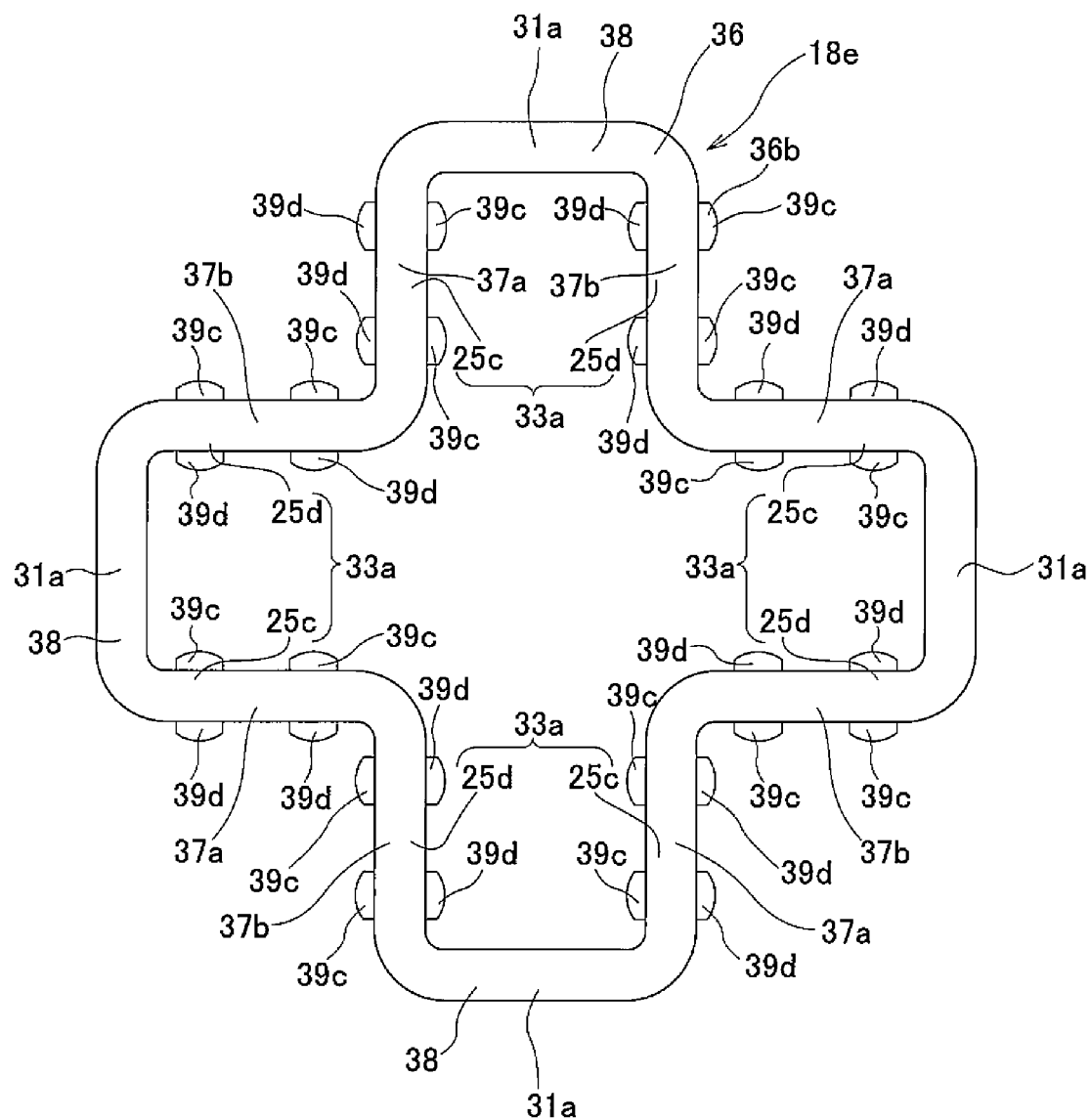
FIG. 14 is an end view of a shock-absorbing member of a torque transmission joint of a fifth example of the first embodiment of the present invention.
Figure 15:
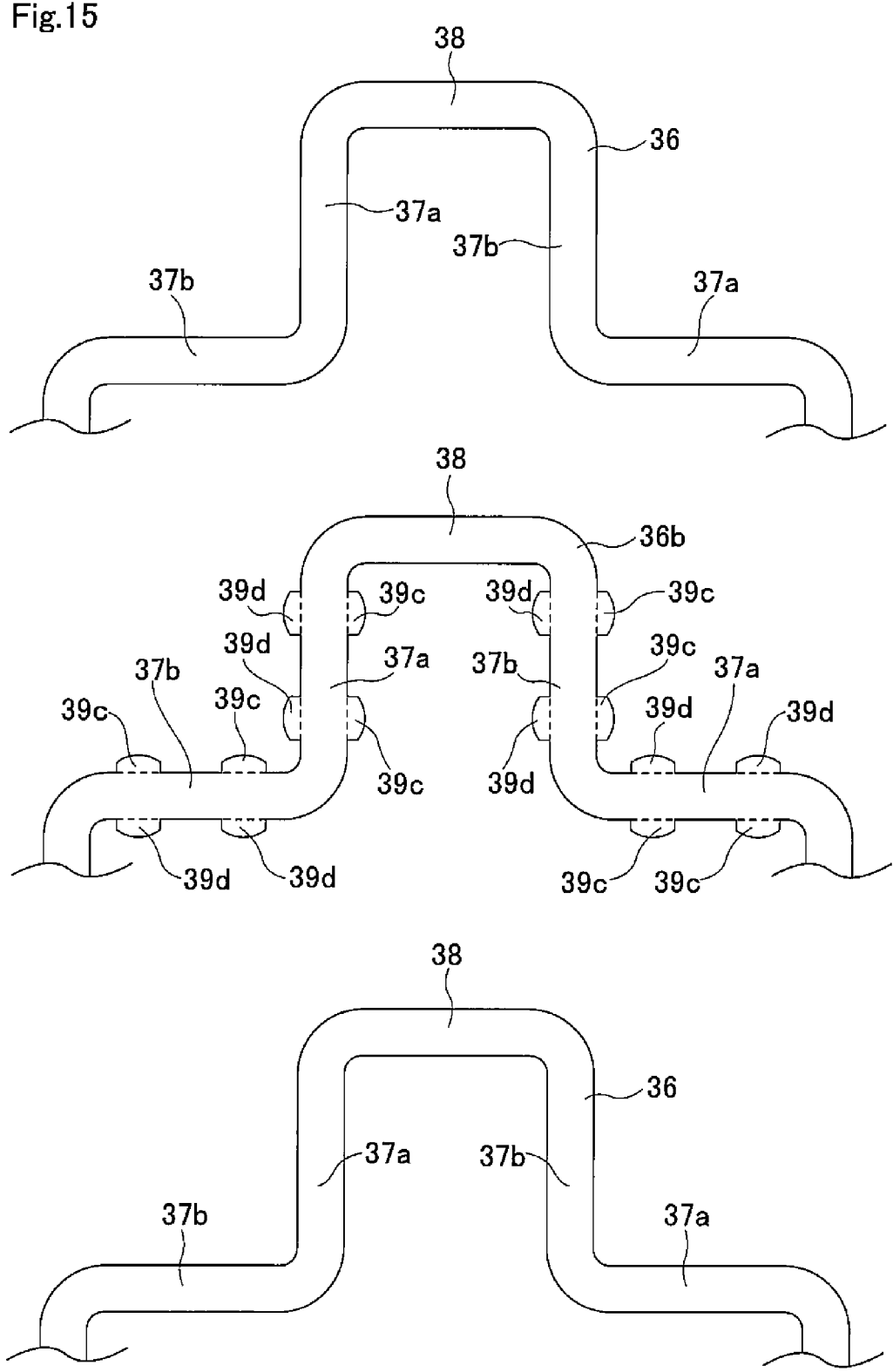
FIG. 15 is a drawing similar to FIG. 13 of shock-absorbing pieces of the shock-absorbing member illustrated in FIG. 14.

FIG. 14 and FIG. 15 illustrate a fifth example of the first embodiment of the present invention. In this example, of the three shock-absorbing pieces 36, 36b that are layered in the axial direction to form the shock-absorbing member 18e, the shape and number of swollen sections 39c, 39d that are formed on the shock-absorbing piece 36b that is arranged in the center in the axial direction differ from in the fourth example of the first embodiment.

In this example, two each of swollen sections 39c, 39d that protrude out in the circumferential direction are provided on both side surfaces in the circumferential direction of the held pieces 37a, 37b of the shock-absorbing piece 36b. More specifically, two swollen sections 39c that are separated from each other are provided in portions near the inner diameter and portions near the outer diameter on one side surface in the circumferential direction of the held pieces 37a, 37b, two swollen sections 39d that are separated from each other are provided in portions near the inner diameter and portions near the outer diameter on the other side surface in the circumferential direction of the held pieces 37a, 37b. Moreover, the cross-sectional shape of the swollen sections 39c, 39d is an arc shape or D shape on the side surfaces in the circumferential direction.

In this example, each of the two swollen sections 39c, 39d are provided so as to be separated from each other, so these swollen sections 39c, 39d can elastically deform independently. Therefore, adjustment of the elastic can be performed easily, and it is possible to obtain a more stable elastic force. The other construction and effects are the same as in the second to fourth examples of the first embodiment.

[Sixth Example of First Embodiment]

Figure 16:
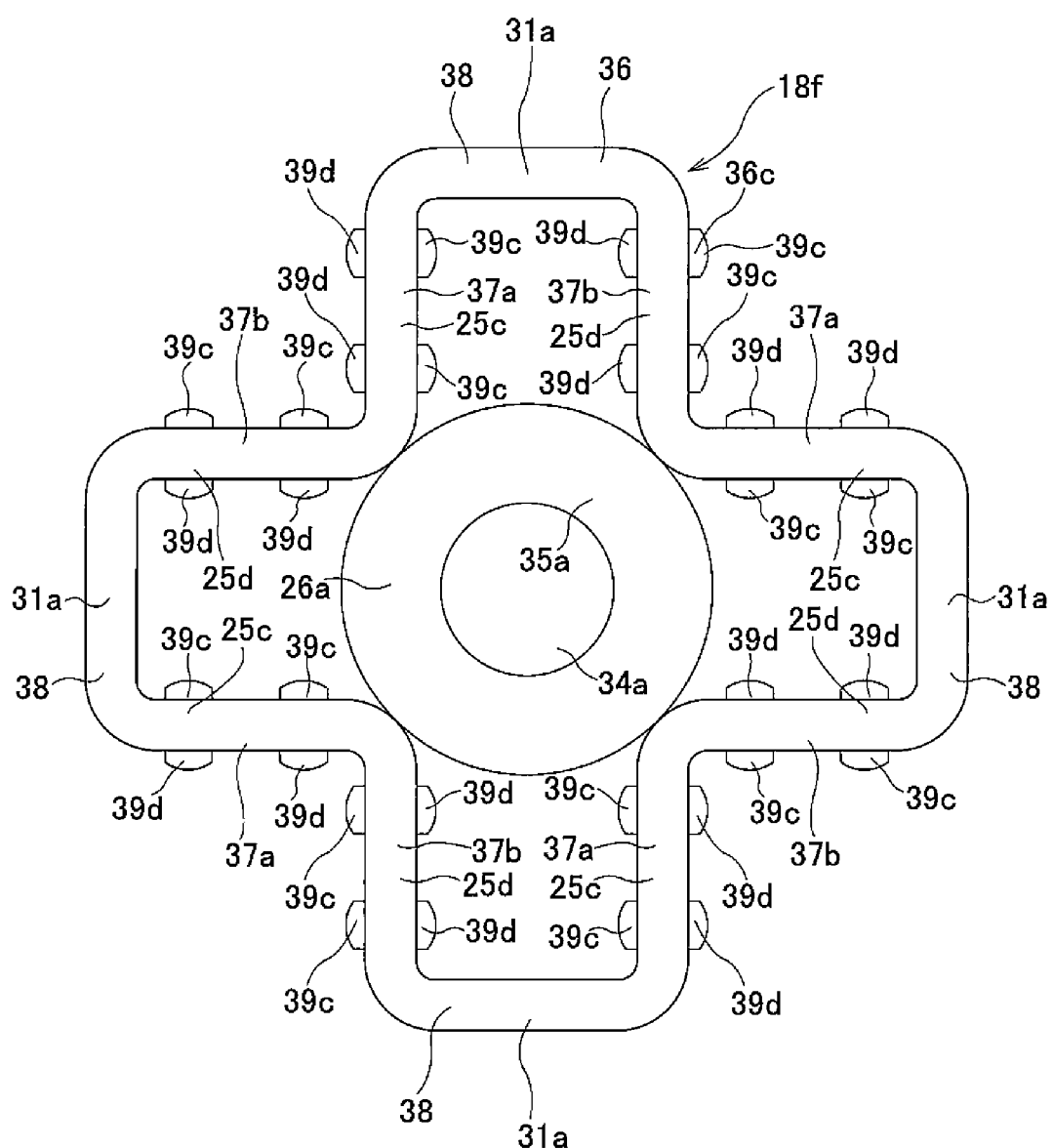
FIG. 16 is an end view of a shock-absorbing member of a torque transmission joint of a sixth example of the first embodiment of the present invention.
Figure 17:
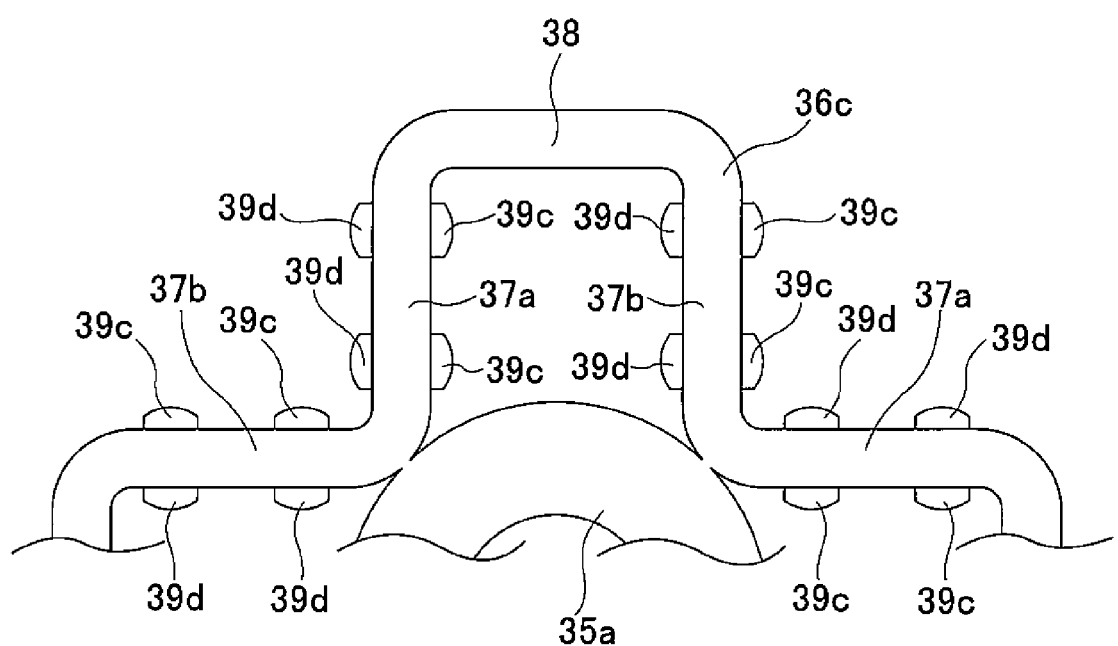
FIG. 17 is a partial end view of a shock-absorbing piece that is arranged in the center in the axial direction of the shock-absorbing member illustrated in FIG. 16.

FIG. 16 and FIG. 17 illustrate a sixth example of the first embodiment of the present invention. The feature of this example is that, of the shock-absorbing pieces 36, 36c that are layered in the axial direction to form the shock-absorbing member 18f, the shock-absorbing piece 36c that is arranged in the center in the axial direction is integrated with the main damper section 35a of the damper member 26a.

The damper member 26a has a metal circular column shaped support-column section 34a, and a cylindrical shaped main damper section 35a that is made of an elastic material such as rubber, an elastomer or the like and that fits around the middle section in the axial direction of the support-column section 34a so as to be able to displace in the axial direction. The main damper section 35a is integrally formed with the shock-absorbing piece 36c such that the outer circumferential surface of the middle section in the axial direction of the main damper section 35a and the continuous sections between held pieces 37a, 37b of the shock-absorbing piece 36c are continuous at four locations that are uniformly separated in the circumferential direction. This shock-absorbing piece 36c and the main damper section 35a having this kind of integrated construction are formed at the same time by injection molding.

In this example as well, the dimension in the axial direction of the main damper section 35a is set to be greater than the dimension in the axial direction of the shock-absorbing member 18f and the drive-side arm sections 21b and the driven-side arm sections 23b. Therefore, the main damper section 35a is held in the axial direction between the surfaces of the drive-side base section 20a and the driven-side base section 22a that face each other. Moreover, the support-column section 34a is such that the end sections loosely fit inside the drive-side serration hole 27 and the driven-side serration hole 28.

In this example, the main damper section 35a of the damper member 26a and the shock-absorbing pieces 36a of the shock-absorbing member 18f are integrally formed, so when compared with the case in which these members are independently formed, it is possible to reduce the number of parts and reduce the accompanying costs, and it is also possible to reduce the number of manufacturing and assembly steps and reduce the accompanying costs. Moreover, the installation position of the main damper section 35a is regulated by the shock-absorbing member 18f (shock-absorbing piece 36c), so it is possible to stabilize the function for absorbing the thrust force that is demonstrated by the damper member 26a. In this example, it is possible to regulate the installation position of the damper member 26a by using the shock-absorbing member 18f, so it is also possible to eliminate the support-column section 34a from the damper member 26a. The other construction and effects are the same as in the fourth and fifth example of the first embodiment.

[Seventh Example of First Embodiment]

Figure 18:
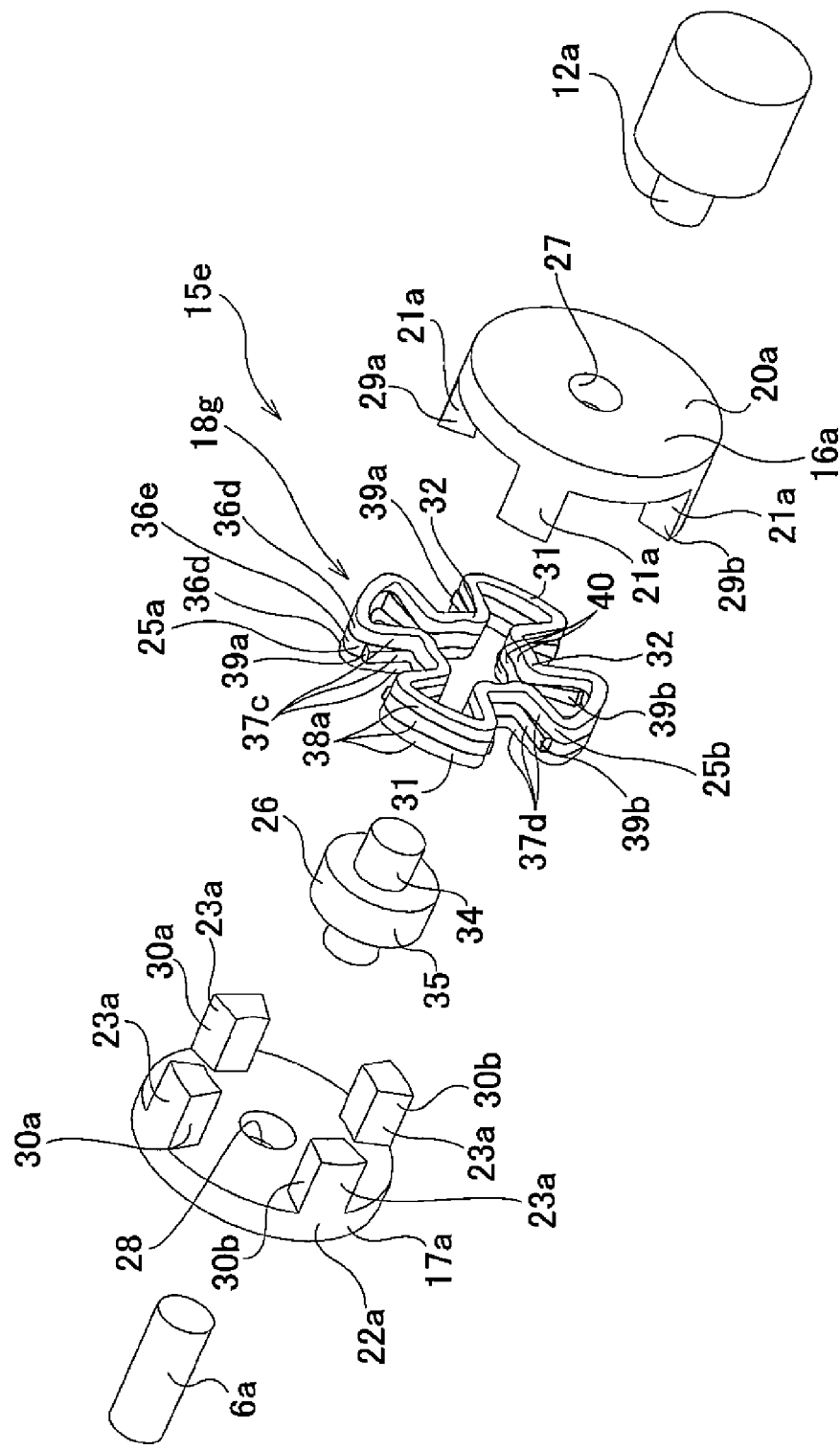
FIG. 18 is an exploded perspective drawing that schematically illustrates a torque transmission joint of a seventh example of the first embodiment of the present invention.

FIG. 18 illustrates a seventh example of the first embodiment of the present invention. In this example, the shock-absorbing member 18g of the torque transmission joint 15e is constructed by layering in the axial direction three shock-absorbing pieces 36d, 36d having a shape in which the shock-absorbing member 18a that was used in the first example of the first embodiment is divided into three. Each of these shock-absorbing pieces 36d, 36e have: held pieces 37c, 37d (four held pieces 37c and four held pieces 37d) that are layered in the axial direction to form the held sections 25a, 25b; outer-diameter side cover pieces 38a that are layered in the axial direction to form the outer-diameter side cover sections 31; and inner-diameter side cover pieces 40 that are layered in the axial direction to form the inner-diameter side cover sections 32.

In this example as well, when compared with the pair of shock-absorbing pieces 36d that are arranged on both sides in the axial direction, the shock-absorbing piece 36e that is arranged in the center in the axial direction is manufactured using a material that elastically deforms more easily. More specifically, together with manufacturing the shock-absorbing piece 36e using a material that elastically deforms easily such as rubber or an elastomer, the shock-absorbing pieces 36d are manufactured using a synthetic resin such as polyacetal resin or polyamide resin for which elastic deformation is more difficult than rubber or an elastomer.

Moreover, one each of swollen sections 39a, 39b that protrude outward in the circumferential direction are provided on both side surfaces in the circumferential direction of the held pieces 37c, 37d of the shock-absorbing piece 36e. In this example as well, the cross-sectional shape of these swollen sections 39a, 39b are a right triangular shape; and of these swollen sections 39a, 39b, the side with the large protruding amount in the circumferential direction is located on the outer-diameter side of the held pieces 37c, 37d.

In this example, as in the fourth example of the first embodiment, it is possible to increase the damper effect, and it is also possible to prevent looseness of the shock-absorbing member 18g. Instead of the swollen section 39a, 39b having the construction of this example, it is also possible to employ the swollen sections 39c, 39d having the construction of the fifth example of the first embodiment, or as in the case of the sixth example of the first embodiment, the shock-absorbing piece 36e can be integrally formed with the main damper section 35 of the damper member 26. The other construction and effects are the same as in the first example and fourth example of the first embodiment.

[Eighth Example of First Embodiment]

Figure 19:
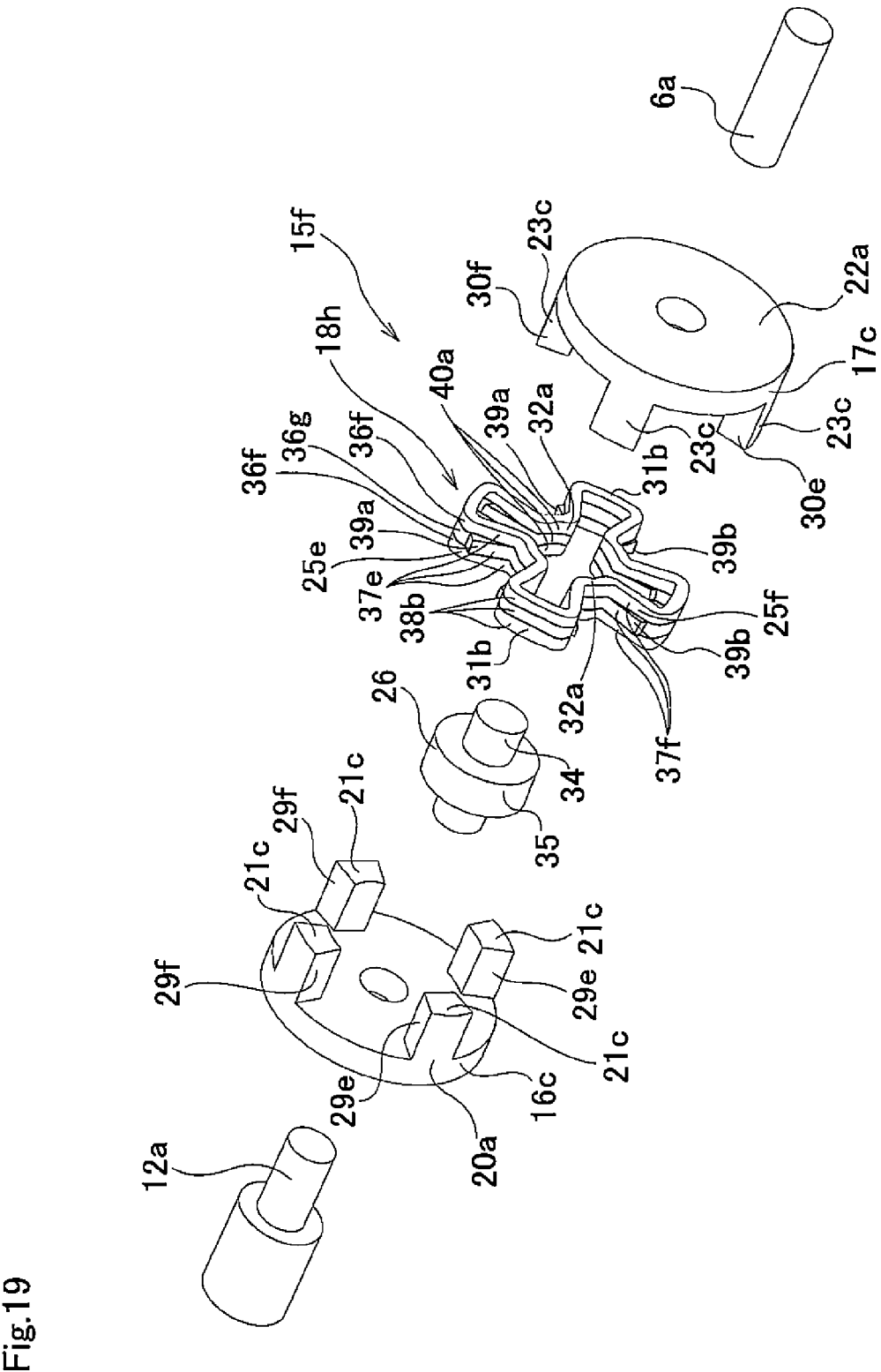
FIG. 19 is an exploded perspective drawing that schematically illustrates a torque transmission joint of an eighth example of the first embodiment of the present invention.

FIG. 19 illustrates an eighth example of the first embodiment of the present invention. In this example, the shock-absorbing member 18h of the torque transmission joint 15f is constructed by layering in the axial direction three shock-absorbing pieces 36f, 36g having a shape in which the shock-absorbing member 18c that was used in the third example of the first embodiment is divided into three. Each of these shock-absorbing pieces 36f, 36g have: held pieces 37e, 37f (four held pieces 37e and four held pieces 37f) that are layered in the axial direction to form the held sections 25e, 25f; outer-diameter side cover pieces 38b that are layered in the axial direction to form the outer-diameter side cover sections 31b, and inner-diameter side cover pieces 40a that are layered in the axial direction to form the inner-diameter side cover sections 32a.

In this example as well, when compared with the pair of shock-absorbing pieces 36f that are arranged on both sides in the axial direction, the shock-absorbing piece 36g that is arranged in the center in the axial direction is manufactured using a material that elastically deforms more easily. More specifically, together with manufacturing the shock-absorbing piece 36g using a material that elastically deforms easily such as rubber or an elastomer, the shock-absorbing pieces 36f are manufactured using a synthetic resin such as polyacetal resin or polyamide resin for which elastic deformation is more difficult than rubber or an elastomer.

Moreover, one each of swollen sections 39a, 39b that protrude outward in the circumferential direction are provided on both side surfaces in the circumferential direction of the held pieces 37e, 37f of the shock-absorbing piece 36g. In this example as well, the cross-sectional shape of these swollen sections 39a, 39b is a right triangular shape; and of these swollen sections 39a, 39b, the side with the large protruding amount in the circumferential direction is located on the outer-diameter side of the held pieces 37e, 37f.

In this example, as in the fourth example of the first embodiment, it is possible to increase the damper effect, and it is also possible to prevent looseness of the shock-absorbing member 18h. Instead of the swollen section 39a, 39b having the construction of this example, it is also possible to employ the swollen sections 39c, 39d having the construction of the fifth example of the first embodiment, or as in the case of the sixth example of the first embodiment, the shock-absorbing piece 36g can be integrally formed with the main damper section 35 of the damper member 26. The other construction and effects are the same as in the third example and fourth example of the first embodiment.

In this first embodiment, in the fourth example to the eighth example, the shock-absorbing member has three shock-absorbing pieces, however, the number of shock-absorbing pieces is not limited to this, and it is possible to construct the shock-absorbing member using two shock-absorbing pieces, or it is also possible to construct the shock-absorbing member using four or more shock-absorbing pieces. It is possible to manufacture all of these shock-absorbing pieces of the shock-absorbing member using the same material, and it is also possible to manufacture all of these shock-absorbing pieces using mutually different materials. Moreover, the cross-sectional shape of the swollen sections is not limited to a right triangular shape or D shape, and it is possible to use various shapes such as a semicircular shape or a trapezoidal shape. Furthermore, this first embodiment can be embodied using a suitable combination of the construction of each of the examples.

[Example of Second Embodiment]

FIG. 20 to FIG. 35 illustrate an example of a second embodiment of the present invention. The torque transmission joint of this example has: a drive-side transmission member 16d that is supported by the tip-end section of an output shaft 12a as a drive shaft so as to be concentric with the tip-end section and not to rotate relative to the tip-end section; a driven-side transmission member 17 that is supported by the base-end section of a worm shaft 6a as a driven shaft so as to be concentric with the base-end section and not to rotate relative to the base-end section; a shock-absorbing member 18i that is provided between the drive-side transmission member 16d and the driven-side transmission member 17d; and a damper member 26b.

The drive-side transmission member 16d is made of metal and has a drive-side base section 20b, and four drive-side arm sections 21c. A drive-side serration hole 27 that engages with a serration fit with a male serration section that is formed around the outer circumferential surface of the tip-end section of the output shaft 12a is formed in the center section of the drive-side base section 20b. Moreover, the drive-side arm sections 21c are provided intermittently in the circumferential direction (spaced at a phase of every 90 degrees) in portions near the outer diameter on a surface of the drive-side base section 20b that faces the driven-side transmission member 17d, and protrude out in the axial direction.

On the other hand, the driven-side transmission member 17d is made of metal and has a driven-side base section 22b, and four driven-side arm sections. A drive-side serration hole 28 that engages with a serration fit with a male serration section that is formed around the outer circumferential surface of the base-end section of the worm shaft 6a is formed in the center section of the driven-side base section 22b. Moreover, the drive-side arm sections 23c are provided intermittently in the circumferential direction (spaced at a phase of every 90 degrees) in portions near the outer diameter on a surface of the driven-side base section 22b that faces the drive-side transmission member 16d, and protrude out in the axial direction. The dimension in the axial direction of the drive-side arm sections 21c and the dimension in the axial direction of the driven-side arm sections 23c are the same.

In this example, paired side surfaces 29g, 29h in the circumferential direction of the drive-side arm sections 21c, which are ones of the arm sections 21c, 23c, are not arranged in the radial direction, but are arranged so as to incline with respect to the radial direction. More specifically, when the direction of rotation of the output shaft 12a is in the clockwise direction in FIG. 25, the side surfaces 29g in the circumferential direction, which are ones of the side surfaces 29g, 29h, that are located on the front side in the direction of rotation are inclined toward the front in the direction of rotation with respect to the radial direction as going toward the outside in the radial direction (inclined toward the rear in the direction of rotation as going toward the inside in the radial direction). On the other hand, when the direction of rotation of the output shaft 12a is in the counterclockwise direction in FIG. 25, the side surfaces 29h in the circumferential direction, which are the others of the side surfaces 29g, 29h, that are on the front side in the direction of rotation are inclined toward the front in the direction of rotation with respect to the radial direction as going toward the outside in the radial direction (inclined toward the rear in the direction of rotation as going toward the inside in the radial direction). Moreover, the angle that is formed between the paired side surfaces 29g, 29h in the circumferential direction of the drive-side arm sections 21c is 90 degrees or more (approximately 110 degrees in the example in the figure).

Furthermore, in this example, paired side surfaces 30g, 30h in the circumferential direction of the driven-side arm sections 23c, which are the others of the arm sections 21c, 23c, are not arranged in the radial direction, but are arranged so as to incline with respect to the radial direction. More specifically, when the direction of rotation of the output shaft 12a is in the clockwise direction in FIG. 25, the side surfaces 30g in the circumferential direction, which are ones of the side surfaces 30g, 30h, that are on the front side in the direction of rotation are inclined toward the rear in the direction of rotation with respect to the radial direction as going toward the outside in the radial direction. On the other hand, when the direction of rotation of the output shaft 12a is in the counterclockwise direction in FIG. 25, the side surfaces 30h in the circumferential direction, which are the others of the side surfaces 30g, 30h, that are on the front side in the direction of rotation are inclined toward the rear in the direction of rotation with respect to the radial direction as going toward the outside in the radial direction. Moreover, the spacing in the circumferential direction between the paired side surfaces 30g, 30h in the circumferential direction of the driven-side arm sections 23c is tapered, or in other words, becomes smaller going toward the outside in the radial direction.

The shock-absorbing member 18i is constructed by laminating in the axial direction three shock-absorbing pieces 41, 42 (one inside shock-absorbing piece 41, and two outside shock absorbing pieces 42) that have each a cross cylindrical shape, and has eight held sections 43a, 43b and four outer-diameter side cover sections 44.

The held sections 43a, 43b have a flat plate shape, and are placed between the side surfaces in the circumferential direction of the drive-side arm sections 21c and the driven-side arm sections 23c that are adjacent to each other in the circumferential direction. In this example, the paired held sections 43a, 43b that are adjacent to each other in the circumferential direction are arranged so as to each have a mirror symmetry about an imaginary plane passing through the center axis of the shock-absorbing member 18i that exists between each of the paired held sections 43a, 43b (planes on the chain lines α, β, γ, and δ in FIG. 28) and are inclined in a direction toward each other and toward the imaginary plane with respect to the radial direction as going toward the outside in the radial direction, and therefore the paired held sections 43a, 43b are not arranged in the radial direction, but are inclined with respect to the radial direction (the directions of inclination are opposite and the inclination angles are the same between the paired held sections 43a, 43b). Combined held sections 45 that are formed from the paired held sections 43a, 43b are arranged at four locations that are uniformly spaced in the circumferential direction.

The outer-diameter cover sections 44 each have an outer circumferential shape that is a partial cylindrical shape, and make the outer-diameter side end sections of the paired held sections 43a, 43b that are adjacent to each other in the circumferential direction of the combined held sections 45 continuous. On the other hand, the inner-diameter side end section of the non-paired held sections 43a, 43b that are adjacent in the circumferential direction but pertain to the different combined held sections 45 are directly continuous. As a result, portions where the outer-diameter side end sections of the held sections 43a, 43b that are adjacent to each other in the circumferential direction are made continuous by way of the outer-diameter side cover sections 44, and portions where the inner-diameter side end sections of the held sections 43a, 43b are directly made continuous are arranged in an alternating sequence in the circumferential direction. With this kind of construction, the cross-sectional shape of the shock-absorbing member 18i has a cross cylindrical shape.

Moreover, in this example, of the three shock-absorbing pieces 41, 42 of the shock-absorbing member 18i, the inside shock-absorbing piece 41 that is located in the center in the axial direction is manufactured using a material that elastically deforms more easily than the shock-absorbing pieces 42 that are located on both sides in the axial direction. More specifically, the inside shock-absorbing piece 41 is manufactured using a material such as rubber or an elastomer that elastically deforms easily, and the outside shock-absorbing pieces 42 are manufactured using a synthetic resin such as polyacetal resin or polyamide resin for which elastic deformation is more difficult than rubber or an elastomer.

In a state that the shock-absorbing member 18i is assembled, the inside shock-absorbing piece 41 has inside held pieces 46a, 46b that constitute the held sections 43a, 43b, and inside cover pieces 47 that constitute the outer-diameter side cover sections 44. In the state that the shock-absorbing member 8i is assembled, the outside shock-absorbing pieces 42 also have outside held pieces 48a, 48b that constitute the held sections 43a, 43b, and outside cover pieces 49 that constitute the outer-diameter side cover sections 44. Therefore, the held sections 43a, 43b of the shock-absorbing member 18i are constructed by layering in the axial direction the inside held pieces 46a, 46b and the outside held pieces 48a, 48b, and the outer-diameter side cover sections 44 are constructed by layering in the axial direction the inside cover pieces 47 and the outside cover pieces 49.

The width dimensions (width dimensions in the circumferential direction) of the inside held pieces 46a, 46b of the inside shock-absorbing pieces 41 are larger than the width dimensions (width dimensions in the circumferential direction) of the outside held pieces 48a, 48b of the outside shock-absorbing pieces 42. As a result, when the shock-absorbing member 18i is assembled, both side surfaces in the circumferential direction of the inside held pieces 46a, 46b protrude further out in the circumferential direction than both side surfaces in the circumferential direction of the outside held pieces 48a, 48b, to form swollen sections 50a, 50b in those portions. When the shock-absorbing member 18i and the drive-side arm sections 21c and driven-side arm sections 23c are assembled, the swollen sections 50a, 50b are elastically compressed a little between the side surfaces 29g, 29h in the circumferential direction of the drive-side arm sections 21c and the side surfaces 30g, 30h in the circumferential direction of the driven-side arm sections 23c. In this example, the width dimensions of the swollen sections 50a, 50b are constant over the length direction of the held sections 43a, 43b.

In this example, the inside shock-absorbing pieces 41 are integrally formed with the damper member 26b. The damper member 26b has a solid circular column shape, and is integrally provided on the inside of the inside shock-absorbing piece 41 by connecting four positions that are uniformly spaced in the circumferential direction of a thin annular connecting section 51 that is formed at a portion near one end in the axial direction on the outer circumferential surface of the damper member 26b to the continuous sections of the inner-diameter end sections of the inside held pieces 46a, 46b respectively. Moreover, the damper member 26b is such that the other end section in the axial direction (right end in FIG. 31) protrudes to the outside much further in the axial direction than the side surfaces in the axial direction of the inside shock-absorbing piece 41 (and shock-absorbing member 18i). The inside shock-absorbing piece 41 and the damper member 26b having this kind of integrated construction are formed at the same time by injection molding.

Moreover, in order to improve the ability to assemble and handle the shock-absorbing member 18i that is constructed by the three shock-absorbing pieces 41, 42, the inside shock-absorbing piece 41 and the outside shock-absorbing pieces 42 have snap-fit joining construction, and are removably connected to each other. In order for this, hook-shaped locking tabs pieces 52 and concave locking sections 53 are formed on the four outside cover pieces of the outside shock-absorbing pieces 42 so as to be arranged in an alternating sequence in the circumferential direction. The locking tab pieces 52 correspond to locking sections, and the concave locking sections 53 correspond to locked sections, however, instead of locking tab pieces 52 and concave locking sections 53, it is also possible to employ other means for forming locking sections and locked sections.

The locking tab pieces 52 are formed on the inner-diameter side end section of one side surface in the axial direction of the outside cover pieces 49 so as to protrude in the axial direction. The tip-end sections of the locking tab pieces 52 are bent toward the outside in the radial direction. On the other hand, the concave locking sections 54 are formed on the other side surface of the outside cover pieces 49 in the whole radial direction. Moreover, concave grooves 54 through which the locking tab pieces 52 pass are formed on the inner circumferential surfaces of the outside cover pieces 49 where the concave locking sections 53 are formed in the other side surfaces in the axial direction.

When joining the inside shock-absorbing piece 41 and the outside shock-absorbing pieces 42, the outside shock-absorbing pieces 42 are arranged in a state that the one side surfaces in the axial direction of the outside shock-absorbing pieces 42 are made to face each other on both sides in the axial direction of the inside shock-absorbing piece 41, and that the outside shock-absorbing pieces 42 are shifted with respect to each other by a phase of 90 degrees. As a result, at four locations in the circumferential direction, the locking tab pieces 52 and the concave locking sections 53 (concave grooves 54) are located on the same virtual lines. Then, by bringing the outside shock-absorbing pieces 42 toward each other, the locking tab pieces 52 pass through the inside in the radial direction of the inside cover pieces 47 of the inside shock-absorbing piece 41 and the inside of the concave grooves 54 while elastically deforming inward in the radial direction. With the inside shock-absorbing piece 41 elastically deformed a little in the axial direction, the locking tab pieces 52 are elastically restored outward in the radial direction, and the tip-end sections of these locking tab pieces 52 elastically lock in the concave locking sections 53. In this example, by using this kind of snap-fit type of joining construction, the inside shock-absorbing piece 41 and outside shock-absorbing pieces 42 are joined together to form the shock-absorbing member 18i.

Figure 25:
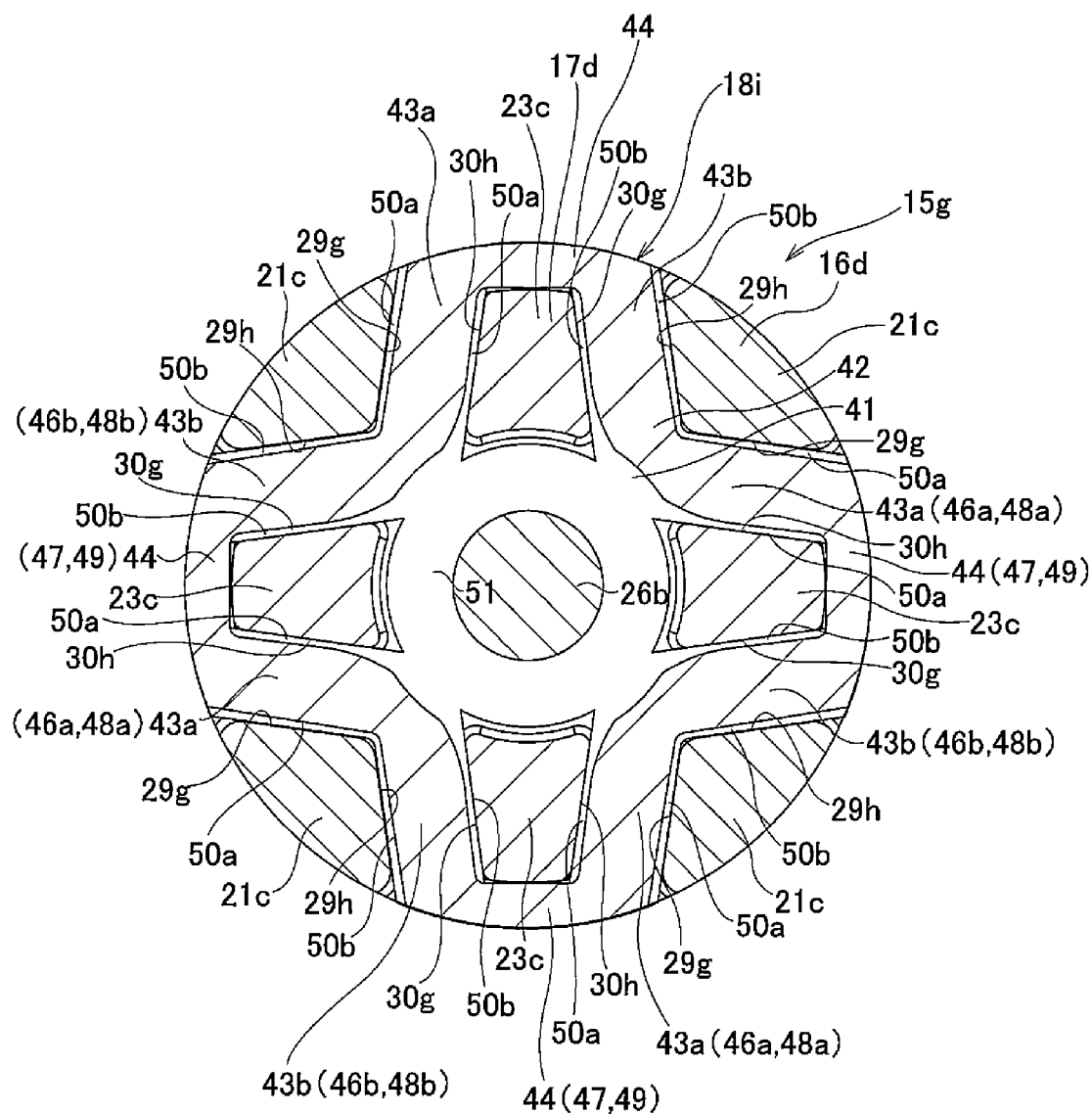
FIG. 25 is an enlarged cross-sectional drawing of section B-B in FIG. 20.
Figure 26:
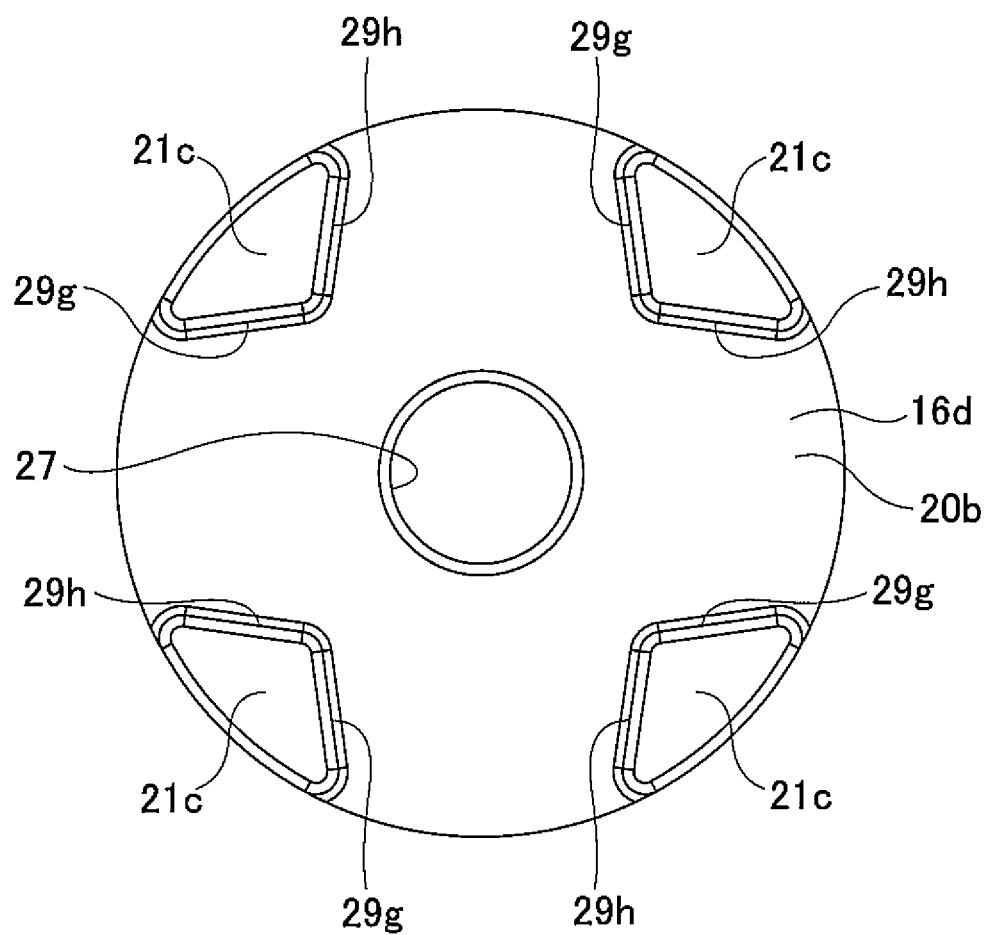
FIG. 26 is an end view of the drive-side transmission member that has been removed from the torque transmission joint illustrated in FIG. 21 as seen from the tip-end side of the drive-side arm sections thereof.
Figure 27:
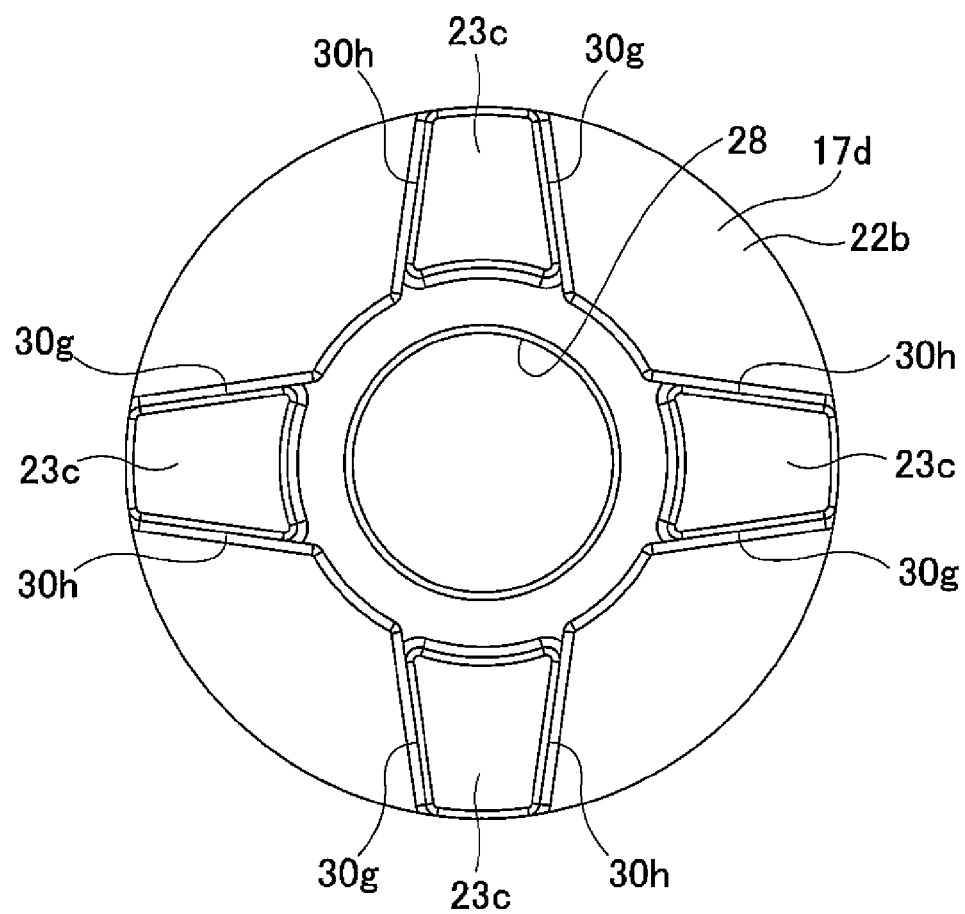
FIG. 27 is an end view of the driven-side transmission member that has been removed from the torque transmission joint illustrated in FIG. 21 as seen from the tip-end side of the driven-side arm sections thereof.
Figure 28:
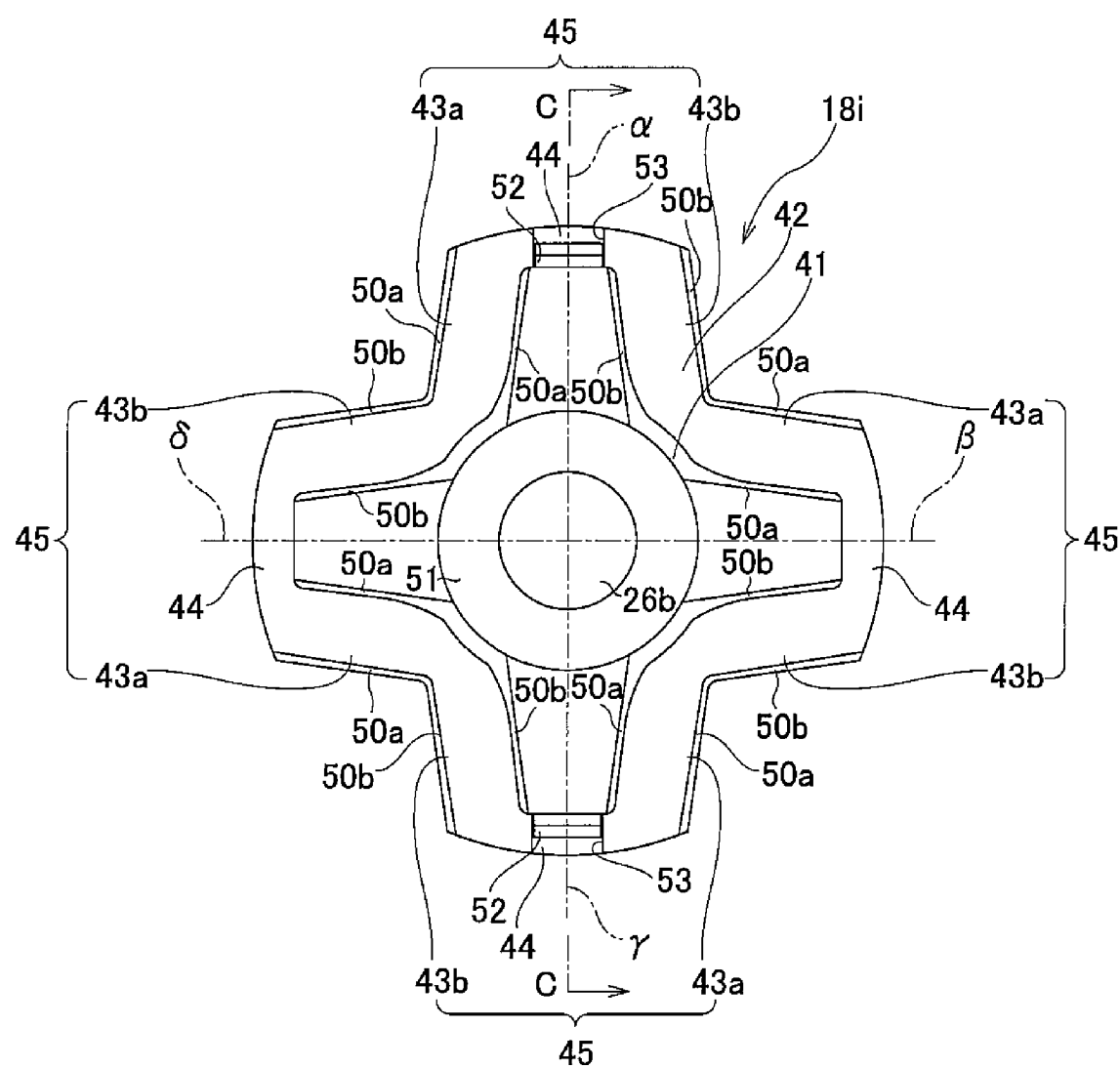
FIG. 28 is an end view of the shock-absorbing member of the torque transmission joint illustrated in FIG. 21.
Figure 29:
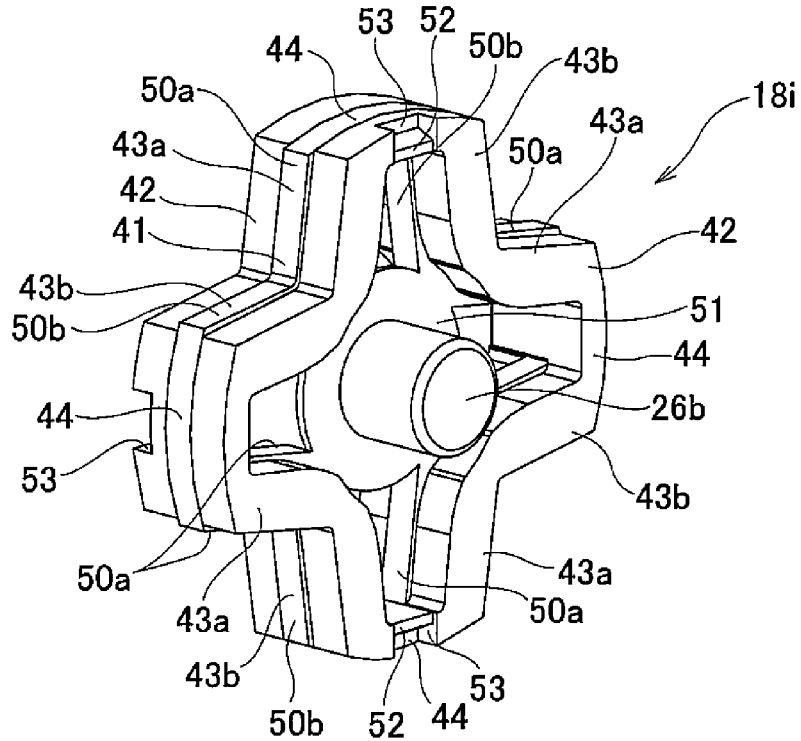
FIG. 29 is a perspective drawing of the shock-absorbing member illustrated in FIG. 28.
Figure 30:
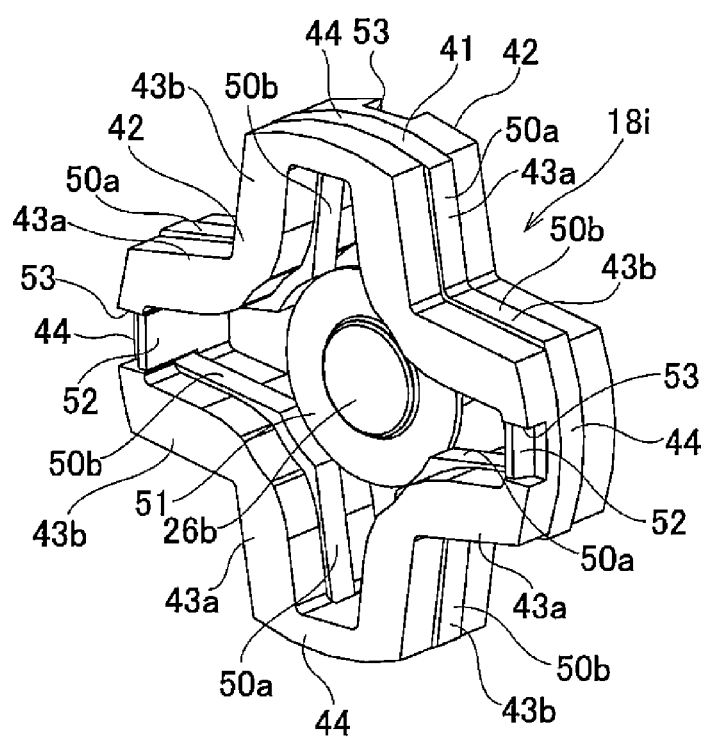
FIG. 30 is a perspective drawing of the shock-absorbing member illustrated in FIG. 28 as seen from another direction.
Figure 31:
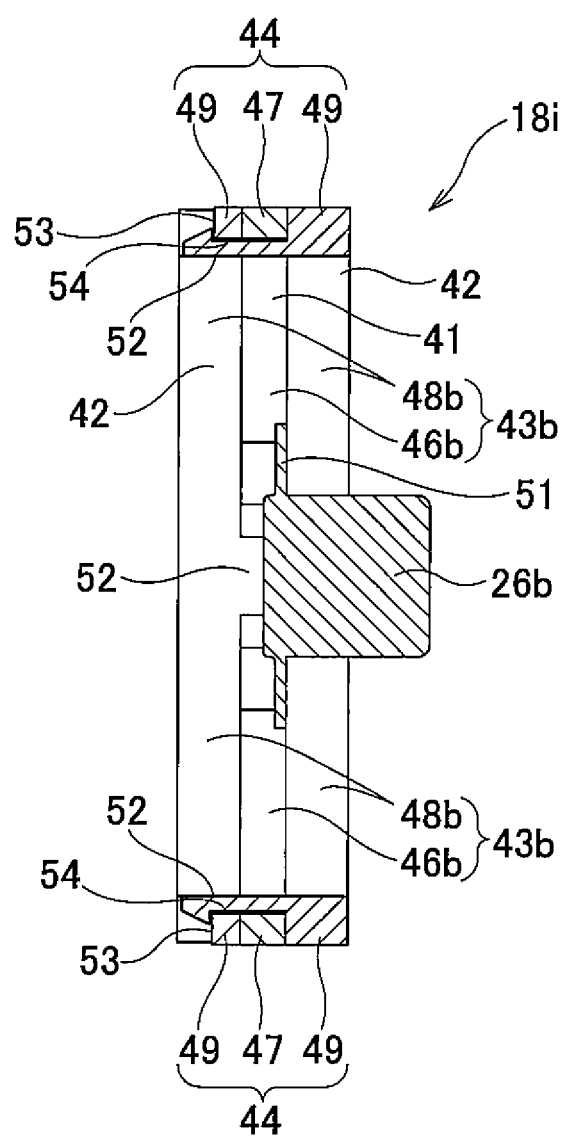
FIG. 31 is a cross-sectional drawing of section C-C in FIG. 28.
Figure 32:
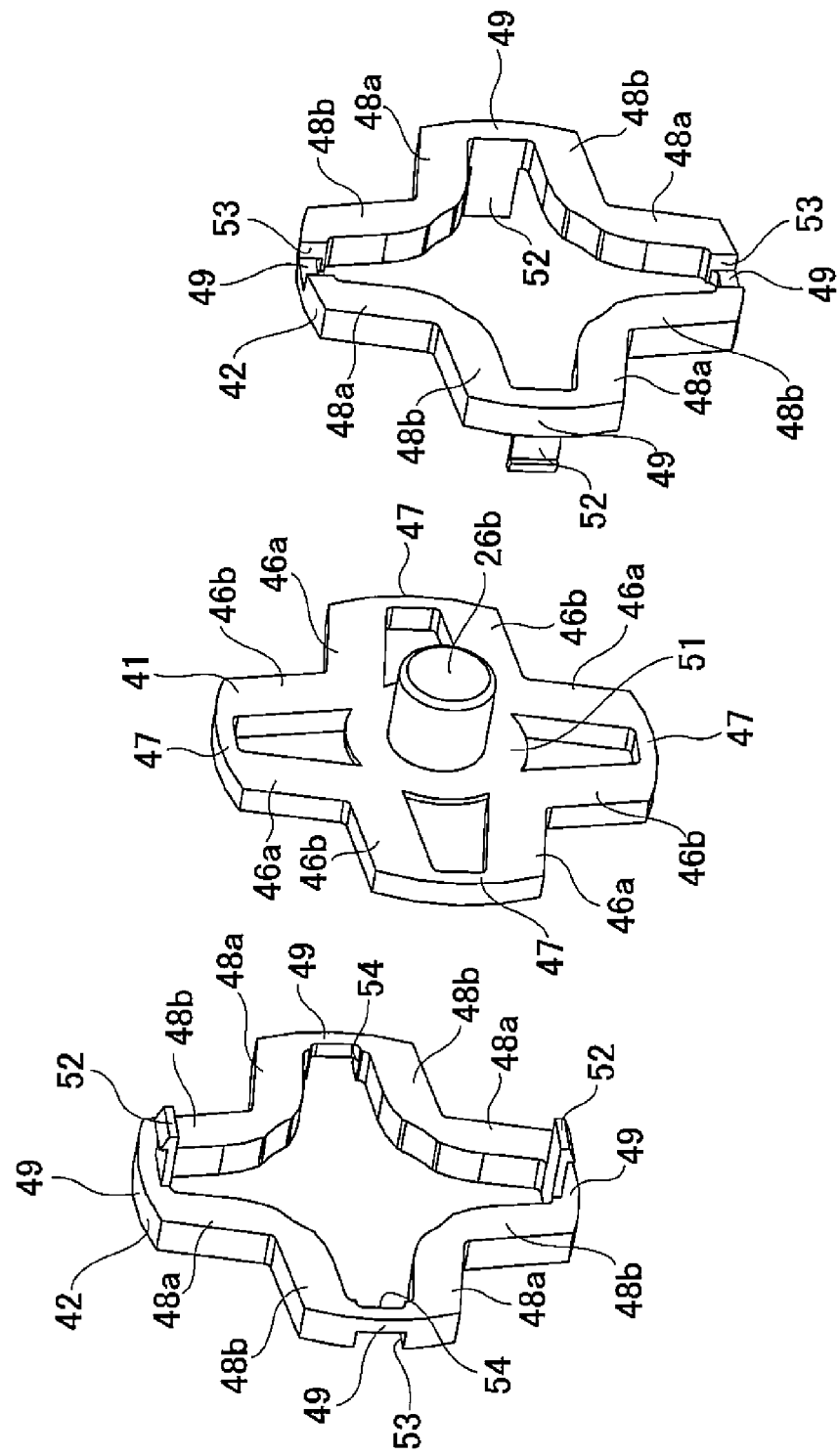
FIG. 32 is an exploded perspective drawing of the shock-absorbing member illustrated in FIG. 28.
Figure 33:
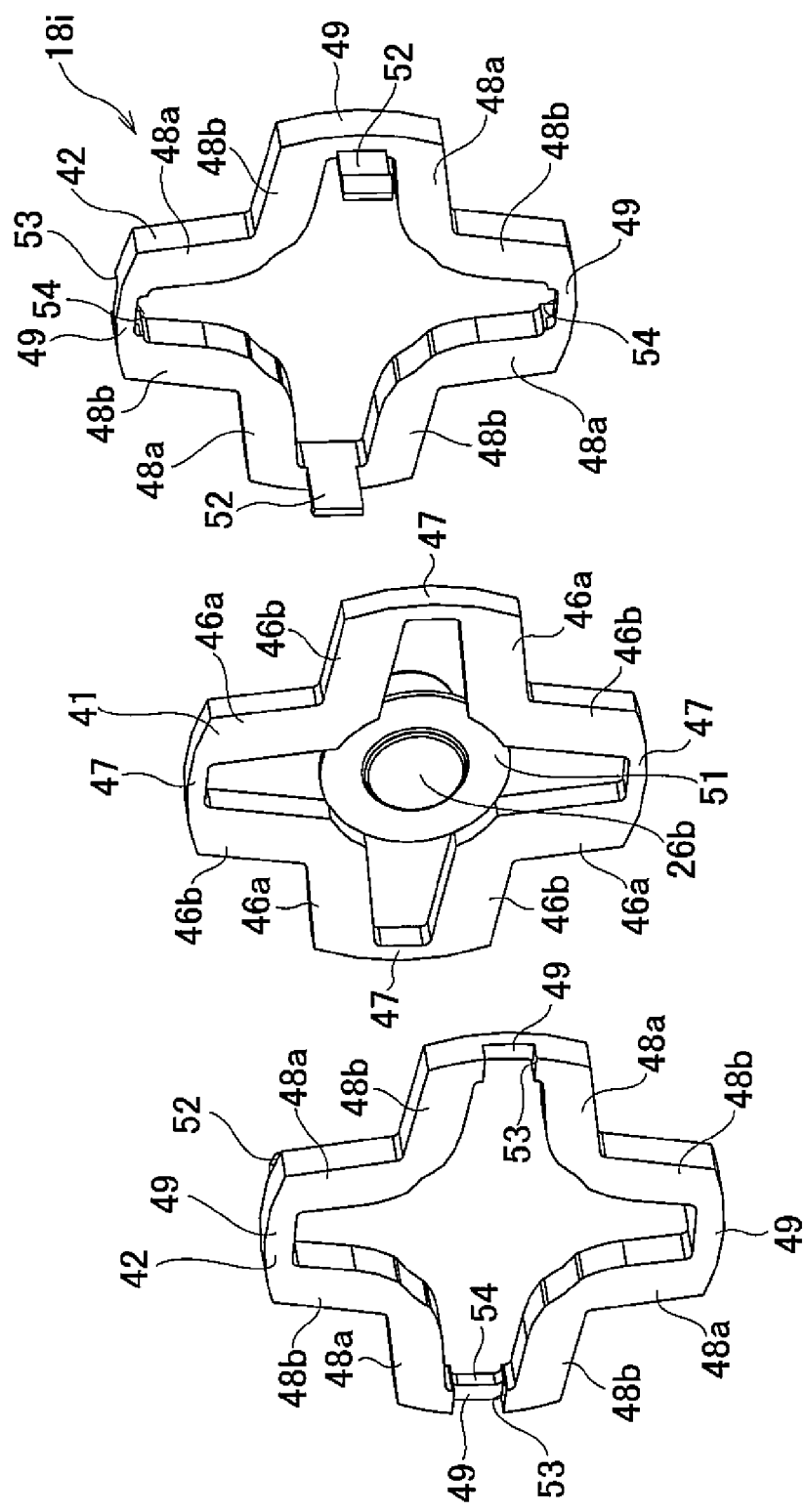
FIG. 33 is an exploded perspective drawing of the shock-absorbing member illustrated in FIG. 28 as seen from another direction.
Figure 34:
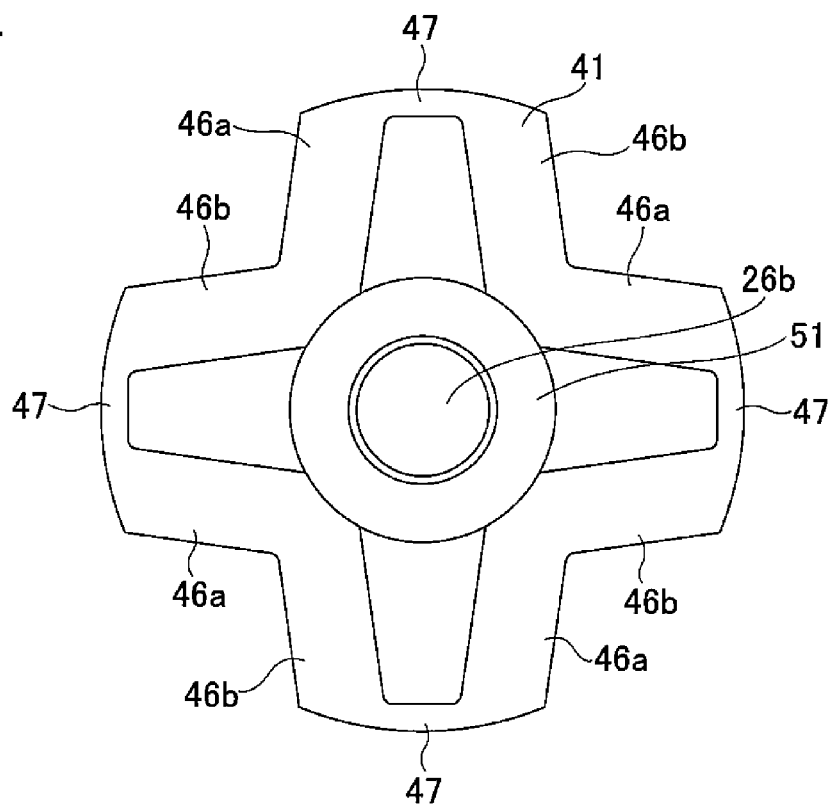
FIG. 34 is an end view that illustrates an inside shock-absorbing piece that was removed from the shock-absorbing member illustrated in FIG. 28.
Figure 35:
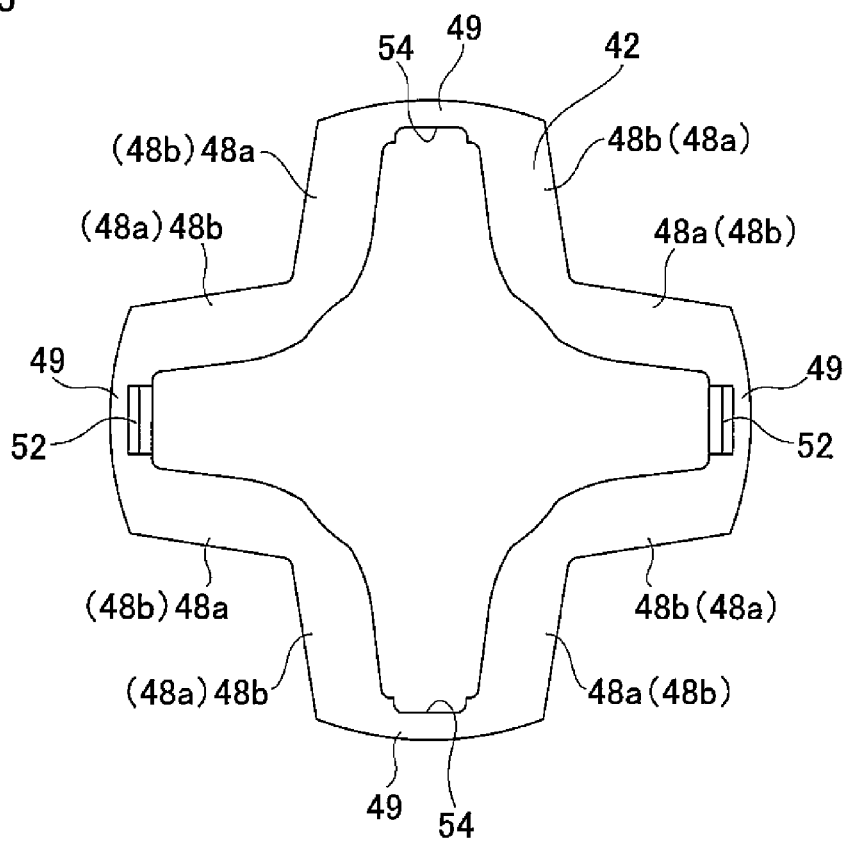
FIG. 35 is an end view that illustrates an outside shock-absorbing piece that was removed from the shock-absorbing member illustrated in FIG. 28.

Moreover, the shock-absorbing member 18i, the drive-side arm sections 21c and the driven-side arm sections 23c are combined as illustrated in FIG. 25. More specifically, the driven-side arm sections 23c (others of the arm sections 21c, 23c) are placed on the outside portions in the radial direction of the annular connecting section 51 between the paired held sections 43a, 43b of the combined held sections 45. The drive-side arm sections 21c (ones of the arm sections 21c, 23c) are placed between the combined held sections 45 that are adjacent to each other in the circumferential direction (between the non-paired held sections 43a, 43b that are adjacent to each other in the circumferential direction but pertain to the different combined held sections 45). As a result, the outer circumferential side surfaces of the driven-side arm sections 23c are covered by the outer-diameter side cover sections 44 of the shock-absorbing member 18i. In this state, the paired side surfaces 29g, 29h in the circumferential direction of the drive-side arm sections, and the paired side surfaces 30g, 30h in the circumferential direction of the driven-side arms sections 23c face to and come in contact over the entire surface with the side surfaces in the circumferential direction of the held sections 43a, 43b in the circumferential direction. The swollen sections 50a, 50b are also elastically compressed a little.

Figure 20:
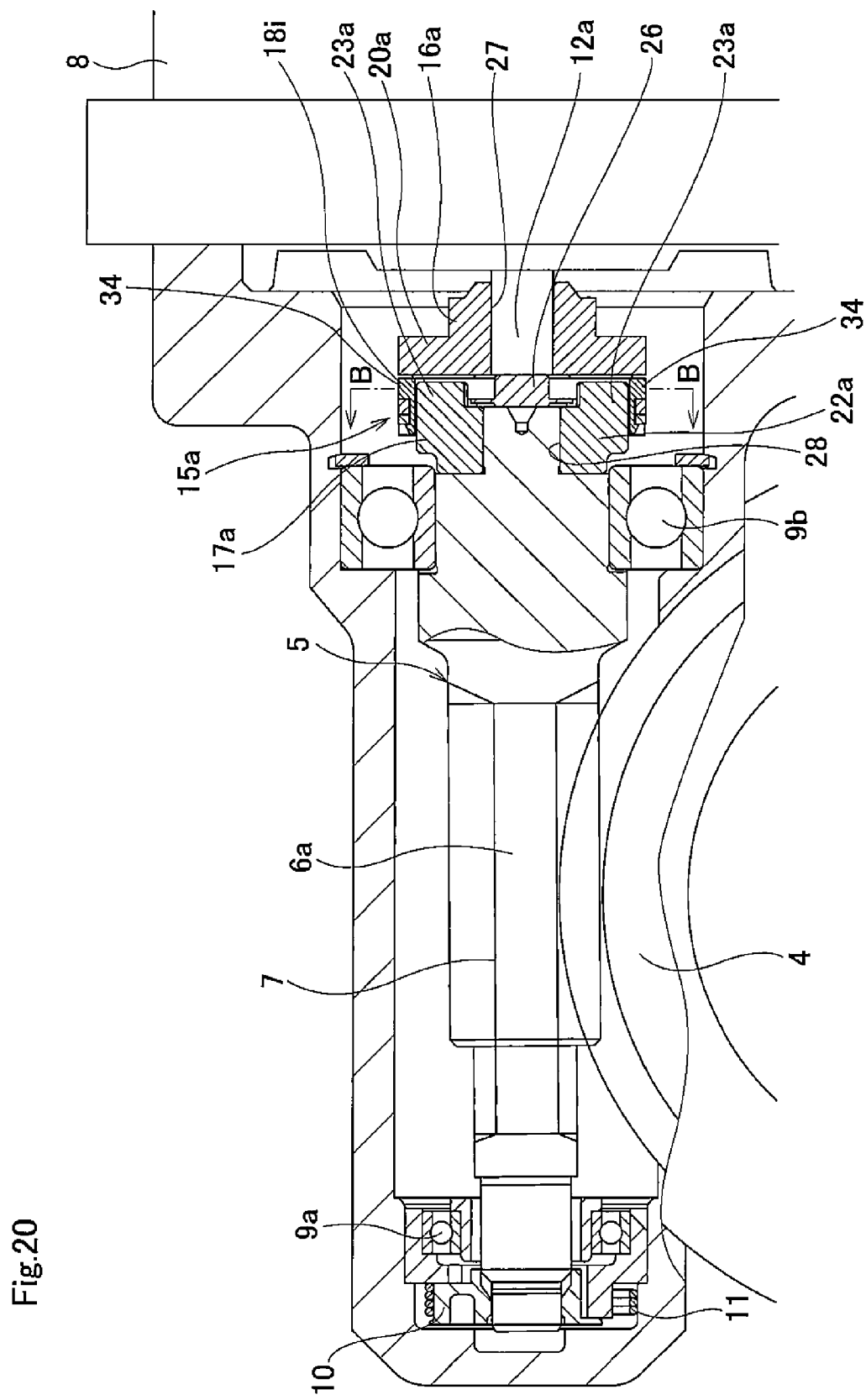
FIG. 20 is cross-sectional drawing of an electric power steering apparatus in which a torque transmission joint of an example of a second embodiment of the present invention is assembled.
Figure 21:
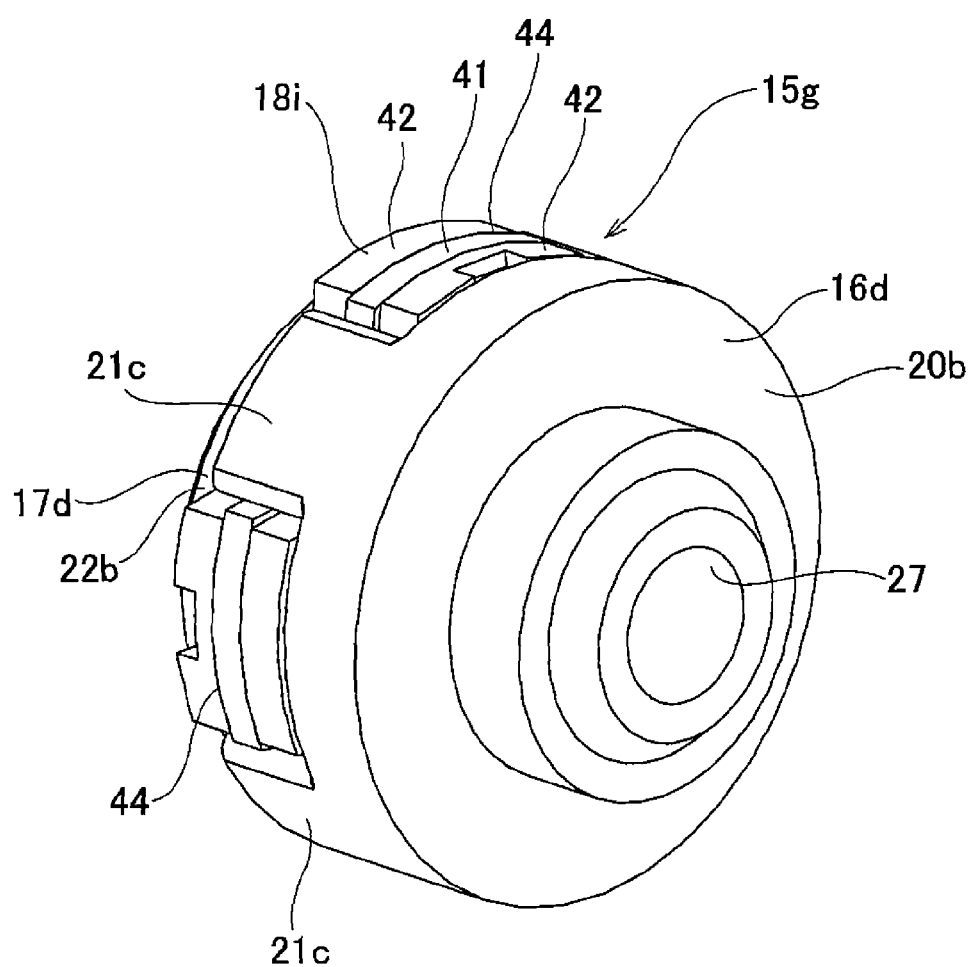
FIG. 21 is perspective drawing illustrating a torque transmission joint that has been removed from the electric power steering apparatus illustrated in FIG. 20.
Figure 22:
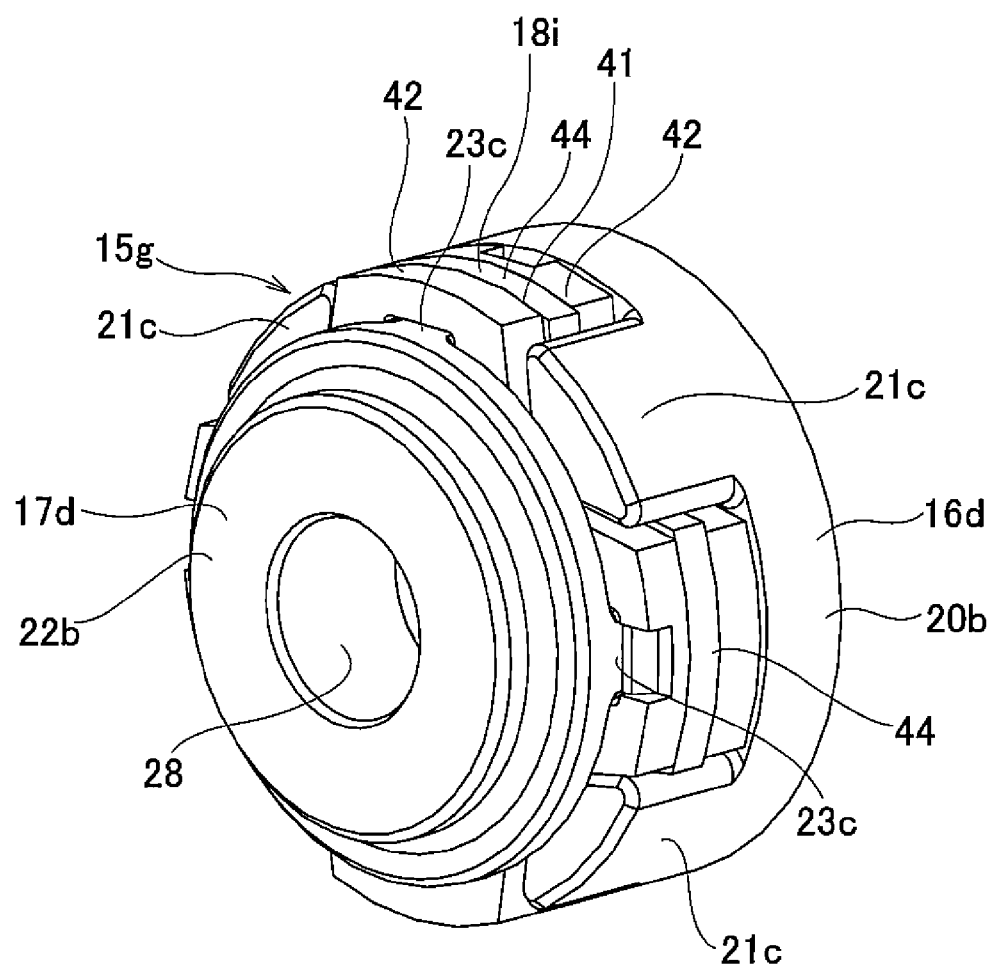
FIG. 22 is a perspective drawing of the torque transmission joint illustrated in FIG. 21 in a state as seen from another direction.
Figure 23:
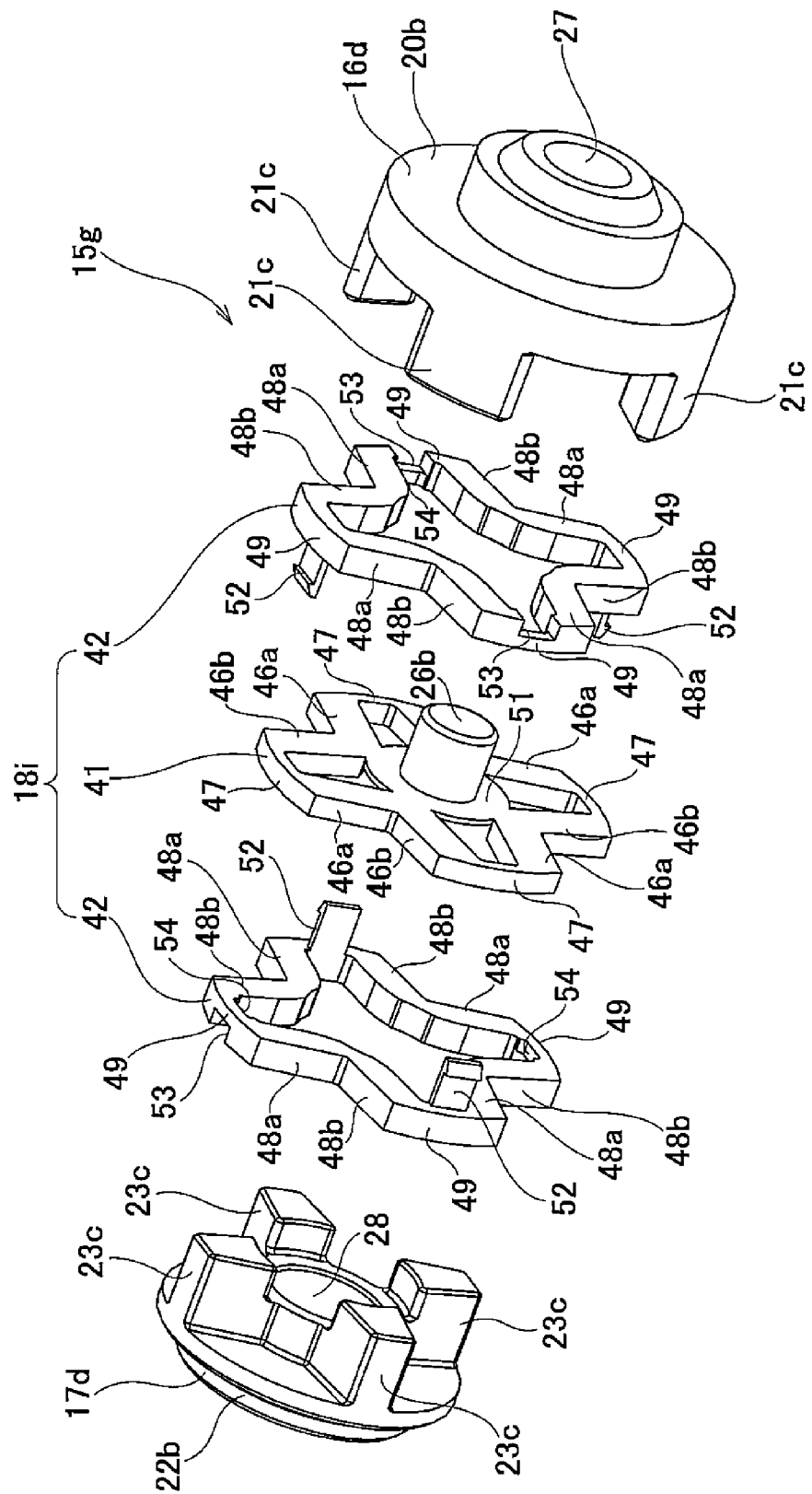
FIG. 23 is an exploded perspective drawing of the torque transmission joint illustrated in FIG. 21.
Figure 24:
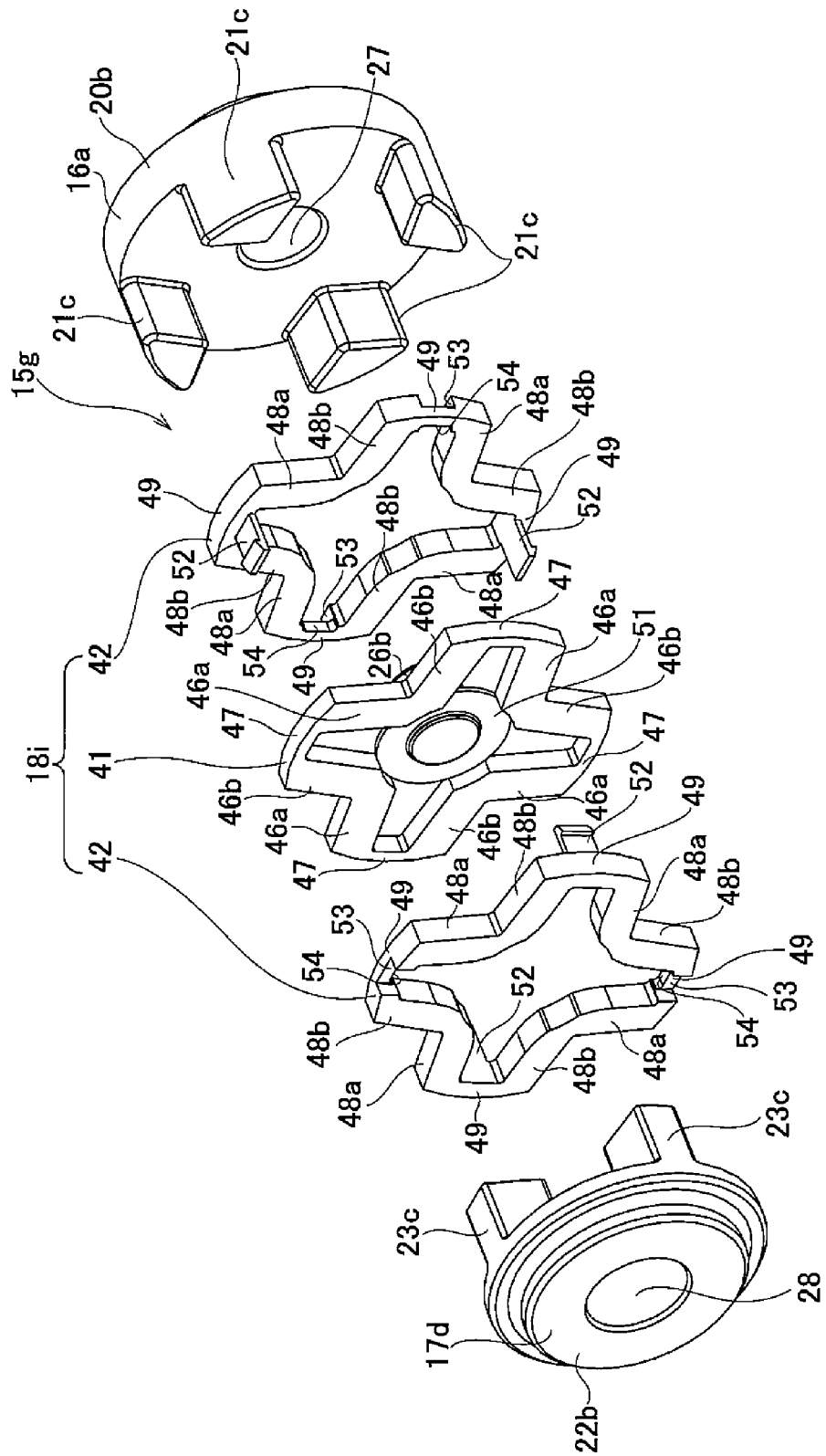
FIG. 24 is an exploded perspective drawing of the torque transmission joint illustrated in FIG. 21 in a state as seen from another direction.

Moreover, as illustrated in FIG. 20, with the torque transmission joint 15g in the assembled state, the damper member 26 is held in the axial direction between the tip-end surface of the output shaft 12a of the electric motor 8 and the base-end surface of the worm shaft 6a.

Even in the case of the torque transmission joint 15g and electric power steering apparatus of this example, it is possible to effectively absorb error such as dimension error or assembly error of components, and it is possible to improve the work efficiency of the inspection process in order to prevent the assembly of the shock-absorbing member 18i from being forgotten. Furthermore, in this example, the inside shock-absorbing piece 41 and the outside shock-absorbing pieces 42 are joined by snap-fit type joining construction that uses the locking tab pieces 52 and the concave locking sections 53, so it is possible to assemble the shock-absorbing member 18i easily, and to improve the ability to handling the shock-absorbing member 18i. The other construction and effects are the same as in the case of the torque transmission joint and electric power steering apparatus of the first embodiment.

Figure 36:
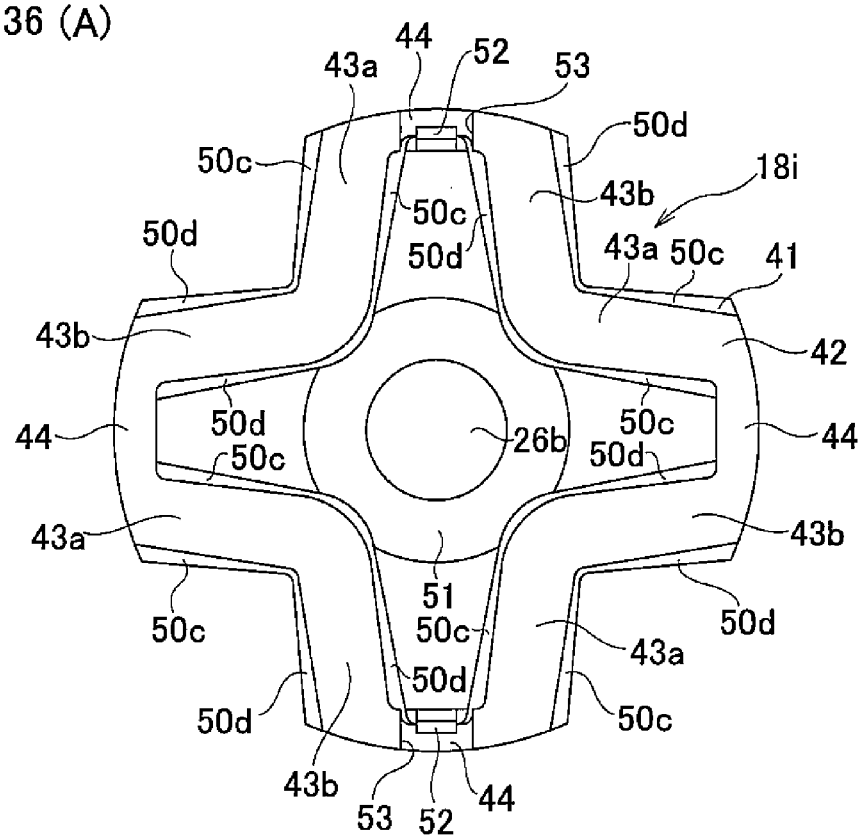
FIGS. 36A and 36B are drawings illustrating two other examples of shapes of the swollen sections that can be applied to the shock-absorbing member of the torque transmission joint of the present invention.
Figure 36:
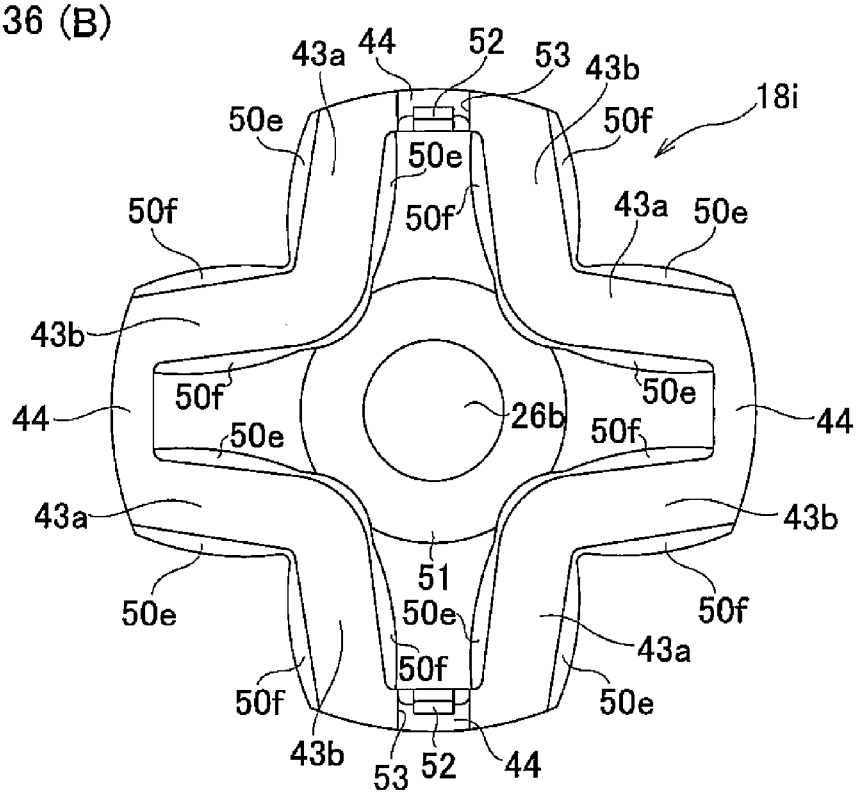
Figure 37:
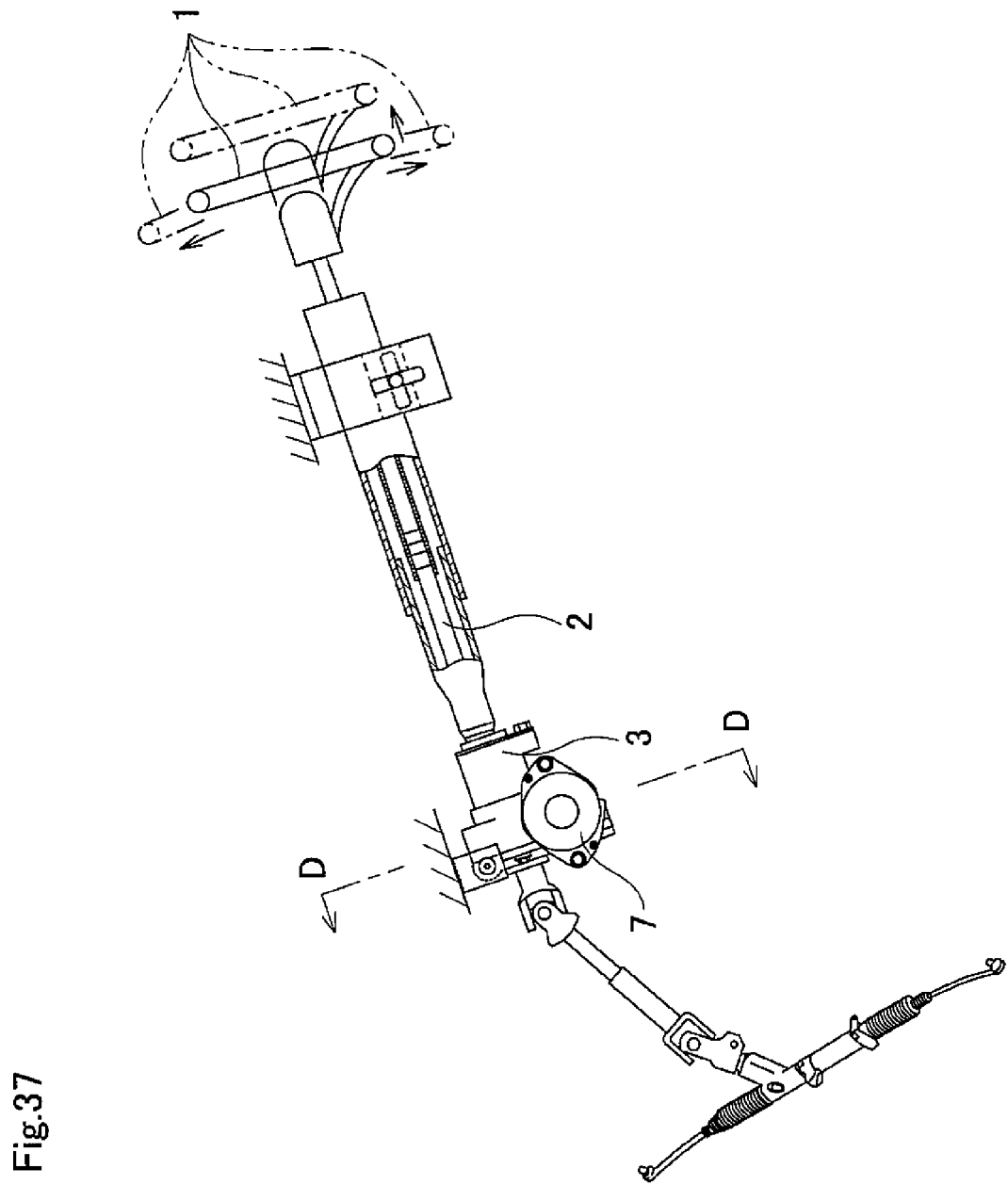
FIG. 37 is a partial vertical cross-sectional side view that illustrates an example of a steering apparatus for an automobile.
Figure 38:
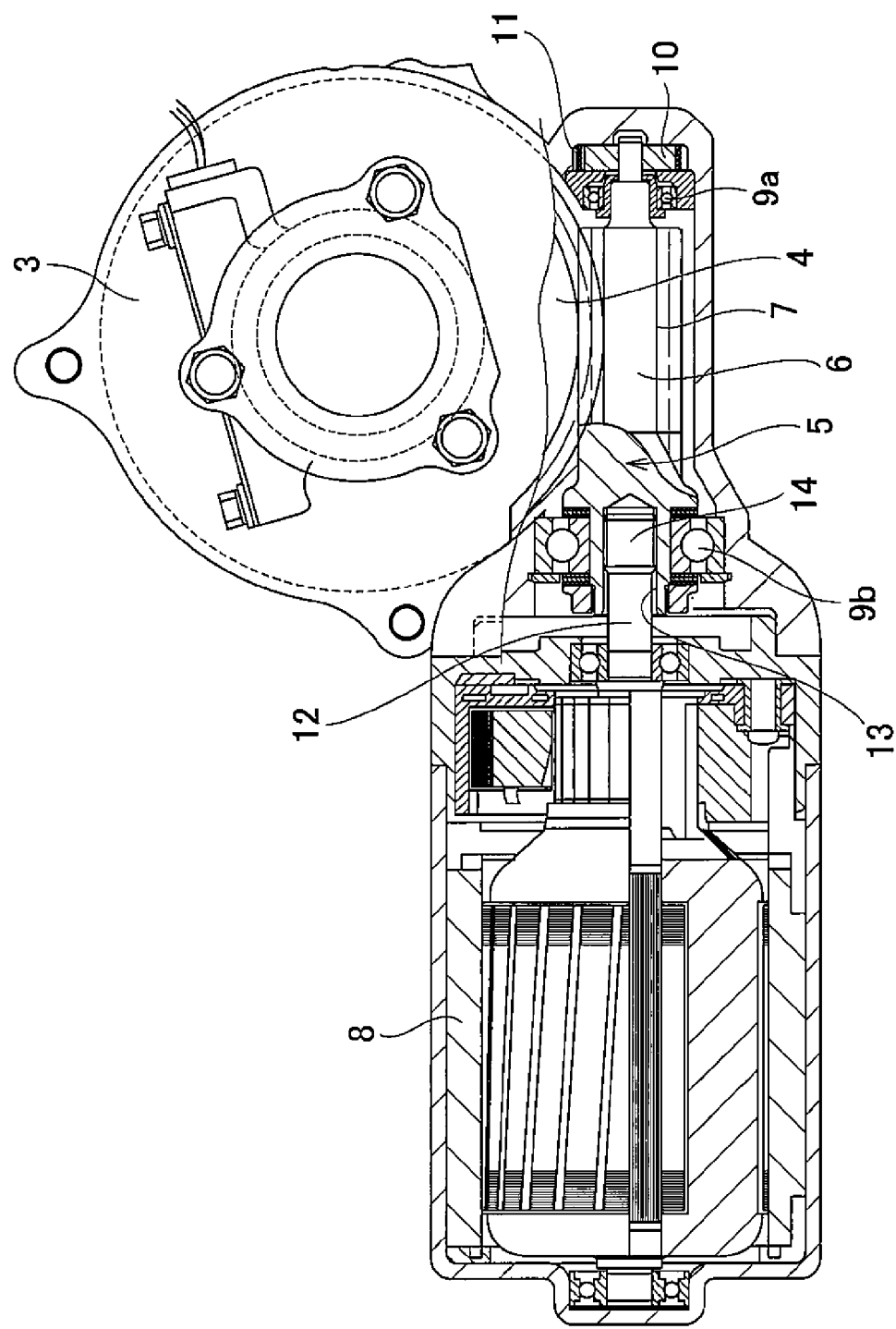
FIG. 38 is an enlarged cross-sectional drawing of section D-D in FIG. 37, and illustrates an example of a conventional electric power steering apparatus.
Figure 39:
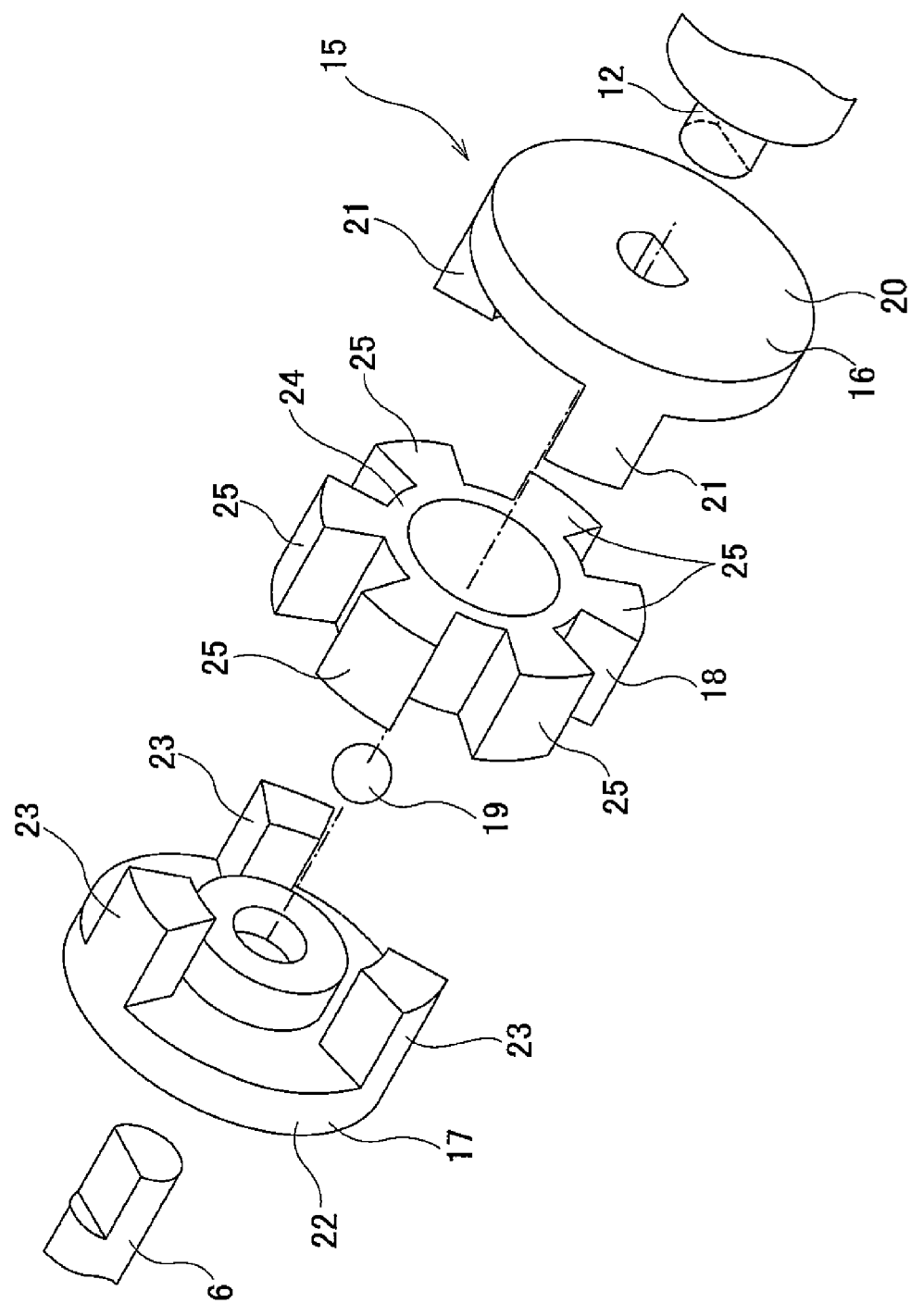
FIG. 39 is an exploded perspective drawing that illustrates a conventional torque transmission joint.
Figure 40:
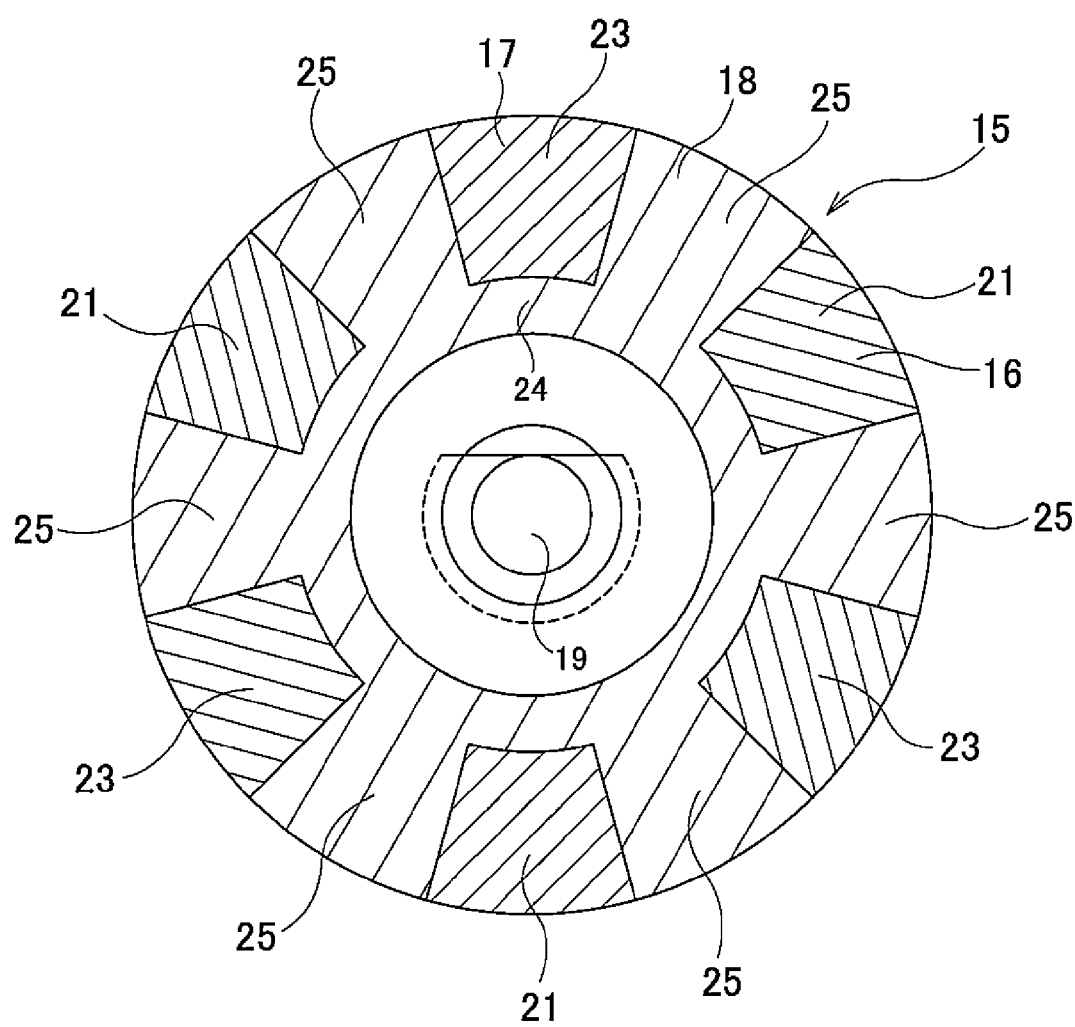
FIG. 40 is a cross-sectional drawing of the conventional torque transmission joint of FIG. 39, and is similar to FIG. 3.

In regards to the shape of the swollen sections, construction is not limited to a shape in which the width dimension does not change in the length direction of the held sections, and the construction illustrated in FIGS. 36A and 36B can also be used. In other words, as illustrated in FIG. 36A, the width dimensions (amount of swelling) of the swollen sections 50c, 50d can become greater as going toward the outer-diameter side of the held sections 43a, 43b such that these swollen sections 50c, 50d have a triangular shape, or as illustrated in FIG. 36B, the width dimensions (amount of swelling) of the swollen sections 50e, 50f can become greater as going toward the center in the length direction of the held sections 43a, 43b such that these swollen sections 50e, 50f have a convex arc shape. When employing this kind of construction, the elastic force demonstrated by the swollen sections 50c (50e), 50d (50f) gradually increases, so it is possible to more gently increase the transmission torque.

In this example, with an intention of reducing costs by making parts common, the shapes of the pair of outside shock-absorbing pieces are the same, however, for example, it is also possible to use a pair of outside shock-absorbing pieces that have different shapes, such as forming four locking tab pieces on the outside shock-absorbing piece on one side, and forming four concave locking sections in the outside shock-absorbing piece on the other side.

In either embodiment, a drive-side transmission member having the same shape as the driven-side transmission member shown in the above examples can be attached to the tip-end section of the output shaft of the electric motor, and a driven-side transmission member having the same shape as the drive-side transmission member shown in the above examples can be attached to the base-end section of the work shaft. That is, in the embodiments of the present invention, the drive-side transmission member and the driven-side transmission member can be interchangeably used.

INDUSTRIAL APPLICABILITY

The torque transmission joint of the present invention can particularly be suitably applied to an electric power steering apparatus for an automobile, however, can also be widely used in various kinds of machinery having construction in which torque is transmitted between a drive shaft and a driven shaft.

EXPLANATION OF REFERENCE NUMBERS

1 Steering wheel
2 Steering shaft
3 Housing
4 Worm wheel
5 Worm
6, 6a Worm shaft
7 Worm teeth
8 Electric motor
9a, 9b Rolling bearing
10 Pressure piece
11 Coil spring
12, 12a Output shaft
13 Spline hole
14 Spline shaft section
15, 15a to 15g Torque transmission joint
16, 16a to 16d Drive-side transmission member
17, 17a to 17d Driven-side transmission member
18, 18a to 18i Shock-absorbing member
19 Steel ball
20, 20a, 20b Drive-side base section
21, 21a to 21c Drive-side arm section
22, 22a, 22b Driven-side base section
23, 23a to 23c Driven-side arm section
24 Cylindrical section
25, 25a to 25f Held section
26, 26a, 26b Damper member
27 Drive-side serration hole
28 Driven-side serration hole
29a to 29h Side surface in the circumferential direction
30a to 30h Side surface in the circumferential direction
31, 31a to 31c Outer-diameter side cover section
32, 32a Inner-diameter side cover section
33, 33a, 33b Combined held section
34, 34a Support column section
35, 35a Main damper section
36, 36a to 36g Shock-absorbing piece
37a to 37f Held piece
38, 38a, 38b Outer-diameter side cover piece
39a to 39d Swollen section
40, 40a Inner-diameter side cover piece
41 Inside shock-absorbing piece
42 Outside shock-absorbing piece
43a, 43b Held section
44 Outer-diameter side cover section
45 Combined held section
46a, 46b Inside held piece
47 Inside cover piece 48a, 48b Outside held piece
49 Outside cover piece
50a to 50f Swollen section
51 Annular connecting section
52 Locking tab piece
53 Concave locking section
54 Concave groove

What is claimed is:

1. A torque transmission joint comprising:
a drive-side transmission member that is supported by an end section of a drive shaft concentrically with the drive shaft;
a driven-side transmission member that is supported by an end section of a driven shaft, that is arranged in series in an axial direction with the drive shaft, concentrically with the driven shaft; and
a shock-absorbing member that is made of an elastic material and is provided between the drive-side transmission member and the driven-side transmission member;
the torque transmission joint transmitting torque between the end section of the drive shaft and the end section of the driven shaft when the drive shaft and the driven shaft rotate in one rotational direction or in another rotational direction;
the drive-side transmission member comprising:
a drive-side base section that is supported by the end section of the drive shaft, and has a surface that faces the driven-side transmission member; and
a plurality of drive-side arm sections that are provided on the surface of the drive-side base section intermittently in a circumferential direction so as to protrude out in the axial direction, each of which has paired side surfaces in the circumferential direction;
the driven-side transmission member comprising:
a driven-side base section that is supported by the end section of the driven shaft, and has a surface that faces the drive-side transmission member; and
a plurality of driven-side arm sections that are provided on the surface of the driven-side base section intermittently in the circumferential direction so as to protrude out in the axial direction, each of which has paired side surfaces in the circumferential direction; and
the shock-absorbing member comprising a plurality of held sections;
wherein the paired side surfaces of each of the drive-side arm sections comprises one side surface that is positioned on a front side in the one rotational direction and another side surface that is positioned on a rear side in the one rotational direction, and the one side surface is inclined to the front side in the one rotational direction with respect to a radial direction of the drive-side transmission member as it goes toward an outer diameter side of the drive-side transmission member;
the paired side surfaces of each of the driven-side arm sections comprises one side surface that is positioned on a front side in the one rotational direction and another side surface that is positioned on a rear side in the one rotational direction, and another side surface is inclined to the front side in the one rotational direction with respect to a radial direction of the driven-side transmission member as it goes toward an outer diameter side of the driven-side transmission member;
the drive-side arm sections and the driven-side arm sections are arranged in an alternating sequence in the circumferential direction, and the held sections of the shock absorbing member are arranged between the side surfaces in the circumferential direction of the drive-side arm sections and the driven-side arm sections that are adjacent to each other in the circumferential direction; and
the other side surface of each of the driven-side arm sections faces the one side surface of either of the drive-side arm sections, and when the drive shaft is rotated and driven in the one rotational direction, forces due to torque transmitted from the drive shaft to the driven shaft act inward in a radial direction of the shock-absorbing member on the held sections that are held between the one side surfaces of the drive-side arm sections and the other side surfaces of the driven-side arm sections,
wherein the shock-absorbing member comprises outer-diameter side cover sections connecting outer-diameter side end sections of the held sections that are adjacent to each other in the circumferential direction; inner-diameter side connecting sections connecting inner-diameter side end sections of the held sections that are adjacent of each other in the circumferential direction directly or via inner side cover section, the outer-diameter side cover sections and the inner-diameter side connecting sections arranged in an alternating sequence in the circumferential direction such that the shock absorbing member is constructed so as to have a cylindrical shape with a non-circular cross-section; and outer circumferential surfaces of either one of the drive-side arm sections and the driven-side arm sections are covered by the outer-diameter side cover sections, and
wherein the combined held sections are provided at four locations of the shock-absorbing member that are uniformly spaced in the circumferential direction, and the cylindrical shape with the non-circular cross-section of the shock-absorbing member is a cross cylindrical shape.

2. The torque transmission joint according to claim 1, wherein
the other side surfaces of the paired side surfaces of the drive-side arm sections are positioned on a front side in the other rotational direction, and the other side surfaces of the drive-side arm sections are inclined to the front side in the other rotational direction with respect to the radial direction of the drive-side transmission member as it goes toward the outer diameter side of the drive-side transmission member,
the one side surfaces of the paired side surfaces of the driven-side arm sections are positioned on a rear side in the other rotational direction, and the one side surfaces of the driven-side arm sections are inclined to the front side in the other rotational direction with respect to the radial direction of the driven-side transmission member as it goes toward the outer diameter side of the driven-side transmission member, and
the one side surface of each of the driven-side arm sections faces the other side surface of either of the drive-side arm sections, and when the drive shaft is rotated and driven in the other rotational direction, forces due to torque transmitted from the drive shaft to the driven shaft act inward in the radial direction of the shock-absorbing member on the held sections that are held between the other side surfaces of the drive-side arm sections, and the one side surfaces of the driven-side arm sections.

3. The torque transmission joint according to claim 1, wherein the held sections of the shock-absorbing member each have a flat plate shape, and each pair of the held sections that are adjacent to each other and are connected by either of one of the outer-diameter side cover sections and the inner-diameter side connecting sections has a mirror symmetry about an imaginary plane that passes through a center axis of the shock-absorbing member a center point between the held sections that are adjacent to each other in the circumferential direction, and each pair of the held sections is inclined in a direction toward the imaginary plane with respect to a radial direction of the shock-absorbing member as it goes toward an outer diameter side of the shock-absorbing member at the same inclination angle; and combined held sections that are formed by the paired held sections are arranged at a plurality of locations of the torque transmission joint in the circumferential direction and are respectively connected by either of another of the outer-diameter side cover sections and the inner-diameter side connecting sections.

4. The torque transmission joint according to claim 3, wherein either of the drive-side arm sections or the driven-side arm sections are placed between the paired held sections, and the other of the drive-side arm sections or the driven-side arm sections are placed between the combined held sections.

5. A torque transmission joint comprising:
a drive-side transmission member that is supported by an end section of a drive shaft concentrically with the drive shaft;
a driven-side transmission member that is supported by an end section of a driven shaft, that is arranged in series in an axial direction with the drive shaft, concentrically with the driven shaft; and
a shock-absorbing member that is made of an elastic material and is provided between the drive-side transmission member and the driven-side transmission member;
the torque transmission joint transmitting torque between the end section of the drive shaft and the end section of the driven shaft when the drive shaft and the driven shaft rotate in one rotational direction or in another rotational direction;
the driven-side transmission member comprising:
a drive-side base section that is supported by the end section of the drive shaft, and has a surface that faces the driven-side transmission member; and
a plurality of drive-side arm sections that are provided on the surface of the drive-side base section intermittently in a circumferential direction so as to protrude out in the axial direction, each of which has paired side surface in the circumferential direction;
the driven-side transmission member comprising:
a driven-side base section that is supported by the end section of the driven shaft, and has a surface that faces the drive-side transmission member; and
a plurality of driven-side are sections that are provide on the surface of the driven-side base section intermittently in the circumferential direction so as to protrude out in the axial direction, each of which has paired side surfaces in the circumferential direction; and
the shock absorbing member comprising a plurality of held sections;
wherein the paired side surfaces of each of the drive-side arm sections comprises one side surface that is positioned on a front side in the one rotational direction and another side surface that is positioned on a rear side in the one rotational direction, and the one side surface is inclined to the front side in the one rotational direction with respect to a radial direction of the drive-side transmission member as it goes toward an outer diameter side of the drive-side transmission member;
the paired side surfaces of each of the driven-side arm sections comprises one side surface that is positioned on a front side in the one rotational direction and another side surface that is positioned on a rear side in the one rotational direction, and another side surface is inclined to the front side in the one rotational direction with respect to a radial direction of the driven-side transmission member as it goes toward an outer diameter side of the driven-side transmission member;
the driven-side arm sections and the driven-side arm sections are arranged in an alternating sequence in the circumferential direction, and the held sections of the shock absorbing member are arranged between the side surfaces in the circumferential direction of the drive-side arm sections and the driven-side arm sections that are adjacent to each other in the circumferential direction; and
the other side surfaces of each of the driven-side arm sections faces the one side surfaces of either of the drive-side arm sections, and when the drive shaft is rotated and driven in the one rotational direction, forces due to torque transmitted from the drive shaft to the driven shaft act inward in a radial direction of the shock-absorbing member on the held sections that are held between the one side surfaces of the driven-side arm sections and the other side surfaces of the driven-side arm sections,
wherein the shock-absorbing member comprises outer-diameter side cover sections connecting outer-diameter side end sections of the held sections that are adjacent to each other in the circumferential direction; inner-diameter side connecting sections connecting inner-diameter side end sections of the held sections that are adjacent of each other in the circumferential direction directly or via inner side cover sections, the outer-diameter side cover sections and the inner-diameter side connecting sections arranged in an alternating sequence in the circumferential direction such that the shock-absorbing member is constructed so as to have a cylindrical shape with a non-circular cross-section; and outer circumferential surface of either one of the drive-side arm sections and the driven-side arm sections are covered by the outer-diameter side cover sections, and
wherein the shock-absorbing member is formed by layering in the axial direction a plurality of shock-absorbing pieces,
the shock-absorbing pieces comprising:
held pieces that are layered in the axial direction to form the held sections; and
outer-diameter side cover pieces that are layered in the axial direction to form the outer-diameter side cover sections.

6. The torque transmission joint according to claim 5, wherein the shock-absorbing member is formed by two or more shock-absorbing pieces having different elasticity, and swollen sections that protrude out in the circumferential direction are provided on side surfaces of the held pieces of at least one of the shock-absorbing pieces that has an elasticity to elastically deform more easily than the other shock-absorbing pieces.

7. The torque transmission joint according to claim 5, wherein a damper member for absorbing part of a thrust force that acts between the drive shaft and the driven shaft and transmitting a remaining part of the thrust force is provided on an inside of a hollow cylindrical section of the shock-absorbing member between the drive-side transmission member and the driven-side transmission member, and is integrally formed with one of the shock-absorbing pieces that is located in a middle of the shock-absorbing pieces.

8. An electric power steering apparatus comprising:
a housing that is supported by a vehicle body or a member fixed to the vehicle body;
a rotating steering shaft that rotates as a steering wheel is rotated and applies a steering angle to steered wheels;
a worm wheel that is supported by part of the rotating steering shaft so as to be concentric with the rotating steering shaft, and rotates together with the rotating steering shaft;
a worm that comprises a worm shaft as a driven shaft, both end sections of the worm shaft in an axial direction of the worm shaft being supported inside the housing by bearings so as to be able to rotate freely, and worm teeth that are provided around a middle section in the axial direction of the worm shaft and that engage with the worm wheel;
an electric motor having and driving an output shaft as a drive shaft; and
a torque transmission joint transmitting torque between an end section of the output shaft and an end section of the worm shaft when the output shaft is driven by the electric motor;
wherein the torque transmission joint according to claim 5 is provided as the torque transmission joint between the output shaft of the electric motor and the worm shaft such that the torque transmission joint can transmit a torque between the output shaft and the worm shaft.

9. The torque transmission joint according to claim 1, wherein a damper member for absorbing part of a thrust force that acts between the drive shaft and the driven shaft and transmitting a remaining part of the thrust force is provided on an inside of the shock-absorbing member between the drive-side transmission member and the driven-side transmission member.

10. An electric power steering apparatus comprising:
a housing that is supported by a vehicle body or a member fixed to the vehicle body;
a rotating steering shaft that rotates as a steering wheel is rotated and applies a steering angle to steered wheels;
a worm wheel that is supported by part of the rotating steering shaft so as to be concentric with the rotating steering shaft, and rotates together with the rotating steering shaft;
a worm that comprises a worm shaft as a driven shaft, end sections of the worm shaft in an axial direction of the worm shaft being supported inside the housing by bearings so as to be able to rotate freely, and worm teeth that are provided around a middle section in the axial direction of the worm shaft and that engage with the worm wheel;
an electric motor having and driving an output shaft as a drive shaft; and
a torque transmission joint transmitting torque between an end section of the output shaft and an end section of the worm shaft when the output shaft is driven by the electric motor;
wherein the torque transmission joint according to claim 1 is provided as the torque transmission joint between the output shaft of the electric motor and the worm shaft such that the torque transmission joint can transmit a torque between the output shaft and the worm shaft.

* * * * *